(12) United States Patent
Sumner et al.

(10) Patent No.: US 10,630,696 B1
(45) Date of Patent: Apr. 21, 2020

(54) STORING CALL SESSION INFORMATION IN A TELEPHONY SYSTEM

(71) Applicant: Wells Fargo Bank, N.A., San Francisco, CA (US)

(72) Inventors: Daniel S. Sumner, Matthews, NC (US); Douglas Innocenti, Huntersville, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 40 days.

(21) Appl. No.: 15/385,484

(22) Filed: Dec. 20, 2016

Related U.S. Application Data

(60) Provisional application No. 62/399,287, filed on Sep. 23, 2016.

(51) Int. Cl.
*H04L 29/06* (2006.01)
*H04M 3/51* (2006.01)
*G06F 16/22* (2019.01)

(52) U.S. Cl.
CPC ............ *H04L 63/123* (2013.01); *H04L 63/08* (2013.01); *H04M 3/5166* (2013.01); *G06F 16/22* (2019.01);
(Continued)

(58) Field of Classification Search
CPC ... H04L 63/123; H04L 63/08; H04L 63/0876; H04L 63/1458; H04L 67/02; H04L 67/42; H04L 49/9005; H04L 2463/121; H04L 9/0618; H04L 9/0816; H04M 3/5166; H04M 2203/40; H04M 2203/552; H04M 2203/558; G06F 17/30312; G06F 17/30303; G06F 17/30575; G06F 17/30286; G06F 17/30595; G06F 17/30339; G06F 12/0806; G06F 21/31; G06F 21/6218; G06F 21/604; G06F 21/6227; G06F 21/44; G06F 2221/2151; G06F 17/30327; G06F 16/22
(Continued)

(56) References Cited

U.S. PATENT DOCUMENTS 5,852,722 A * 12/1998 Hamilton .............. G06F 9/4416
709/221
8,229,099 B2    7/2012 LaCroix et al.
(Continued)

OTHER PUBLICATIONS

Milton Bron Lima, et al., Implementation of Session Initiation Protocol on Voice over IP Network, Oct. 2013, Third International Conference on Computational Intelligence and Information Technology (CIIT 2013), pp. 1-5.*
(Continued)

*Primary Examiner* — Farid Homayounmehr
*Assistant Examiner* — Raied A Salman
(74) *Attorney, Agent, or Firm* — Shumaker & Sieffert P.A.

(57) ABSTRACT

In an example of this disclosure, a method may include receiving, by a database server, a data write request. The data write request may include authentication information corresponding to a first call session and first additional information. The method may include generating, by the database server, a first unique identifier based on the first additional information. The authentication information may correspond to the first unique identifier. The method may include storing the first unique identifier and the authentication information in a data structure in a memory of the database server.

31 Claims, 34 Drawing Sheets

(52) U.S. Cl.
CPC .. *H04M 2203/40* (2013.01); *H04M 2203/552* (2013.01); *H04M 2203/558* (2013.01)

(58) Field of Classification Search
USPC ............. 726/9; 711/161, 162; 709/251, 208, 709/201; 707/623, 202, 624; 455/445
See application file for complete search history.

(56) References Cited

U.S. PATENT DOCUMENTS

| | | | |
|---|---|---|---|
| 8,781,957 | B2 | 7/2014 | Jackson et al. |
| 8,838,539 | B1* | 9/2014 | Ashcraft ................. H04L 67/02 707/637 |
| 9,247,059 | B1 | 1/2016 | Chidambaram |
| 2003/0032409 | A1 | 2/2003 | Hutcheson ............. G06Q 30/02 455/414.1 |
| 2003/0208576 | A1* | 11/2003 | McQuaide, Jr. ......... H04M 3/42 709/223 |
| 2003/0228007 | A1* | 12/2003 | Kurosaki ................. H04M 3/51 379/142.06 |
| 2005/0008004 | A1* | 1/2005 | Williams ................ H04L 12/66 370/352 |
| 2005/0064851 | A1* | 3/2005 | Malackowski ....... H04M 3/382 455/414.1 |
| 2005/0283443 | A1* | 12/2005 | Hardt .................. H04L 63/0815 705/67 |
| 2006/0251232 | A1* | 11/2006 | Wuthnow ............. H04M 1/578 379/201.01 |
| 2007/0147349 | A1* | 6/2007 | Bangor ............. H04M 3/42068 370/352 |
| 2008/0043954 | A1* | 2/2008 | Newsom ............ G06Q 30/0241 379/142.01 |
| 2008/0046572 | A1* | 2/2008 | Jagels ............... H04L 29/06027 709/227 |
| 2008/0095339 | A1* | 4/2008 | Elliott ...................... H04L 12/14 379/93.01 |
| 2009/0156222 | A1* | 6/2009 | Bender ............... H04L 12/4625 455/445 |
| 2009/0175437 | A1 | 7/2009 | Strandberg et al. |
| 2009/0240803 | A1* | 9/2009 | Iwakawa ............. H04L 65/1046 709/224 |
| 2011/0162051 | A1* | 6/2011 | Li ........................... G06F 21/31 726/5 |
| 2011/0225367 | A1* | 9/2011 | Rajvanshy .......... G06F 12/0866 711/118 |
| 2011/0228919 | A1* | 9/2011 | Tew ........................ H04M 3/38 379/93.12 |
| 2012/0135717 | A1 | 5/2012 | Fiedorowicz et al. |
| 2012/0148040 | A1 | 6/2012 | Desai et al. |
| 2012/0195422 | A1* | 8/2012 | Famous .............. H04M 3/5232 379/265.09 |
| 2013/0094538 | A1* | 4/2013 | Wang ..................... H04B 1/707 375/141 |
| 2013/0315382 | A1 | 11/2013 | Liberman et al. |
| 2015/0112696 | A1* | 4/2015 | Kharraz Tavakol ........................ G06Q 10/06311 705/2 |
| 2015/0326714 | A1 | 11/2015 | Roncoroni et al. |
| 2015/0347777 | A1* | 12/2015 | Gregan ................... G06F 21/31 726/7 |
| 2015/0379293 | A1* | 12/2015 | Wang ..................... G06F 16/27 726/7 |
| 2016/0127555 | A1* | 5/2016 | Hanson ............... H04M 3/5232 455/417 |
| 2016/0267469 | A1* | 9/2016 | Somani ............. G06Q 20/3278 |
| 2016/0285623 | A1* | 9/2016 | Yoon ................... G06F 21/6227 |
| 2017/0070921 | A1* | 3/2017 | Lau .................... H04W 36/0022 |
| 2017/0163503 | A1* | 6/2017 | Black ................. G06Q 10/0639 |
| 2017/0215049 | A1* | 7/2017 | Bhattacharya ...... H04L 45/7453 |
| 2018/0158165 | A1* | 6/2018 | Hodge ................. G06F 16/583 |

OTHER PUBLICATIONS

U.S. Appl. No. 15/385,526, filed Dec. 20, 2016, naming inventors Sumner et al.
Non-Final Office Action from U.S. Appl. No. 15/385,526, dated Sep. 20, 2018 21 pgs.
Response to Office Action dated Sep. 20, 2018, from U.S. Appl. No. 15/385,526, filed Dec. 20, 2018, 19 pp.
Final Office Action from U.S. Appl. No. 15/385,526, dated Jan. 30, 2019, 15 pp.
Notice of Allowance from U.S. Appl. No. 15/385,526, dated Jun. 12, 2019, 14 pp.
Chou et al., "Computer Telephony Integration and its Applications," IEEE Communications Surveys & Tutorials, vol. 3, No. 1, pp. 2-11, First Quarter 2000. (Applicant points out, in accordance with MPEP 609.04(a), that the year of publication, 2000, is sufficiently earlier than the effective U.S. filing date, so that the particular month of publication is not in issue.).
Xu et al., Survivable Virtual Infrastructure Mapping in Virtualized Data Centers, IEEE 5th International Conference on Cloud Computing, Jun. 24-29, 2012, pp. 196-203.
Wang et al., "Voice pharming attack and the trust of VoIP." Proceedings of the 4th international conferene on Security and privacy in communication networks. ACM, Sep. 22-25, 2008, 24 pp.

\* cited by examiner

| CONNECTION ID FIELD 210 | CALL SESSION INFORMATION FIELD 212 |
|---|---|
| CONNID 1 | CALL SESSION INFORMAITON 1 |
| CONNID 2 | CALL SESSION INFORMAITON 1 |
| ... | ... |
| CONNID N | CALL SESSION INFORMAITON N |

FIG. 2B

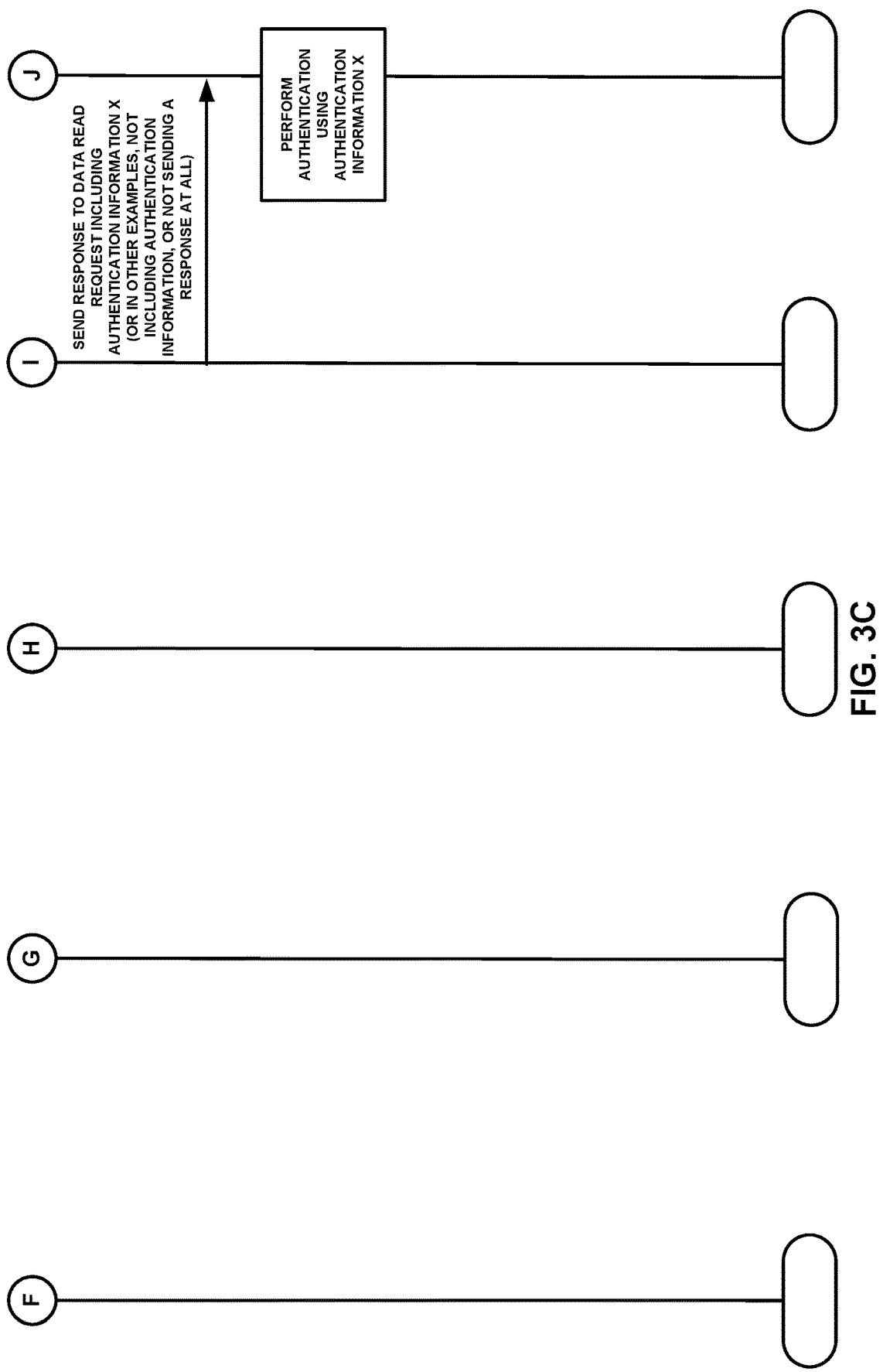

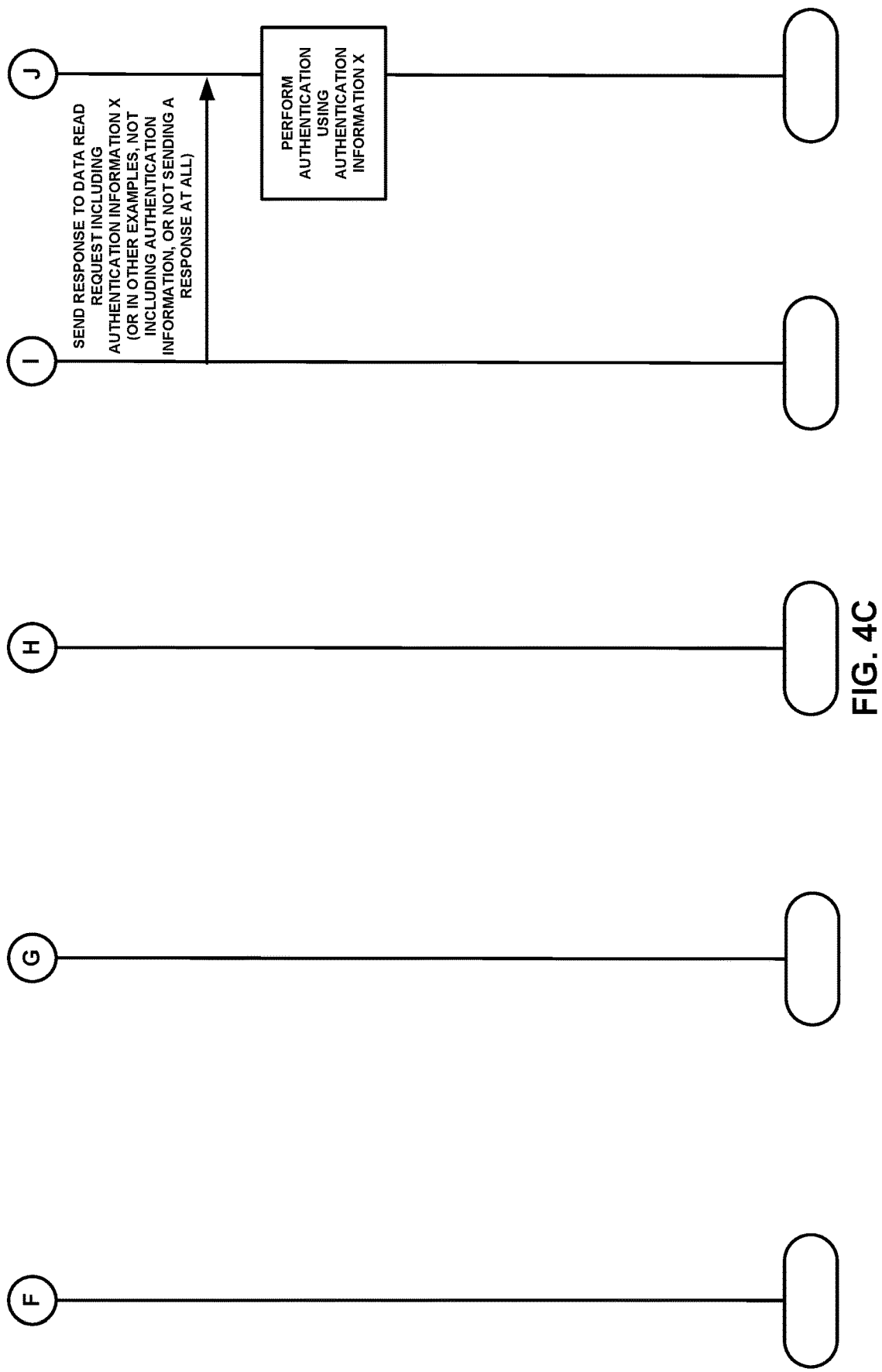

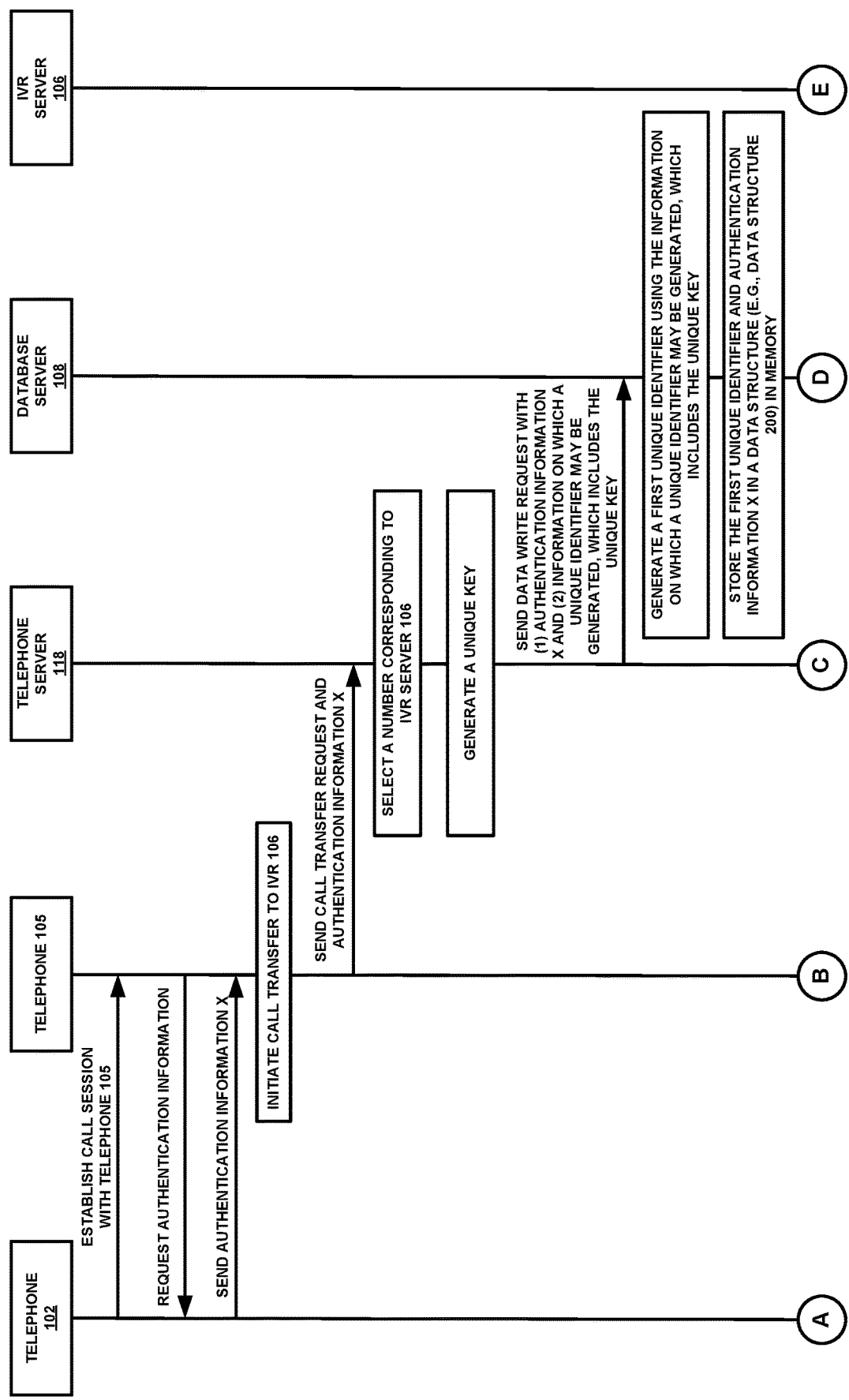

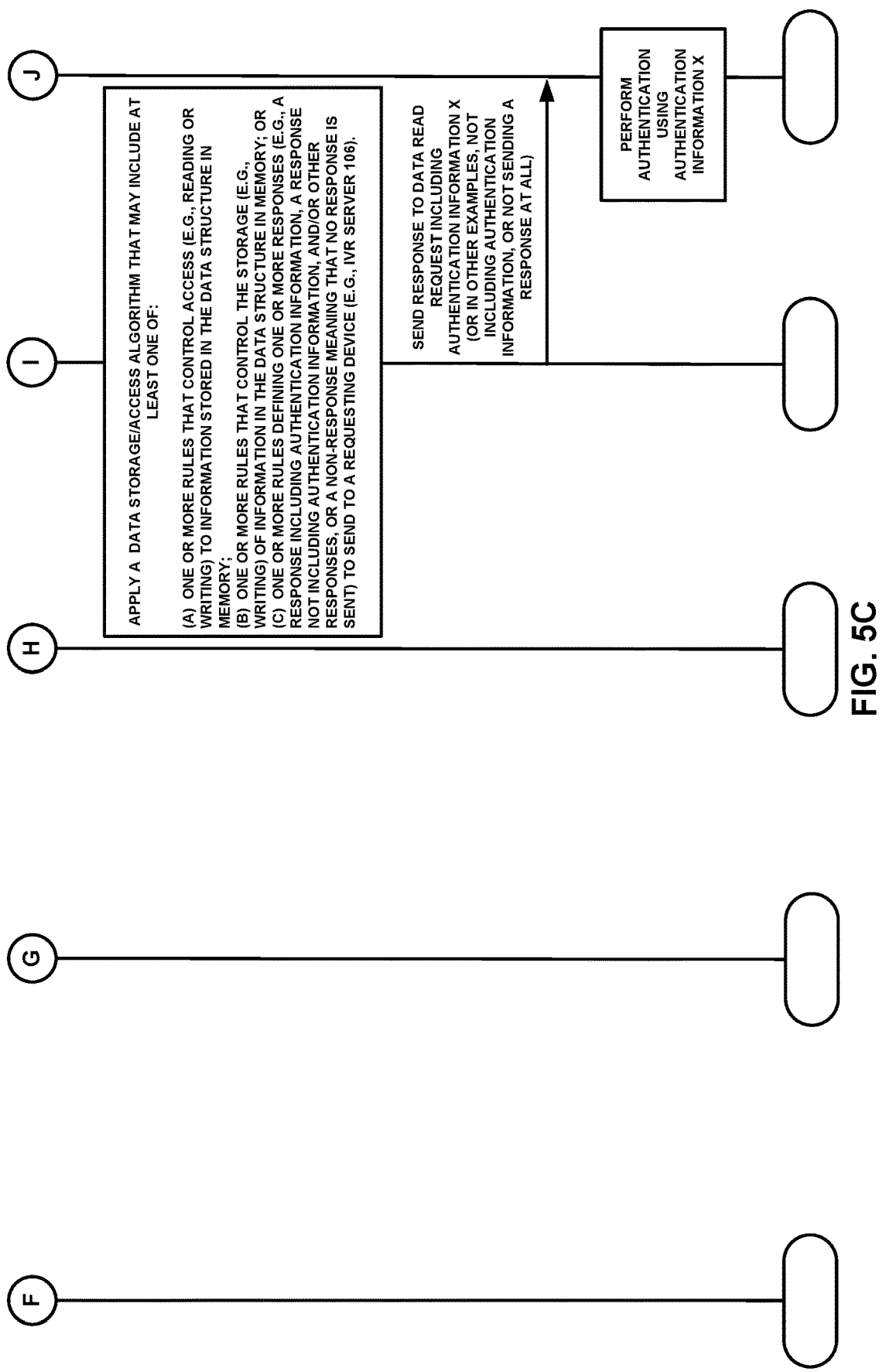

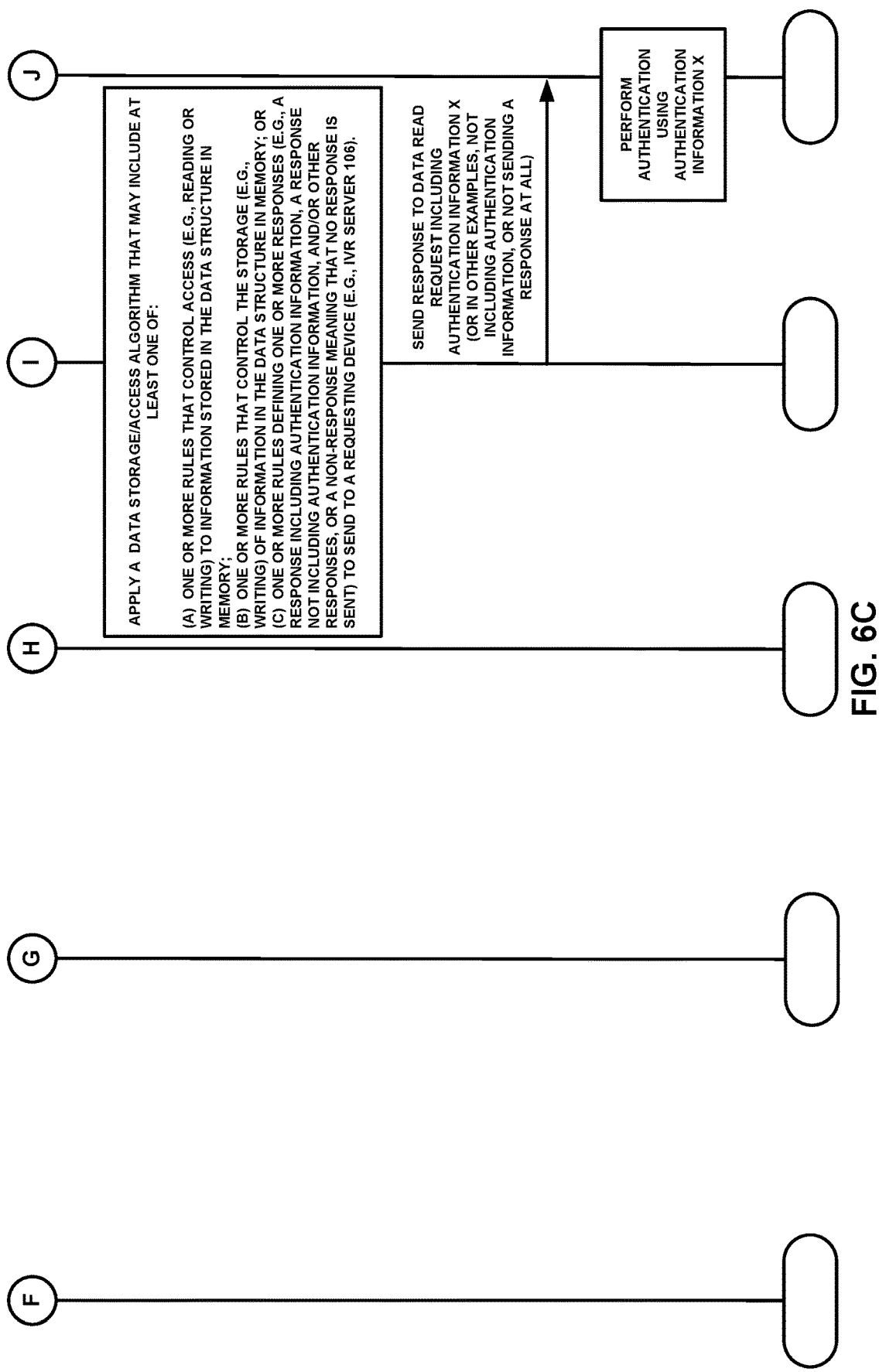

STORING CALL SESSION INFORMATION IN A TELEPHONY SYSTEM

This application claims the benefit of U.S. Provisional Patent Application No. 62/399,287 filed on Sep. 23, 2016, which is hereby incorporated by reference herein in its entirety.

TECHNICAL FIELD

This disclosure relates to telephony systems.

BACKGROUND

Information is received and provided in many ways, such as over a phone call. In some instances, a caller may provide authentication information over a call session. The authentication information may, for example, serve to identify the caller, prove the caller has access rights to certain information, or any other reason for which authentication information may be provided. A caller may be transferred to another call session after having previously provided authentication information, and be required to provide authentication information again on the subsequent call session because the previous call session information is discarded.

SUMMARY

In general, this disclosure describes techniques for storing call session information for use across call sessions in a telephony system. For example, this disclosure describes techniques for storing call session information for use across call sessions during what may appear to be a single call from a caller's perspective in a telephony system. In some examples, call session information used across multiple call sessions may be stored in a database server (e.g., a cache server) or sent directly to other telephony components expected to or known to need the information subsequent to its acquisition over a call session. This disclosure also describes techniques for reducing or removing redundant call flows, interactive voice response (IVR) applications, and/or IVR servers in a telephony system, which may be referred to as enabling componentization of call flows, IVR applications, and/or IVR servers in a telephony system. For example, this disclosure describes techniques for centralizing one or more call flows, one or more IVR applications and/or one or more IVR servers. As another example, this disclosure describes techniques including the centralization of reusable call flows and/or management of call session data, such as by using a database server (e.g., a cache server) to store call session information and enable the reuse of the stored call session information for one or more other call sessions.

In one example, this disclosure describes a method comprising receiving, by a database server, a data write request, wherein the data write request includes authentication information corresponding to a first call session and first additional information; generating, by the database server, a first unique identifier based on the first additional information, wherein the authentication information corresponds to the first unique identifier; and storing the first unique identifier and the authentication information in a data structure in a memory of the database server.

In another example, this disclosure describes a database server comprising a memory; and one or more processing units configured to: receive a data write request, wherein the data write request includes authentication information corresponding to a first call session and first additional information; generate a first unique identifier based on the first additional information, wherein the authentication information corresponds to the first unique identifier; and store the first unique identifier and the authentication information in a data structure in the memory.

In another example, this disclosure describes a non-transitory computer-readable storage medium having instructions stored thereon that, when executed, cause one or more processing units to receive a data write request, wherein the data write request includes authentication information corresponding to a first call session and first additional information; generate a first unique identifier based on the first additional information, wherein the authentication information corresponds to the first unique identifier; and store the first unique identifier and the authentication information in a data structure in a memory accessible by the one or more processing units.

In another example, this disclosure describes a method comprising storing, by a first database server, first call session information in a data structure in a memory of the first database server, wherein the first call session information corresponds to a unique identifier that corresponds to a caller; and replicating the first call session information stored in the data structure in the memory of the first database server to a data structure in a memory of a second database server.

In another example, this disclosure describes a system comprising a first database server having a first memory; and a second database server having a second memory; wherein the first database server is configured to: store first call session information in a data structure in the first memory, wherein the first call session information corresponds to a unique identifier that corresponds to a caller, and replicate the first call session information stored in the data structure in the memory to a data structure in a memory of a second database server.

In another example, this disclosure describes a non-transitory computer-readable storage medium having instructions stored thereon that, when executed, cause one or more processing units to store first call session information in a data structure in a memory of the first database server, wherein the first call session information corresponds to a unique identifier that corresponds to a caller; and replicate the first call session information stored in the data structure in the memory of the first database server to a data structure in a memory of a second database server.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 2B illustrates one example of a data structure in accordance with one or more techniques described herein.

FIGS. 3A-C illustrate an example process flow according to one or more techniques of this disclosure.

FIGS. 4A-C illustrate an example process flow according to one or more techniques of this disclosure.

FIGS. 5A-C illustrate an example process flow according to one or more techniques of this disclosure.

FIGS. 6A-C illustrate an example process flow according to one or more techniques of this disclosure.

DETAILED DESCRIPTION

Figure 1A:
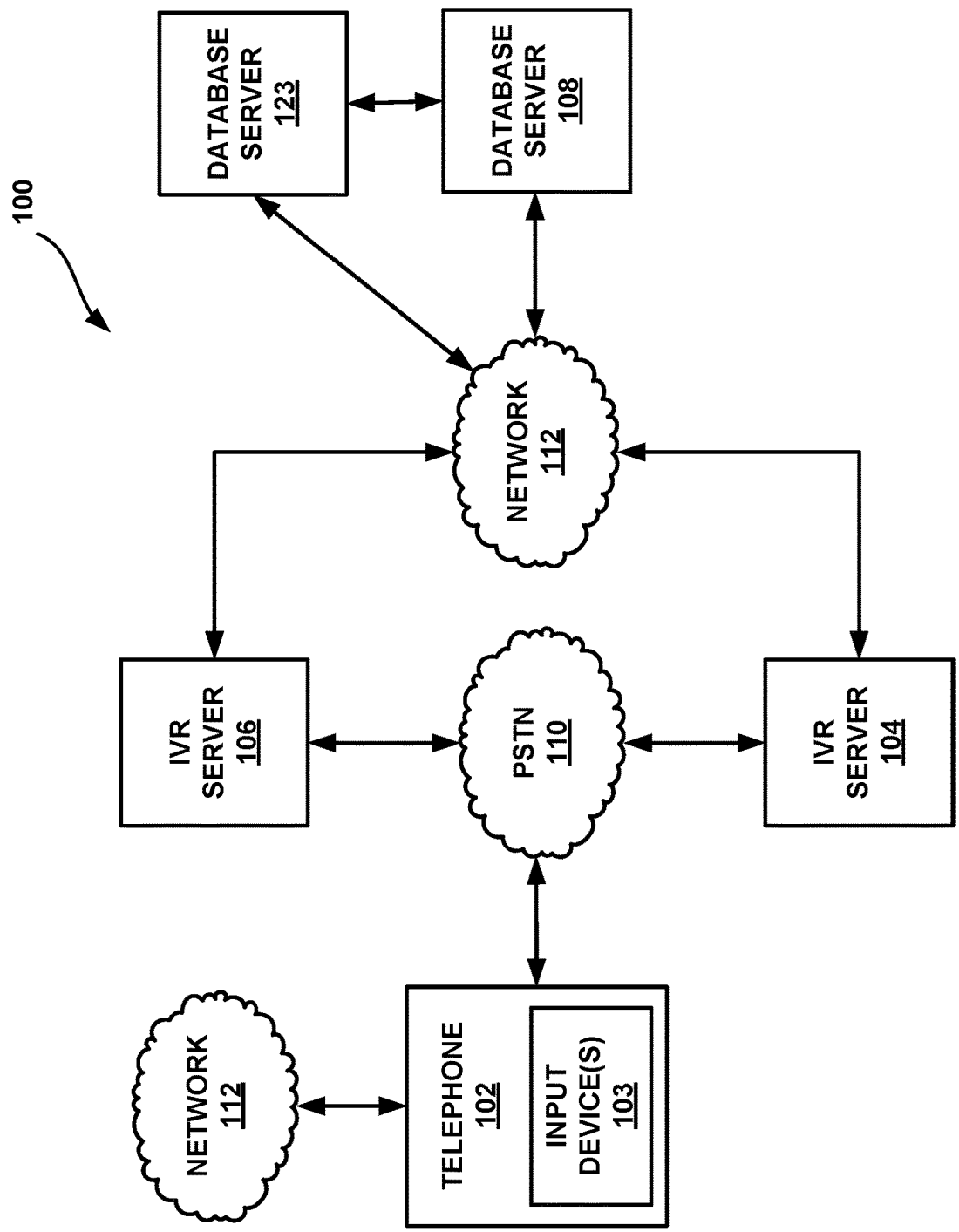
FIG. 1A illustrates one example of telephony system 100 in which one or more techniques described herein may be implemented.

Conventionally, call session information is discarded following termination of the call session over which the call session information may be have been provided or otherwise generated. This is particularly true for call sessions involving IVR servers, meaning that IVR servers are conventionally configured to not store any data acquired over a call session. In general, this disclosure describes techniques for storing call session information for use across call sessions in a telephony system. For example, this disclosure describes techniques for storing call session information for use across call sessions during what may appear to be a single call from a caller's perspective in a telephony system. In some examples, call session information used across multiple call sessions may be stored in a database server (e.g., a cache server) or sent directly to other telephony components expected to or known to need the information subsequent to its acquisition over a call session.

By storing call session information in a database server, the techniques described herein may enable tracking historical activity of a call session as authentication levels change. For example, the database server may store information enabling a person or telephony component to determine which authentication tokens were used and where, whether the customer (e.g., caller) failed on any authentication tokens, and/or the current authentication level of the customer and how the customer got to that particular authentication level, whether via one or more IVR servers or a live operator.

Conventionally, a typical IVR server is not configured to share its functionality with other IVR servers. Therefore, multiple IVR servers in a conventional telephony system may be configured with redundant IVR applications, meaning that two or more IVR servers may each include the same IVR application. This disclosure describes techniques for reducing or removing redundant call flows, IVR applications, and/or IVR servers in a telephony system, which may be referred to as enabling componentization of call flows, IVR applications, and/or IVR servers in a telephony system. For example, this disclosure describes techniques for centralizing one or more call flows, one or more IVR applications and/or one or more IVR servers. As another example, this disclosure describes techniques including the centralization of reusable call flows and/or management of call session data, such as by using a database server (e.g., a cache server) to store call session information and enable the reuse of the stored call session information for one or more other call sessions. The one or more other call sessions may correspond to one or more different IVR applications. Call session information corresponding to a first IVR server and call session corresponding to a centralized IVR server may be stored in a database server (e.g., a cache server) to respectively support subsequent return to the first IVR server once the call flow of the centralized IVR server terminates, and the subsequent authentication of the caller one or more additional times without having to contact the centralized server again and without having to require the caller to re-input authentication information previously input.

For example, multiple IVR applications may support voice biometrics enrollment and authentication, as just two examples of IVR applications. However, instead of having the same voice biometrics enrollment application IVR application and/or the same authentication IVR application available on multiple IVR servers, both of these IVR applications may be centralized by being implemented in a single, centralized IVR server in some examples. The centralized IVR server may be configured to establish call sessions with other IVR servers that do not include an IVR application centralized on the centralized IVR server. For example, another IVR server not configured with an authentication IVR application may call or otherwise be transferred to the centralized IVR server including the authentication IVR application to invoke the authentication IVR application for the caller. In such an example, a caller may be involved in a first call session with a first IVR server. The first IVR server reach a point in the call flow of an IVR application requiring that the caller be identified. The first IVR server may then transfer the caller to centralized IVR server configured to provide the authentication call flow to the caller. The caller may be transferred to the centralized IVR server and a call session may be established over which the authentication call flow may be presented to the caller. Once the authentication call flow is ended, the centralized IVR server may be configured to transfer the caller back to the IVR server that initially transferred (or at least initiated the transfer) to the centralized IVR server.

By storing call session information in a database server, the techniques described herein may enable call session data to be used and/or transferred between two or more IVR servers. As another example, the techniques described herein may enable the securing of call session information, which may include sensitive information, that may not be passed as a Key Valued Pair (KVP) through the telephony system because, for example, the information to be passed is too large or because a KVP may be considered too unsafe. As another example, the techniques described herein may enable just-in-time and/or caller preference pre-loading for an IVR server. An IVR server may be configured to establish a call session with a caller and query a database server (e.g., database server 108 described herein) for any caller preference information stored thereon corresponding to the caller. As described herein, the IVR server may be configured to send a data read request to the database server, which may include a connection ID available from the establishment of the call session and identification of the information sought (e.g., caller preference information).

By storing call session information in a database server, the techniques described herein may enable the reduction of mainframe database queries (e.g., database server 123 described herein). As an example, the techniques described herein may enable the reduction of mainframe banking system calls by providing data across various banking applications resulting in lowering the number of instruction cycles performed by the mainframe. As an example, an IVR server may load information from a mainframe database (e.g., database server 123 described herein) and subsequently transfer the caller to a live operator (e.g., a banker). The techniques described herein enable the IVR server to share the information acquired from the mainframe database to the live operator (e.g., by sending the information acquired from the mainframe database to the database server, which may be accessed by a telephony component being used by the live operator, such as the live operator's telephone or a computing device). As another example, a telephony component being operated by a first live operator (e.g., a first banker) may load information from a mainframe database (e.g., database server 123 described herein) and subsequently transfer the caller to second live operator (e.g., a second banker). The techniques described herein enable the telephony component being operated by the first live operator to share the information acquired from the mainframe database to the second live operator (e.g., by sending the information acquired from the mainframe database to the database server, which may be accessed by a telephony component being used by the second live operator, such as the second live operator's telephone or a computing device).

By storing call session information in a database server, the techniques described herein may enable the sharing of call session information across different telephony platforms (share call session information between a Genesys platform call session and a Cisco platform call session).

By storing call session information in a database server, the techniques described herein may enable fraud determination by being able to track a customer's call session or multiple call sessions.

In some examples, a centralized IVR server may include a single centralized IVR application. In such examples, a telephony system may include multiple centralized IVR servers with each centralized IVR server having a different centralized IVR application. In other examples, a centralized IVR server may include one or more centralized IVR applications. In other examples, a centralized IVR server may include one or more centralized IVR applications and one or more non-centralized IVR applications.

A centralized IVR server may be referred to herein as a shared IVR server because the shared IVR server shares its service(s) with one or more other IVR servers. For example, a shared IVR server may be configured to execute one or more IVR applications for one or more other IVR servers that do not include the one or more IVR applications that the shared IVR server is configured to execute for the one or more other IVR servers.

It is understood that reference to a person being transferred refers to the telephone being used by the person being transferred.

As a more specific example, a particular telephony system may include 50 IVR servers. However, instead of each of the 50 IVR servers being configured to run a first IVR application, the first IVR application may be implemented on a single IVR server among the 50 IVR servers may be configured to run the first IVR application. In other examples, a small subset of the 50 IVR servers may be configured to run the first IVR application. A subset may include two, three, four, five, six, or more IVR servers.

In some examples, reference to call flows and IVR applications may be synonymous or interchangeable. An IVR application may refer to an application in software that may be executed by an IVR server to provide a service corresponding to the application. A service corresponding to an IVR application may refer to a call flow. A call flow is generally that: a call flow. Otherwise described, a call flow may refer to a road map of how a call will be handled during an application. For example, an IVR server may be configured to run an authentication IVR application in which the IVR server running the authentication application may be configured with an authentication call flow for authenticating callers that reach the IVR server running the authentication application. Other examples of applications include telephone banking applications, credit card payment applications, or any other application.

In some examples, an IVR server may be configured to run one or more applications. For example, an IVR server may be configured to run a plurality of applications and process multiple call sessions in parallel. An IVR server may, as described herein, be configured to receive a call by, for example, a caller directly calling the IVR server or being transferred to the IVR server from another telephony component. The IVR server may be configured to determine which application or applications to run for each received call based on call session information, such as the caller's Automatic Number Identification (ANI) received during establishment of the call session (e.g., during the call setup), a Dialed Number Identification Service (DNIS) number received during establishment of the call session (e.g., during the call setup), and/or other information received during establishment of the call session. An IVR server may receive calls from multiple numbers, including DNIS numbers. Therefore, the IVR server may associate different IVR applications with different numbers. For example, a first DNIS number may correspond to a first IVR application (e.g., an authentication IVR application) available on the IVR server, and a second DNIS number may correspond to a second IVR application (e.g., a credit card services IVR application) available on the IVR server. In such an example, if a received call, whether by direct dial or transfer, includes the first DNIS number during establishment of the call session, the IVR server would run the IVR application corresponding to the first DNIS number resulting in the call entering the call flow corresponding to the first IVR application.

In some examples, an IVR server may be a web server or an application server. In some examples, an IVR application may refer to a web application configured to run on an IVR server, which may be a web server.

As used herein, call session information may refer to any call session information. For example, call session information may include a caller's telephone number, which may be referred to as the caller's ANI. Call session information may include the number dialed by the caller, and/or a number to which the caller is transferred. For example, a caller may be transferred to an IVR server via a DNIS number despite the caller never actually dialing the DNIS number since the transfer may, from the caller's perspective occur in the background. Call session information may include any information available or acquired at any phase during the call session, such as call session setup, during the call session, and/or call session termination. For example, a caller may provide authentication information over a call session, which is an example of call session information. Various examples described herein may be described with respect to a specific example of call session information. It is understood that such examples are understood as applying to any call session information as well. For example, many examples are described herein with respect to authentication information; however, such examples are equally applicable to other call session information (e.g., any call session information that is not considered authentication information).

For example, a caller may in the course of calling a company reach an IVR server with a caller preference IVR application that presents a call flow that enables a caller to select certain preferences that he or she desires to be honored for any subsequent call with the company. For example, the caller may select English as his or her preferred language. The techniques described herein include saving the caller's preference in a database server, which may be accessed for use over a subsequent call. For example, the caller may call a number that is associated with a welcoming IVR application that starts with a language selection prompt. The IVR server configured with the welcoming IVR application may be configured to access the database based on a unique identifier corresponding to the caller, and determine based on the information stored in the database server that the caller's language selection is English. The IVR server may be configured to modify the call flow accordingly (e.g., not prompt the caller with the language selection prompt and/or treat the language selection information stored in the database server as responsive to the prompt and proceed in the call flow accordingly).

Various examples described herein may refer to a unique identifier that may be used and/or generated to identify a caller and/or a call session. In such examples, a connection ID, which is typically available during the life of a call session, may be used instead of or in addition to the unique identifier in different examples. However, the unique identifier described herein may add an additional layer of security, such as when third parties are being given access to call session information relative to a company (e.g., a bank) that acquired the call session information from the caller. For example, if only the connection ID is used to access data stored in a database server, spoofing of the connection ID may be considered an unacceptable security risk. By creating a unique identifier as described herein, the risk of spoofing may be significantly reduced or may be prevented entirely depending on the sophistication of the attack. However, the connection ID that is available during the life of a call may be sufficient to key to call session information, such as when the call session information is expected to be accessed by persons or components internal to the company that acquired the information (e.g., a bank). As an example, a database server (e.g., a cache server) may be configured to store call session information keyed to a unique identifier and/or a connection ID. The database server may be configured to receive a data read request from a third party to a company and/or the company. For example, a database server may be configured such that a third party IVR server (e.g., an IVR server outside of a company's control or ownership) may only be allowed to access call session information keyed to a unique identifier whereas the database server may be configured such that an IVR server (or other component) of the company may be allowed access to any call session information keyed to the unique identifier and/or one or more connection IDs corresponding to the caller.

As described above, a call session typically includes a connection ID that is available during the life of the call session. A connection ID may identify the caller, and may be different than the caller's ANI. A connection ID may be platform specific. For example, a caller may have multiple connection IDs in different telephony systems. As an example, a caller may have a first connection ID in a first telephony system (e.g., a Genesys telephony system) and a second connection ID in a second telephony system (e.g., a Cisco telephony system) that may be different from the first connection ID. Various examples described herein may refer to a connection ID that may be used to identify a caller. In such examples, a unique identifier, as described herein, may be used and/or generated instead of or in addition to the connection ID in different examples. In some examples, multiple connection IDs may correspond to the same caller. For example, a first connection ID may correspond to a caller over a first call session and a second connection ID may correspond to a caller over a second call session. The techniques described herein may enable linking different connection IDs corresponding to the same caller in a data structure such that information stored on a database server (e.g., database server 108) keyed to the first connection ID and information stored on the database server keyed to the second connection ID may effectively be keyed to both connection IDs. For example, a data read request sent to the database server may include the first connection ID and identify that authentication information corresponding thereto is requested. The database server may be configured to send authentication information keyed to the first connection ID and, in some examples, authentication keyed to the second connection ID.

As another example, this disclosure describes techniques for storing call session information, such as authentication information, corresponding to a first call session for subsequent use in a second call session. As described herein, multiple call sessions (e.g., first and second call sessions described herein) may appear to the caller as a single call.

However, in other examples, multiple call sessions may be known to the caller. For example, while the examples described herein may generally refer to a second call session with a second telephony component (e.g., a second IVR server) resulting from a call transfer initiated during a first call session with a first telephony component (e.g., a first IVR server), the second call session described herein may result from the first call session terminating without the caller being transferred, and the caller directly calling the second telephony component. It is therefore understood that the storage of information for use across call sessions in a telephony system described herein may refer to any contiguous or seamless implementation (e.g., call transfer implementations or implementations not requiring the caller to dial any subsequent telephony component), non-contiguous or non-seamless implementations (e.g., implementations requiring the caller to dial a subsequent telephony component), or any combination thereof. It is also understood that the examples herein may apply to multiple call sessions, which may include two or more call sessions.

In some examples, storing information corresponding to a first call session for subsequent use in a second call session may prevent information input by a caller during the first call session from having to be input by the caller during the second call session. In such examples, from the caller's perspective, if the caller has to input information previously input during the first call session, the caller is being required to re-input information even though from the perspective of the second call session the information is being input for a first time. As described herein, this can lead to frustration for a caller, particularly in examples where the caller is unaware of the existence of multiple call sessions. For example, the caller may dial a number and reach an IVR server resulting in a call session with the IVR server. The IVR server in turn may transfer the call (or may cause the call to be transferred) to another telephony component (e.g., a telephone or another IVR server) resulting in a second call session (i.e., the call session between the caller's telephone and the telephony component to which the caller's telephone was transferred). From the caller's perspective, this call transfer may occur in a manner such that the caller is unaware that a call transfer ever took place. In such an example, if the telephony component (or a live operator of the telephony component) requests information that the caller previously provided over the first call session, the caller may experience frustration and/or question why information needs to be input again. However, this may be true even in examples where the caller is aware of the existence of multiple call sessions, such as when the caller is aware that a call transfer occurred. Even in these examples, the caller may experience frustration and/or question why information needs to be input again.

In other examples, storing information (e.g., authentication information) corresponding to a first call session for subsequent use in a second call session may reduce the amount of information (e.g., authentication information) input by a caller during the first call session that needs to be input (e.g., re-input from the caller's perspective) by the caller during the second call session.

As used herein, the term "call session" may refer to a call session between two or more telephony components (e.g., telephones, telephone servers, or any other telephony component). For example, when a call session is established between a caller's telephone and a first IVR server and the caller's telephone is subsequently transferred to a second IVR server, this situation is generally described as including two call sessions: the first call session being between the caller's telephone and the first IVR server, and the second call session being between the caller's telephone and the second IVR server. However, it is understood that, in some examples, different nomenclature may be used to describe the multiple call sessions. For example, it may be understood that there is a single call session involving multiple components at different periods of time. In such an example, the single call session in the example above may include a connection between the caller's telephone and the first IVR server during a first period of time, and another connection between the caller's telephone and the second IVR server during a second period of time over the same call session. It is therefore understood that to the extent different nomenclature may be used to describe what is described herein (e.g., call sessions, call transfers, or any feature, step, process, component, telephone, server, and the like described herein), examples that may be described with such different nomenclature—even if the different nomenclature carries different technical meaning—are within the scope of this disclosure. Otherwise described, the techniques described herein are not limited to the examples set forth herein. As another example, some functionality may be described herein as relating to a single component in some examples, but other examples may include the functionality described with respect to that single component as being distributed across more than one component. For example, a first and second function described with respect to a telephone server also encompasses implementations in which two telephony components are used to perform the described functions, such as a first telephone server to perform the first function and a second telephone server to perform the second function.

In some examples, the first call session may correspond to a call session with a first interactive voice response (IVR) server, and the second call session may correspond to a call session with a second IVR server. In such examples, the first IVR server and the second IVR server may each require the caller to be authenticated. For example, the caller may input authentication information over the first call session with the first IVR server, and subsequently be transferred to the second IVR server (e.g., the first IVR server may initiate a call transfer to the second IVR server). Conventionally, the caller may provide the same authentication information to the second IVR server that was provided to the first IVR server, which may also be referred to as requiring the caller to re-authenticate.

In accordance with the techniques described in this disclosure, the second IVR server may be configured to re-authenticate the caller without requiring the caller to provide authentication information to the second IVR server that was provided to the first IVR server. In such examples, the first IVR may be configured to cause the authentication information input by the caller during the first call session with the first IVR server to be stored on a database server. The database server may be configured to store the authentication information along with a unique identifier in a data structure to uniquely key the authentication information to the caller. The database server may be configured to generate the unique identifier based on any information that may be used to uniquely identify the caller and/or a particular call session. For example, the unique identifier generated may include a number (e.g., a toll-free number, such as one selected by a Dialed Number Identification Service (DNIS) from a pool of toll-free numbers) used to access the second IVR server and the caller's Automatic Number Identification (ANI) (e.g., the telephone number of the caller's telephone). It is therefore understood that the unique identifier may, in some examples, uniquely identify the caller and/or a particular call session. For example, in examples where the unique identifier may be generated based on the caller's ANI and a number (e.g., a DNIS number) corresponding to a telephony component to which the caller is being transferred, the unique identifier may be described as uniquely identifying the caller over the transferred call session.

As described herein, the number used to access an IVR server via a transfer may refer to the number to which the caller's telephone is transferred, but does not imply that the caller's telephone dialed the number. For example, as described herein, a first IVR server, a telephone server, or another telephony component may transfer the caller's telephone to the second IVR server (or another telephone in other examples) from a first call session with the first IVR (or another telephone in other examples) using the number, which may be a number selected from a pool of numbers by, for example, a Dialed Number Identification Service.

The second IVR server may be configured to request authentication information stored on the database by, for example, issuing a data read request to the database server. In some examples, the data read request may include the same information based on which the unique identifier was generated (e.g., the same information based on which the database server generated the unique identifier). In other examples, the data read request may include the unique identifier. In such examples, the second IVR server may be configured to receive the unique identifier during the call transfer from the first IVR server (or another telephony component performing the call transfer in other examples), or may receive the same information based on which the unique identifier was generated by the database server from the first IVR server (or another telephony component performing the call transfer in other examples) and may be configured to generate the unique identifier using the same information which would result in the same unique identifier being generated. In some examples, the database server may receive the data read request, and generate a unique identifier to determine what authentication information should be retrieved and provided to the second IVR server. In other examples, the data read request may include the unique identifier, which the database server may receive and use to determine what authentication information should be retrieved and provided to the second IVR server. In any of these examples, the second IVR server is enabled to re-authenticate the caller without requiring the caller to input authentication information previously provided during the first call session with the first IVR server. It is therefore understood that examples described herein with respect to the unique identifier may apply to any example in which the unique identifier is generated, transferred, and/or used in the telephony system, even if some examples described herein refer to one example in particular.

It is understood that the term "re-authentication" does not imply that the IVR server (e.g., the second IVR server in the examples above) performing the re-authentication had authenticated the caller a first time. Instead, the term "re-authentication" may refer to the caller's perspective of having to be re-authenticated in one or more subsequent call sessions despite having previously been authenticated a first time during a previous call session. As described above, the multiple call sessions may appear to the caller as a single call even though the caller may be transferred to one or more different telephony components. It is also understood that a caller may not understand the need for re-authentication since the call transfer (or multiple call transfers in examples where the caller is transferred to more than one telephony component, one or more of such telephony components to which the caller's telephone has been transferred being configured to request information from a database server that stores information from one or more previous call session) may occur seamlessly from the caller's perspective. In this regard, the caller may be left confused as to why authentication information, which some callers may consider highly sensitive, needs to be provided a second time. Accordingly, the techniques described herein may enable an enhanced caller experience.

In other examples, the caller may opt-out of using the first IVR server to speak with a live operator (e.g., a bank agent, a customer support representative, or any person in any role) or otherwise directly call a live operator. In such examples, the first call session may correspond to a call session with a live operator (i.e., the live operator's telephone), and a second call session may correspond to a call session with an IVR server. Conventionally, the caller may be required to authenticate himself or herself over both the first call session and the second call session. For example, the caller may input or otherwise provide authentication information over the first call session with the live operator, and subsequently be transferred to the IVR server (e.g., the live operator may initiate a call transfer to the IVR server). In one example, the caller may be required to provide the same authentication information to the IVR server that was provided to the live operator, which may also be referred to as requiring the caller to re-authenticate.

In accordance with the techniques of this disclosure, the IVR server may be configured to re-authenticate the caller without requiring the caller to provide authentication information to the IVR server that was provided to the live operator. In such examples, the live operator may compare the authentication information provided by the caller over the first call session to caller information presented to the live operator via a telephony application (e.g., a customer information view application) to authenticate the caller (e.g., confirm the identity of the caller). Otherwise stated, the live operator of a telephone with which the caller's telephone has an established call session may be able to reference information using the telephone (or a computing device different from the telephone) in communication with a server storing the information being referenced. For example, the telephone or the computing device from the telephone may be in communication with a first database server (e.g., a datacenter) that stores customer information. For example, the caller may call a live operator at a bank. The live operator may request that the caller provide authentication information. The live operator may be operating a computing device that displays caller information (which may be referred to as customer information since caller and customer may be synonymous). The live operator may confirm that the authentication information provided by the caller (e.g., phone number, last name, account number, last four digits of Social Security Number, address, and/or any other identifying information) matches caller information presented to the live operator via, for example, a telephony application executing on or otherwise accessed by the computing device.

In accordance with the techniques described herein, the authentication information provided by the caller to the live operator may be sent to a second database server, such as database server 108 described herein, for storage. In some examples, the authentication information transmitted to the live operator's telephone from the caller's telephone may be sent to the second database server. In other examples, the live operator may cause his or telephone or computer accessing the authentication information on the first database server to send the information to the second database server for storage. For example, the live operator's telephone or other computing device may send a data write request to the second database server with the authentication information. As another example, the live operator's telephone or other computing device may send a request to the first database server that causes the first database server to send a data write request to the second database server with the authentication information stored on the first database server.

As another example, the first call session may correspond to a call session with a first IVR server, a second call session may correspond to a call session with a live operator (i.e., the live operator's telephone), and a third call session may correspond to a second IVR server. Conventionally, the caller may be required to authenticate himself or herself over both the second call session and the third call session, and even perhaps the first call session in some examples. For example, the caller may input or otherwise provide authentication information over the first call session with the first IVR, subsequently be transferred to the live operator, and subsequently be transferred to the second IVR server (e.g., the live operator may initiate a call transfer to the IVR server). In one example, the caller may be required to provide the same authentication information to the first IVR server, the live operator, and the second IVR server that was provided to the first IVR, which may also be referred to as requiring the caller to re-authenticate.

In accordance with the techniques of this disclosure, the IVR server may be configured to re-authenticate the caller without requiring the caller to provide authentication information to the IVR server that was provided to the live operator. In such examples, the live operator may compare the authentication information provided by the caller over the first call session to caller information presented to the live operator via a telephony application (e.g., a customer information view application) to authenticate the caller (e.g., confirm the identity of the caller). For example, the caller may call a live operator at a bank. The live operator may request that the caller provide authentication information. The live operator may be operating a computing device that displays caller information. The live operator may confirm that the authentication information provided by the caller (e.g., phone number, last name, account number, last four digits of Social Security Number, address, and/or any other identifying information) matches caller information presented to the live operator via a telephony application executing on or otherwise accessed by the computing device.

In such examples, the authentication information input by the caller during the first call session with the live operator may be stored on a database server, or authentication information matching the information input by the caller during the first call session with the live operator may be stored on the database server. The database server may be configured to store the authentication information along with a unique identifier to uniquely key the authentication information to the caller. The unique identifier may include any information to uniquely identify the caller and/or a particular call session. For example, the unique identifier generated by the database server may include a number (e.g., a toll-free number) used to access the IVR server and the caller's Automatic Number Identification (ANI). The IVR server may be configured to request authentication information stored on the database by, for example, issuing a data read request to the database server. The data read request may include the same information based on which the unique identifier was generated (e.g., the same information based on which the database server generated the unique identifier). In other examples, the data read request may include the unique identifier. In such examples, the IVR server may be configured to receive the unique identifier during the call transfer from the live operator (or another telephony component performing the call transfer in other examples), or may receive the same information based on which the unique identifier was generated by the database server from the live operator (or another telephony component performing the call transfer in other examples) and may be configured to generate the unique identifier using the same information which would result in the same unique identifier being generated. In some examples, the database server may receive the data read request, and generate a unique identifier to determine what authentication information should be retrieved and provided to the IVR server. In other examples, the data read request may include the unique identifier, which the database server may receive and use to determine what authentication information should be retrieved and provided to the IVR server. In any of these examples, the IVR server is enabled to re-authenticate the caller without requiring the caller to input authentication information previously provided during the first call session with the live operator.

As another example, the unique identifier may include a number (e.g., a toll-free number) used to access the IVR server and a generated key. In such an example, while the caller may be transferred by the live operator to the IVR server, the caller's ANI may not be included or otherwise provided during the call setup and/or call session with the IVR server. For example, from the perspective of the IVR server, the IVR server may receive a transferred call, but the transferred call may not include the caller's ANI for one or more reasons (e.g., due to system implementation details). Accordingly, in examples where the caller's ANI is not provided to the IVR server during the call setup and/or call session following the transfer from the live operator, a key may be generated. The key may be generated by a telephone server. The telephone server may be configured to initiate a conference call (e.g., a bridge) with the IVR server, which the telephone server may use to communicate the generated key to the IVR server. In some examples, the telephone server may be configured to initiate a conference call with the IVR server and use touchtone codes for sending each value (e.g., number) of the generated key. In some examples, the generated key may be a 10-digit (e.g., 10-number) long key. Once the key is delivered to the IVR server, the telephone server 118 may terminate the conference call resulting in a remaining call session between the telephone transferred to the IVR server and the IVR server. The CMA data services may refer to one example of a caching service that may be configured to run on database server 108. The inclusion of Verizon in FIG. 17 also represents one example telephony network that may be used to transfer data from telephone server 118 to the IVR server (e.g., a third party IVR server, such as the Epsilon IVR server shown in the example of FIG. 17).

Figure 17:
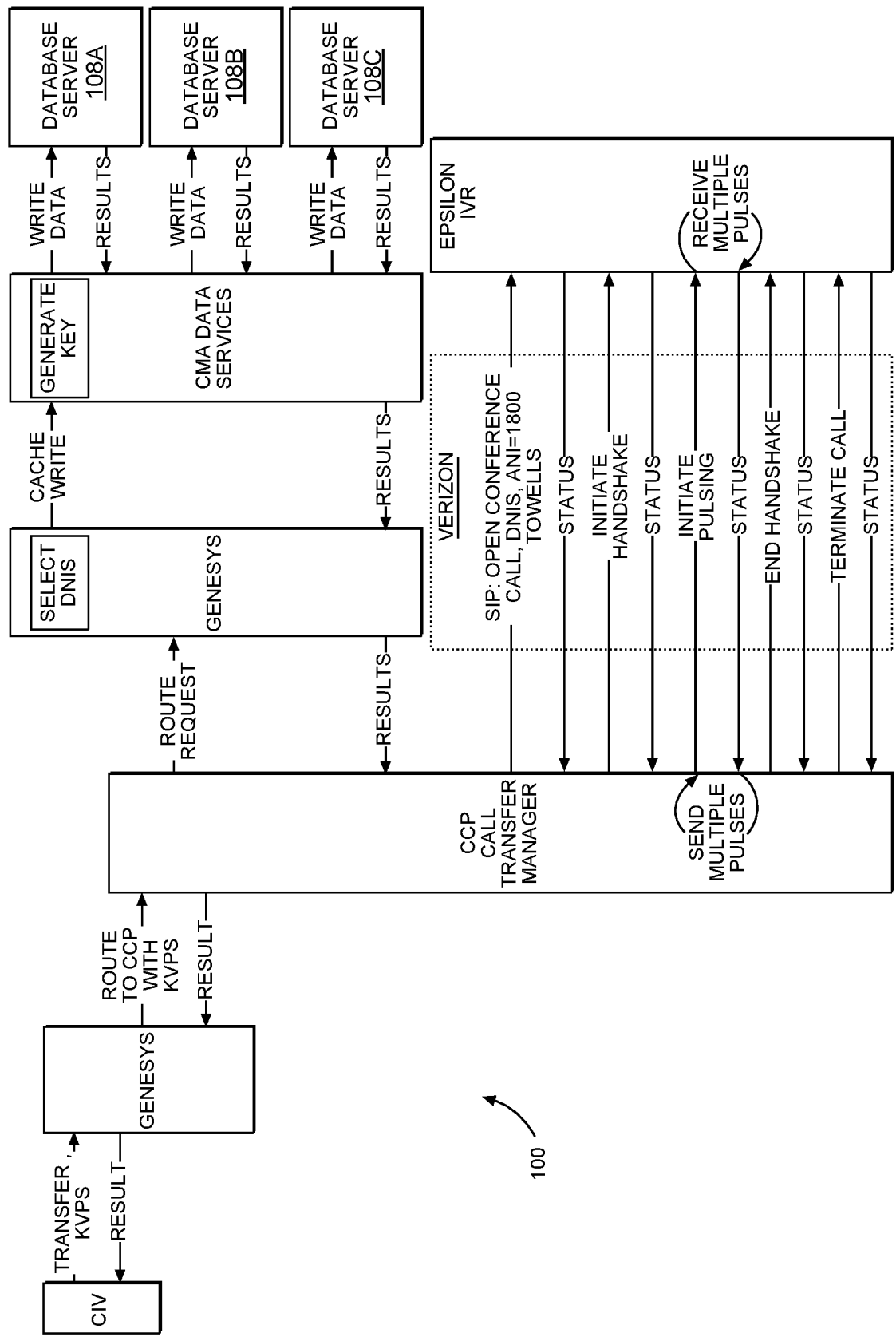
FIG. 17 illustrates an example of storing call session information according to one or more techniques of this disclosure.

As another example, FIG. 17 shows a Customer View Application (CIV), which may be running on a caller's telephone and may be configured to transfer call session information to telephone server 118 (FIG. 17 depicts one example of telephone server 118 as a Genesys telephone server). In some examples, the flow illustrated in FIG. 17 may refer to a call transfer from a telephone with an established call session with a live operator to an IVR server such that after the transfer the telephone has an established call session with the IVR server. Telephone server 118 may transfer the call session information to a call transfer manager. The call transfer manager may be an application running on the telephone server 118 or may be another telephone server different from telephone server 118. To route the call to an IVR server, the telephone server 118 (e.g., again shown as a Genesys telephone server in this example) may select a DNIS number and also generate a key. In some examples, the generated key may be generated randomly. The generated key may be sent to the telephony device to which the caller is being transferred. In some examples, the generated key may be pulsed to the IVR server via a conference call. Telephone server 118 may be configured to send a data write request to one or more database servers, such as multiple database servers 108 (e.g., database server 108A, database server 108B, and/or database server 108C), with the selected DNIS number (i.e., the number to which the telephone is being, will be, or has been transferred and which corresponds to the IVR server to which the call is being transferred).

It is therefore understood that the database server may be configured to generate a unique identifier in different ways. In some examples, the database server may be configured to generate a unique identifier based on the caller's ANI and the number used to access the IVR server. In other examples, the database server may be configured to generate a unique identifier based on a generated key corresponding to the caller that is received by the IVR server over a conference call and the number used to access the IVR server.

As used herein, the term "telephone" may refer to any type of telephone or computing device configured for telecommunication. For example, "telephone" may refer to any Plain Old Telephone System (POTS) telephone, an Integrated Services Digital Network (ISDN) telephone, a cellular telephone, a voice over Internet Protocol (VOIP) telephone, or any telephone or computing device configured to communicate over one or more communication networks, such as the Public Switched Telephone Network (PSTN), the Internet, and/or a cellular network. As another example, "telephone" may refer to any analog telephone or any digital telephone. A digital telephone may refer to any computing device configured to communicate over any digital network, such as the Internet. An analog telephone may refer to any telephone configured to communicate over the PSTN.

Any telephone described herein may include one or more input devices. For example, a telephone may include one or more of the following input devices: an audio transducer (e.g., a microphone), a touch screen display, one or more hard keys, one or more biometric scanners, and/or any other input device. In some examples, one or more hard keys may correspond to one or more touchtone dialing keys. In some examples, the telephone may be configured to present one or more soft keys on the touch screen display for interaction with the caller. For example, a smartphone may not include any hard keys, but may include soft keys designed to mimic a physical 0-9 touchtone dialing keypad. Accordingly, as used herein, a caller may provide information to an IVR server or a live operator using any single input device or any combination of input devices of a telephone. Any information described herein as being input or otherwise provided by a caller may be input or otherwise provided by the caller via one or more input devices of a telephone. For example, a caller may provide information using his or her voice (e.g., the user may state his or her name, address, phone number, account number, passcode, or any other information such as authentication information). In such an example, a caller may respond to a prompt from an IVR server using his or her voice. As another example, a caller may respond to an IVR server prompt by using a biometric scanner (e.g., a fingerprint scanner) to provide biometric information (e.g., a fingerprint) to the IVR server.

As used herein, the term "caller" refers to a person, customer, or the like that is using a telephone. For example, it is understood that the term "caller" implies a corresponding telephone. As an example, reference to transferring a caller to an IVR server also refers to routing a telephone of the caller to the IVR server.

As used herein, "interactive voice response (IVR)" may be interchangeable with "interactive voice and video response (IVVR)." For example, reference to an IVR server may also include reference to an IVVR server. Similarly, reference to an IVVR server may also include reference to an IVR server. An IVR server may be configured to provide one or more IVR services. An IVR server may be configured to provide information to a caller, and the information (e.g., input prompts and/or information) provided to the caller may depend on the IVR service. For example, a banking IVR service may request the caller's bank account number and authentication information. Once the caller is authenticated, the IVR server may provide information to the caller concerning the caller's account (e.g., saving account balance, checking account balance, credit card balance, and the like). The information provided to the caller may include one or more input prompts. The order in which input prompts are presented to the caller may be based on an IVR input prompt tree and a caller's response to one or more input prompts. The one or more or more input prompts may include one or more requests for information and/or one or more telephony menus, with each telephony menu having one or more different input options (e.g., press "1" for English or press "2" for Spanish would be a telephony menu having two input options). Each telephony menu may include one or more telephony sub-menus. An IVR server may be configured to receive input information from a caller's telephone and process the input information. Processing input information received from a caller's telephone may result in one or more results. For example, the IVR server may provide one or more subsequent input prompts, may initiate a call transfer, or perform any action based on information input to the IVR server via the caller's telephone.

FIG. 1A illustrates one example of telephony system 100 in which one or more techniques described herein may be implemented. The example of telephony system 100 illustrated in FIG. 1A includes a telephone 102, a first IVR server 104, a second IVR server 106, a database server 108, and a database server 123. Telephone 102 may be configured to access the first IVR server 104 and/or the second IVR server 106 through PSTN 110 and/or network 112. Network 112 may be any network different from PSTN 110, such as the internet, a local area network, a wide area network, a private data network (e.g., a company's internal data network), any data network, or any combination thereof. For example, network 112 may represent a private data network and the internet. In such an example, it is understood that one or more components shown as being connected to network 112 may be configured such they are connected only to the private data network, only to the internet, or both. In is therefore understood that depiction of network 112 with a single cloud does not imply the components that are shown as being connected to network 112 may not be connected to a plurality of networks because network 112 represents one or more networks, and the one or more networks network 112 represents may differ depending on the example and the component shown as being connected to it. As another example, database server 123 may only be accessible via a private data network whereas database server 108 may be accessible by both the internet and the private data network. For example, network 112 may represent a private data network for telephone 102 in one example (or the internet in another example), and network 112 may represent the internet for IVR servers 104 and 106. In some examples, IVR server 104, database server 108, and database server 123 may correspond to telephony components of a first company, and IVR server 106 may correspond to a second company (i.e., constitute a third party IVR server relative to the first company).

Database server 108 may be a server with a memory configured to store information. In some examples, database server may be referred to as a cache server, a web server, or any other server configured with a memory configured to store information. Database server 108 may be single database or represent two or more distributed database servers 108. Similarly, database server 123 may also be a server with a memory configured to store information. Database server 123 may be single database or represent two or more distributed database servers 123. In some examples, database server 108 may be a cache server and database server 123 may not be cache server. In such examples, database server 123 may be referred to a persistent storage server, a datacenter, or the like. Database server 108 may be configured to perform one or more caching operations, such as replicating cached data to one or more other database servers 108, invalidating cached data according to a data storage/access algorithm, controlling access to cached data according to a data storage/access algorithm, or any other cache operation. Database server 123 may be configured to read and write information from database server 108. In some examples, database server 108 may be configured to control any component's access to read information from and/or write information to its memory, including, for example, database server 123, any IVR server (e.g., IVR server 104 and/or IVR server 106), or any other telephony system component.

Telephone 102 may include one or more input devices 103, which may include one or more of the following: an audio transducer (e.g., a microphone), a touch screen display, one or more hard keys, one or more biometric scanners, and/or any other input device (e.g., a keyboard and/or a mouse in an example where telephone 102 is a computer). For example, telephone 102 may be configured to present a graphical user interface (GUI) on a touch screen display. The GUI may include one or more soft keys that the caller may interact with (e.g., provide input with) by using the touch screen display.

It is understood that there are many different telephony system configurations. Therefore, the example of telephony system 100 shown in FIG. 1A is for illustration purposes only, meaning that other examples of telephony system 100 may include more components or less components. As one example, telephony system 100 may include one or more network gateway devices for connecting different components in different networks together (e.g., an IVR server may connect to the PSTN via a PSTN gateway server), one or more telephone servers for routing calls, and one or more other telephony and/or non-telephony components. The techniques of this disclosure may apply to any telephony system configuration.

Figure 1B:
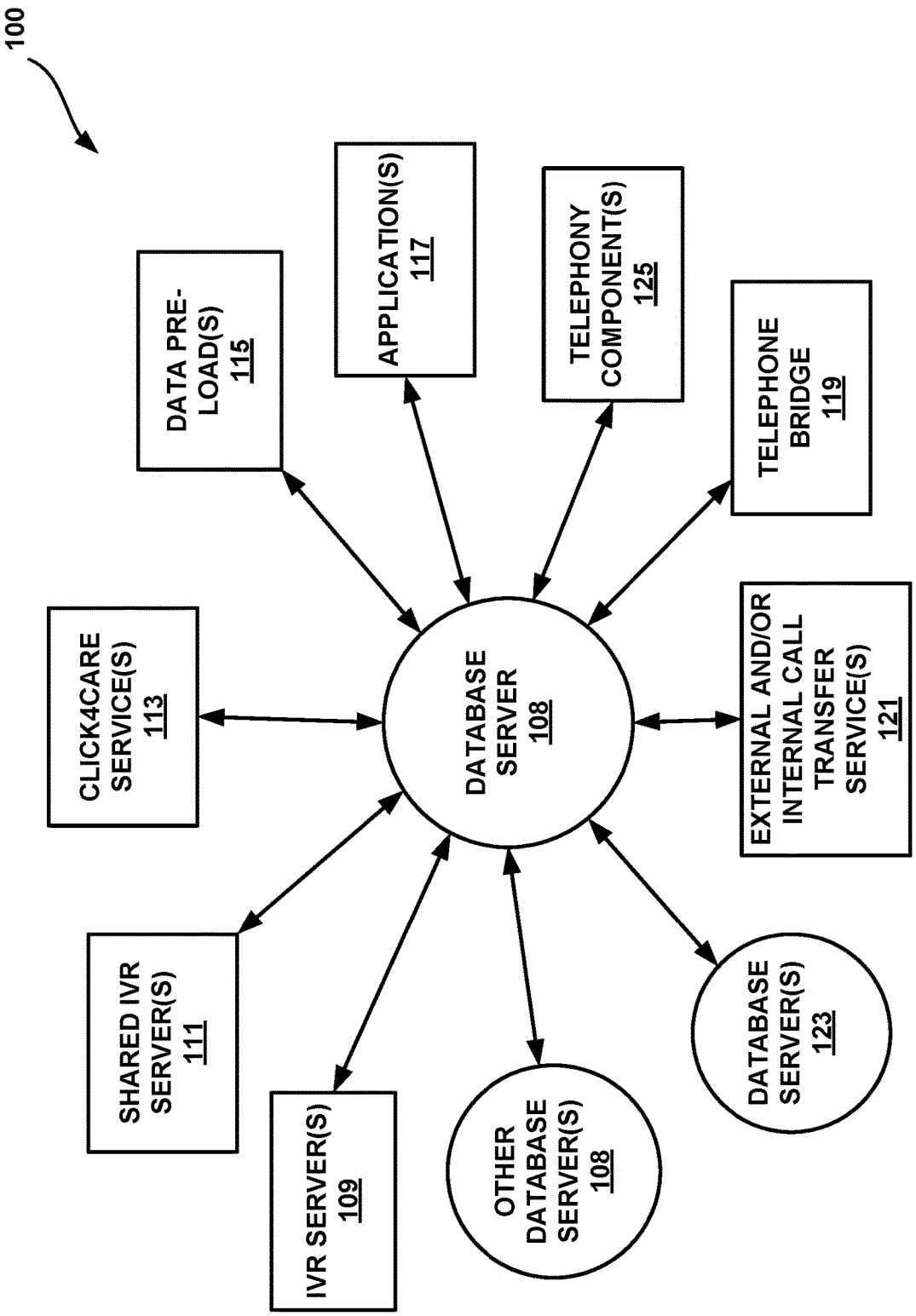
FIG. 1B illustrates one example of telephony system 100 in which one or more techniques described herein may be implemented.
Figure 1C:
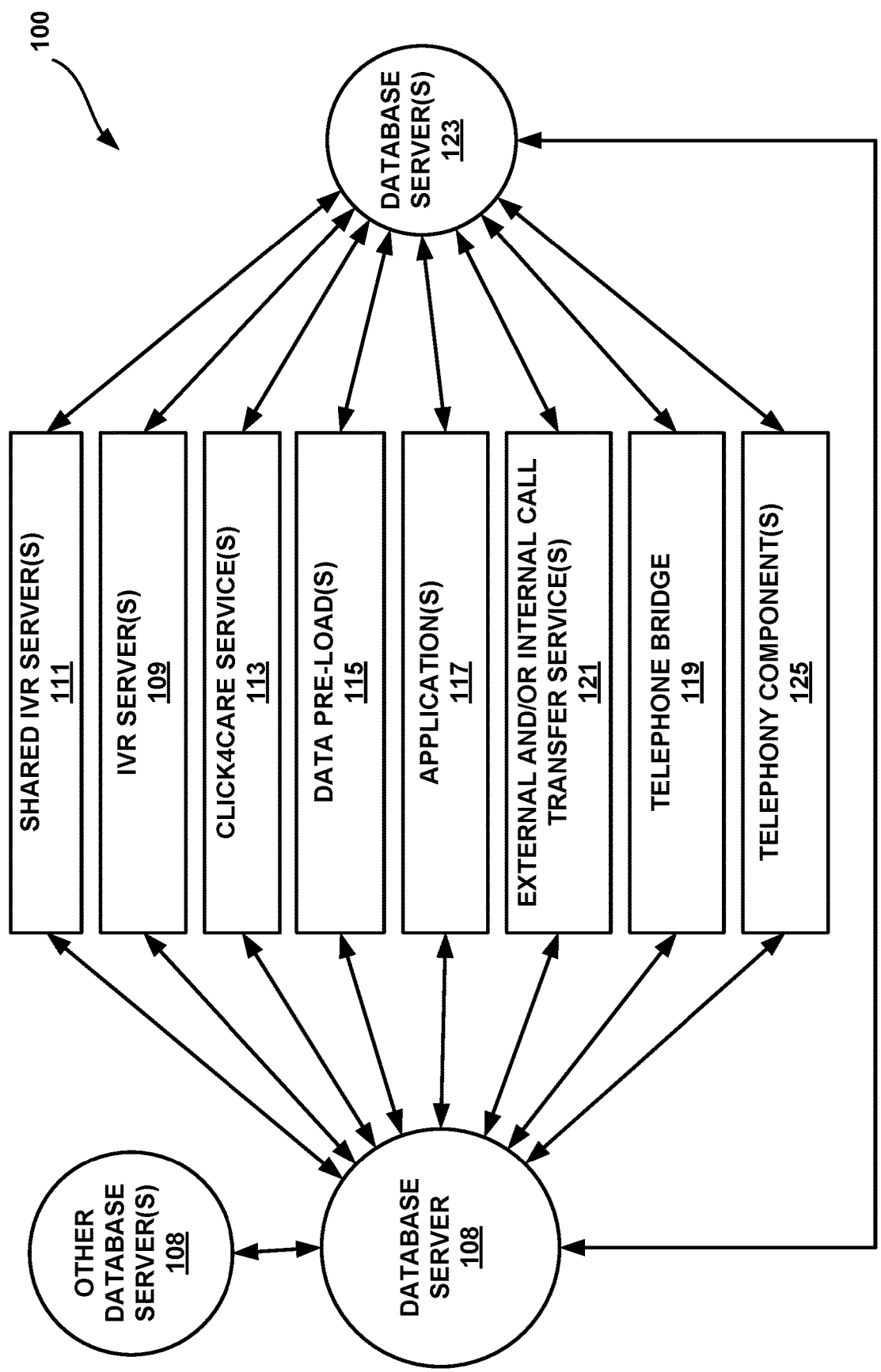
FIG. 1C illustrates one example of telephony system 100 in which one or more techniques described herein may be implemented.

For example, FIG. 1B illustrates another example of telephony system 100 in which one or more techniques described herein may be implemented. The example of telephony system 100 illustrated in FIG. 1B shows that database server 108 may be communicatively coupled, whether directly or indirectly, to one or more network components via a wired connection, wireless connection, and/or a connection over a network, such as network 112 depicted in FIG. 1A. FIG. 1B does not infer that the one or more network components do not include other connections. For example, FIG. 1C illustrates that one or more network components of any telephony system 100 may be connected to database server 108 and/or database server 123. In the example of FIG. 1C, many connections are shown; however, one or connections may not exist in other examples. Other examples of telephony system 100 may include more components or less components.

In both FIGS. 1B and 1C, the following components are illustrated: one or more shared IVR servers 111 (which may include IVR server 104 and/or IVR server 106 in some examples), one or more IVR servers 109 (which may include IVR server 104 and/or IVR server 106 in some examples), telephone bridge 119, and one or more telephony components 125. One or more telephony components 125 may be any telephone, computing device, network device, network server, or the like. In some examples, one or more telephony components 125 may be configured to perform one or more Click4Care services 113, perform one or more pre-loads 115 (e.g., an IVR server may be configured to read data from database server 108 and/or database server 123 upon establishing a call to pre-load the call flow with information, such as the caller's preferences), execute one or more applications 117 (e.g., any application that may use or generate information for a call session, any application that may use or generate information during a call session, or any application), and/or one or more external and/or internal call transfer services 121. One example of an application 117 may include customer information view application, which may be configured to cause information relating to a customer to be displayed to a person (e.g., a live operator of a call session).

In both FIGS. 1B and 1C, each component may be configured to read and/or write call session information respectively to and/or from database server 108 using a data read request and/or a data write request. Database server 108 may be configured to read and/or write call session information respectively to and/or from database server 123 using a data read request and/or a data write request.

Figure 2A:
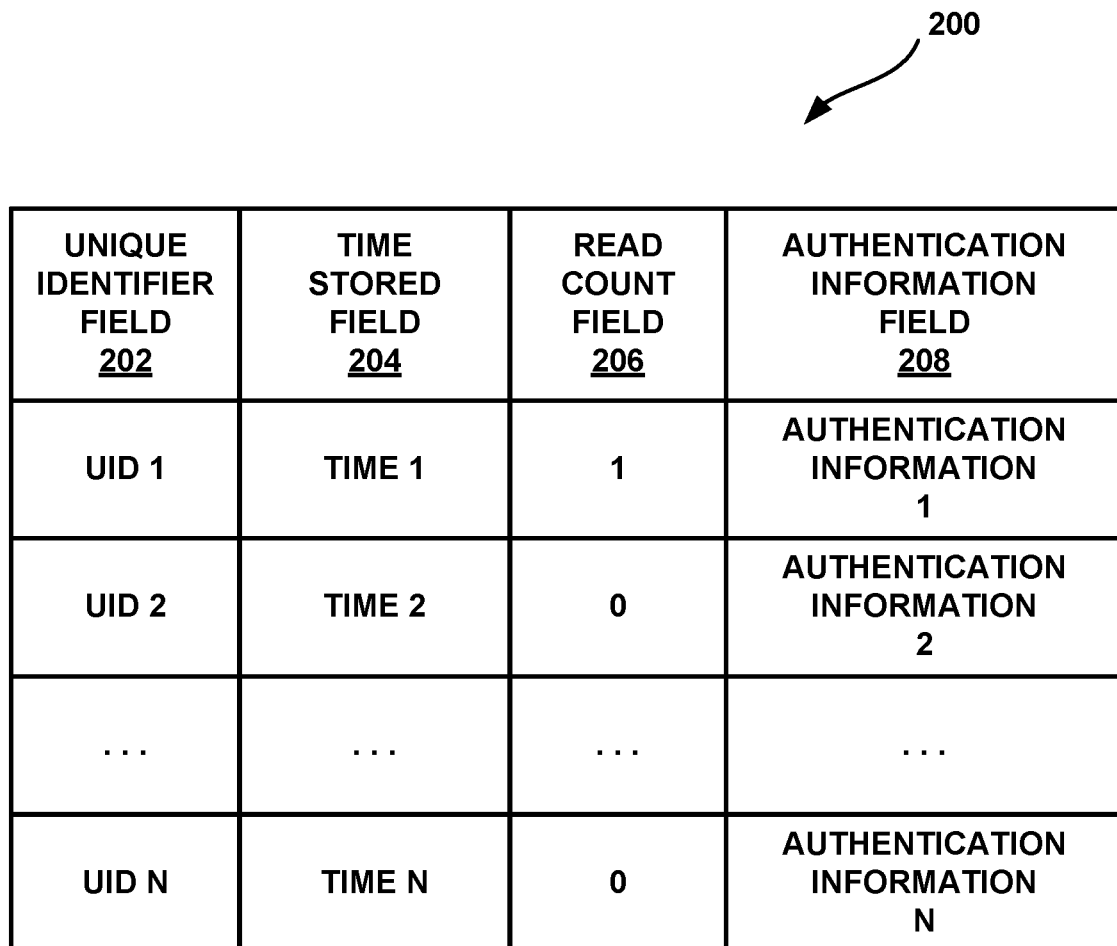
FIG. 2A illustrates one example of a data structure in accordance with one or more techniques described herein.
Figure 2C:
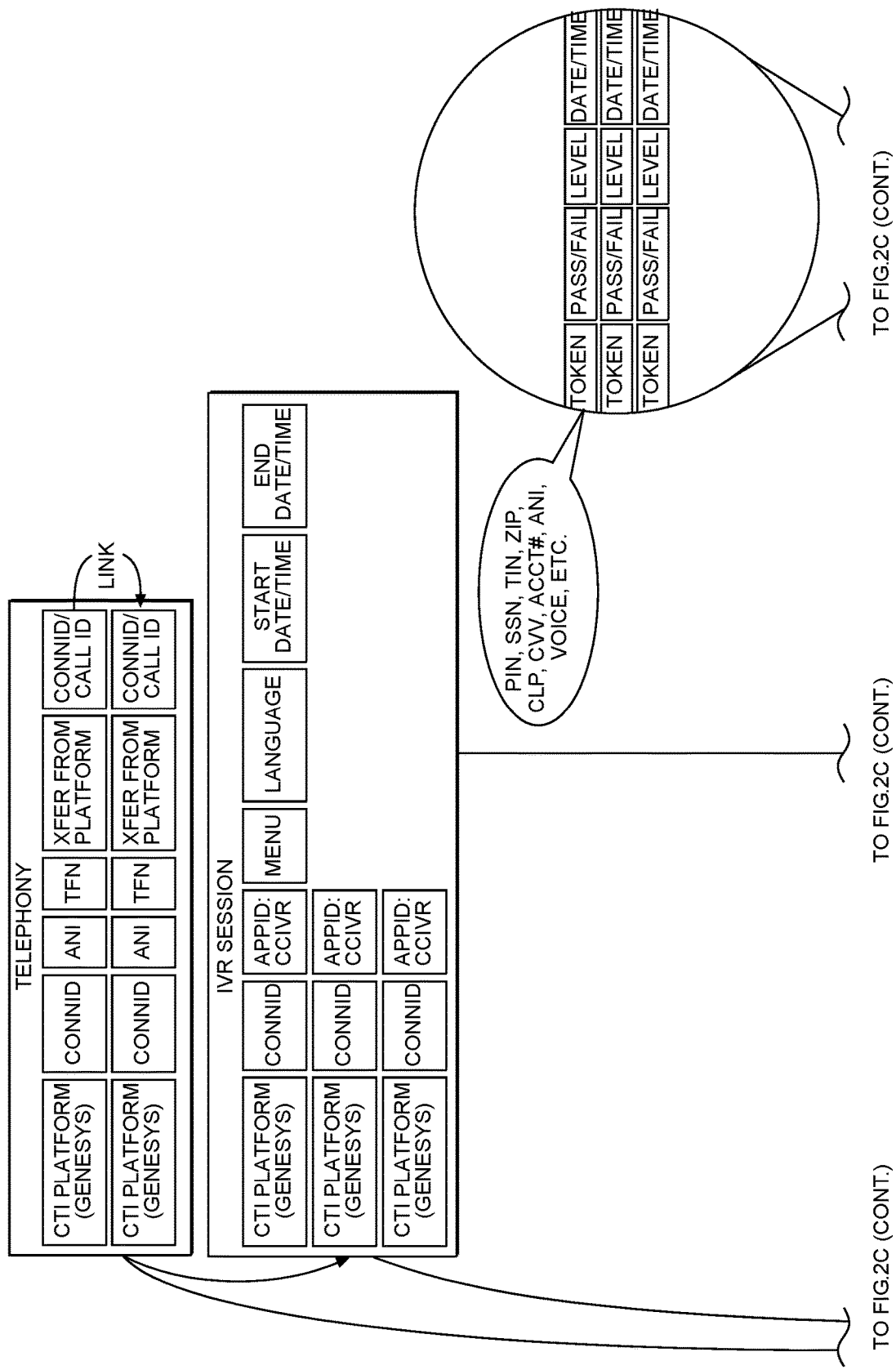
FIG. 2C illustrates one example of multiple data structures in accordance with one or more techniques described herein.
Figure 2C:
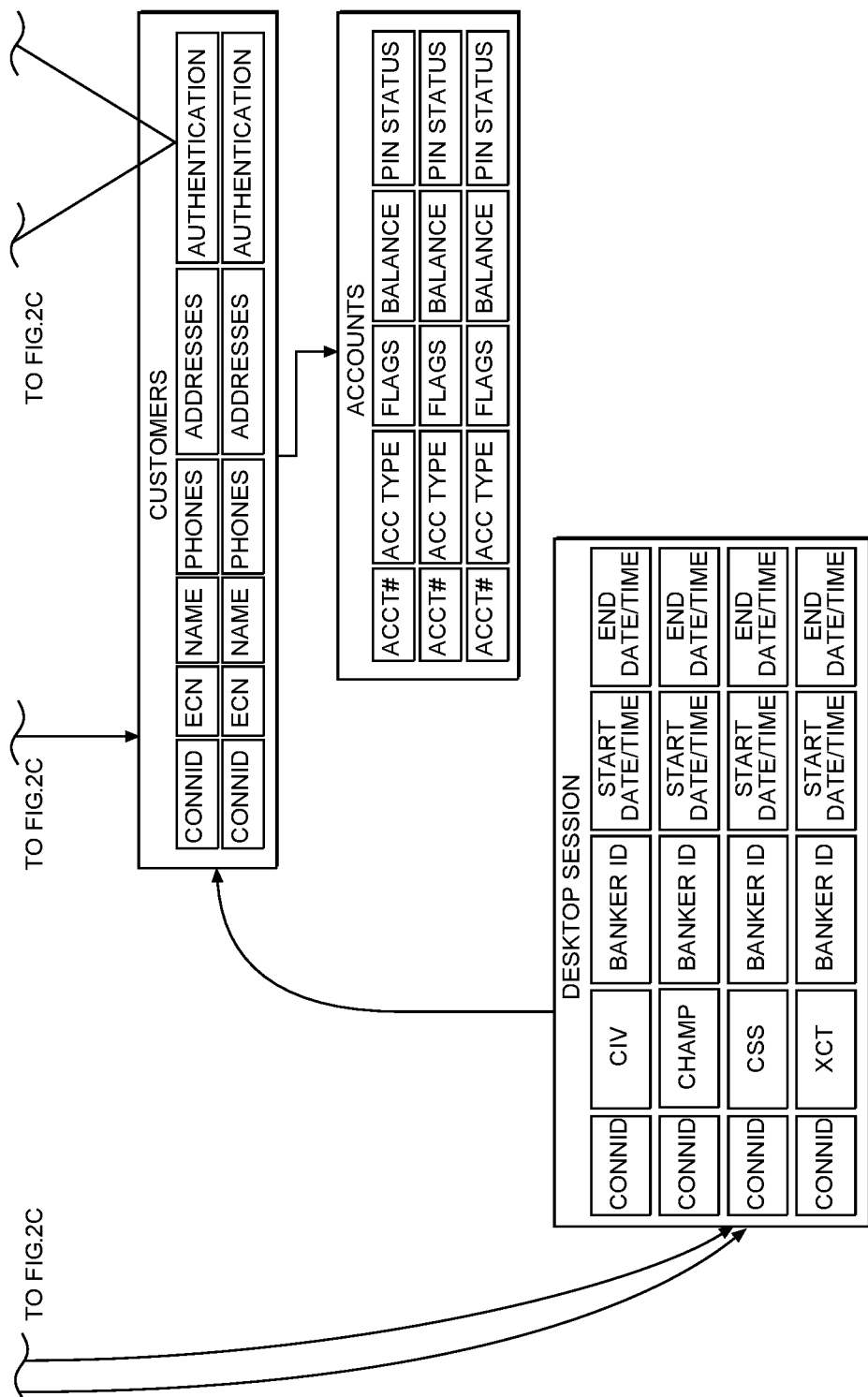
Figure 3A:
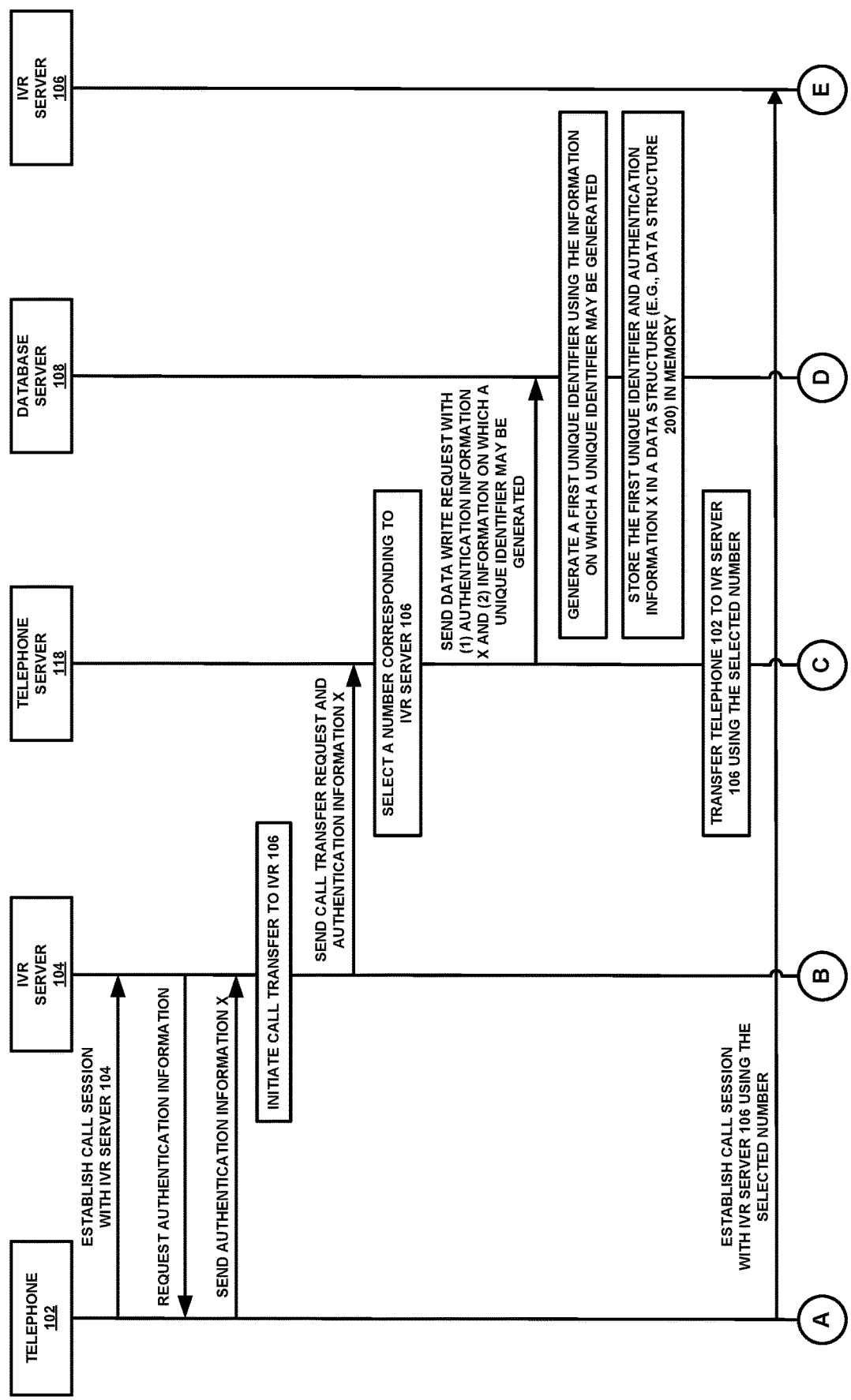
Figure 3B:
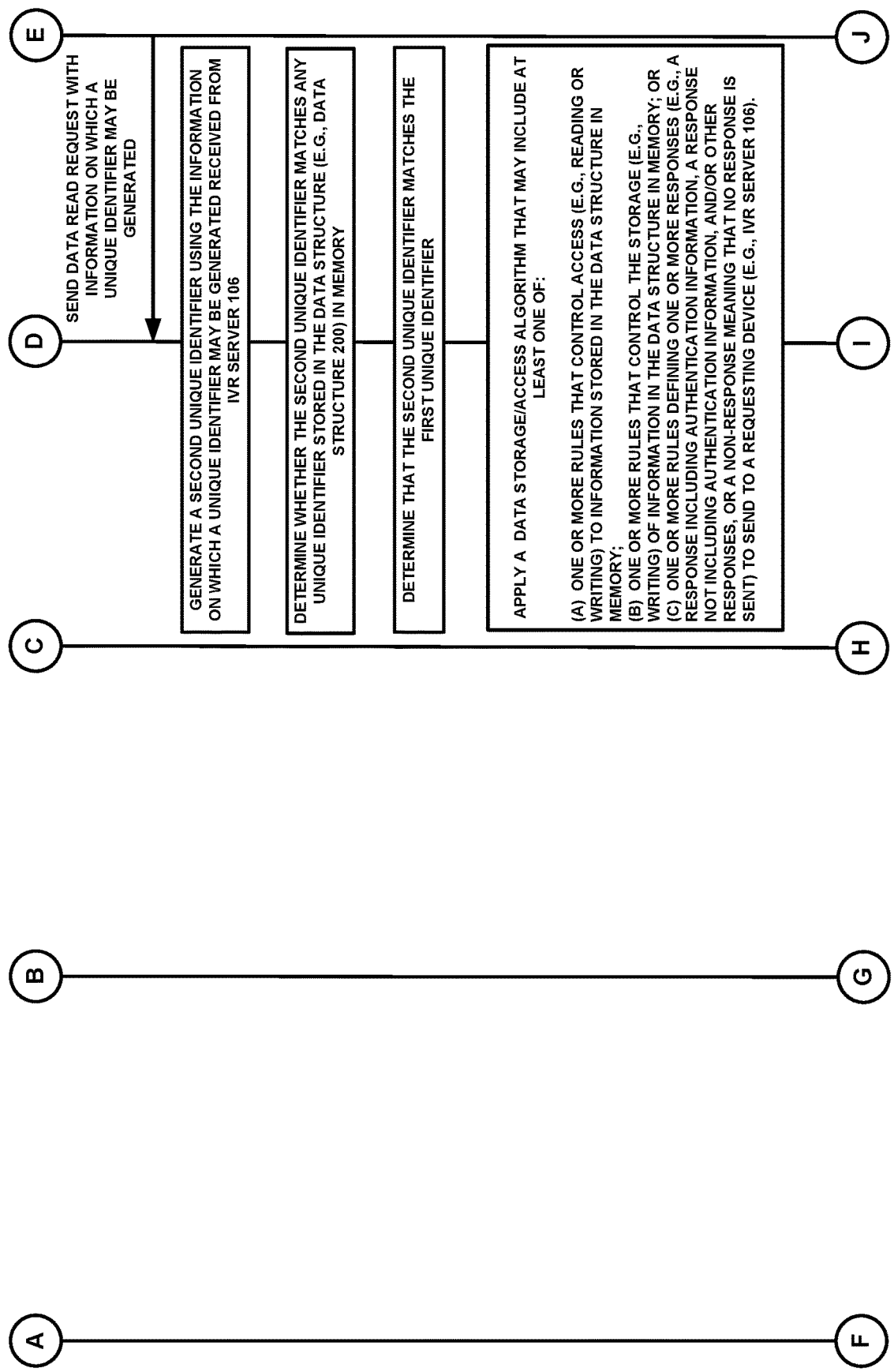
Figure 4A:
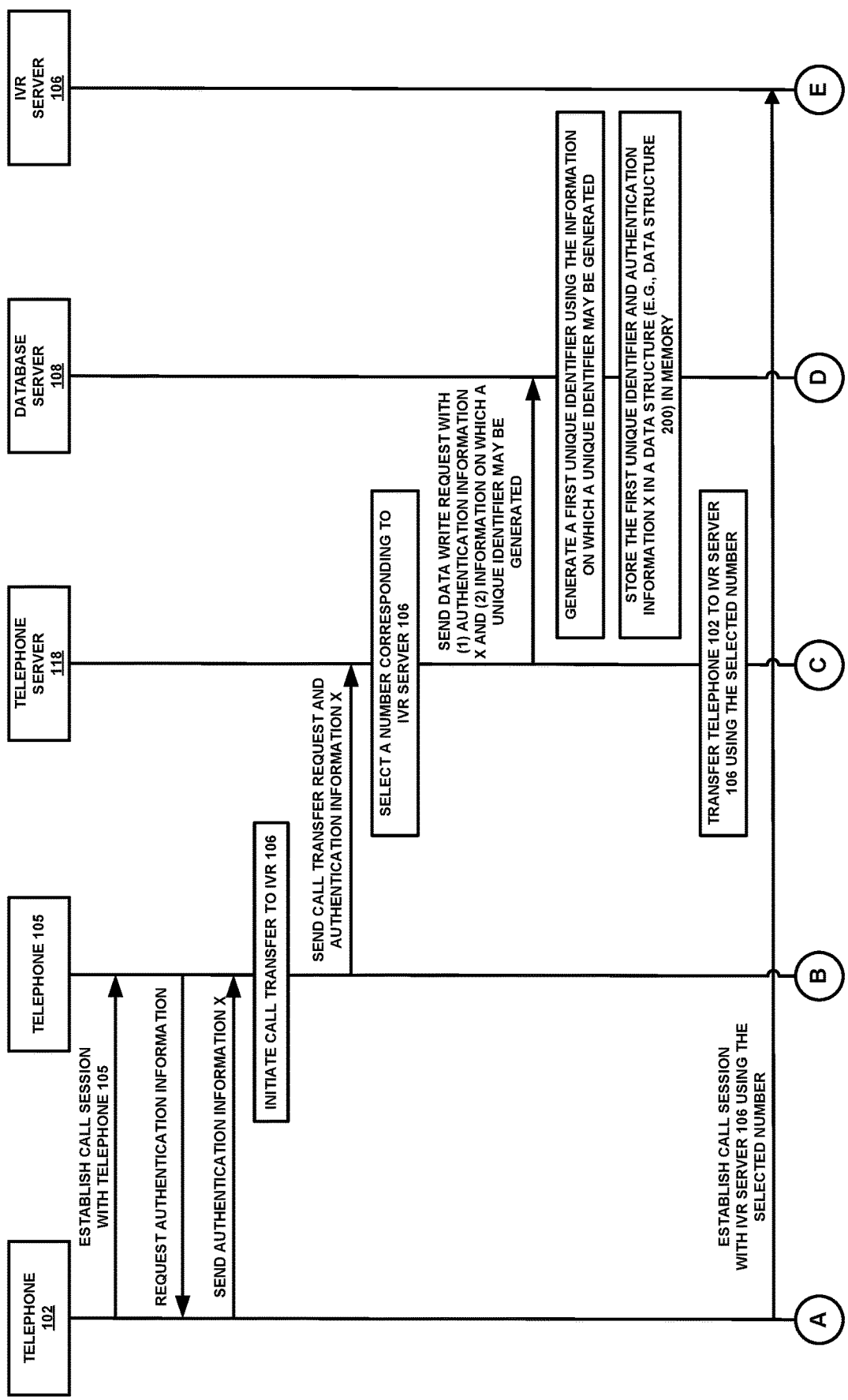
Figure 4B:
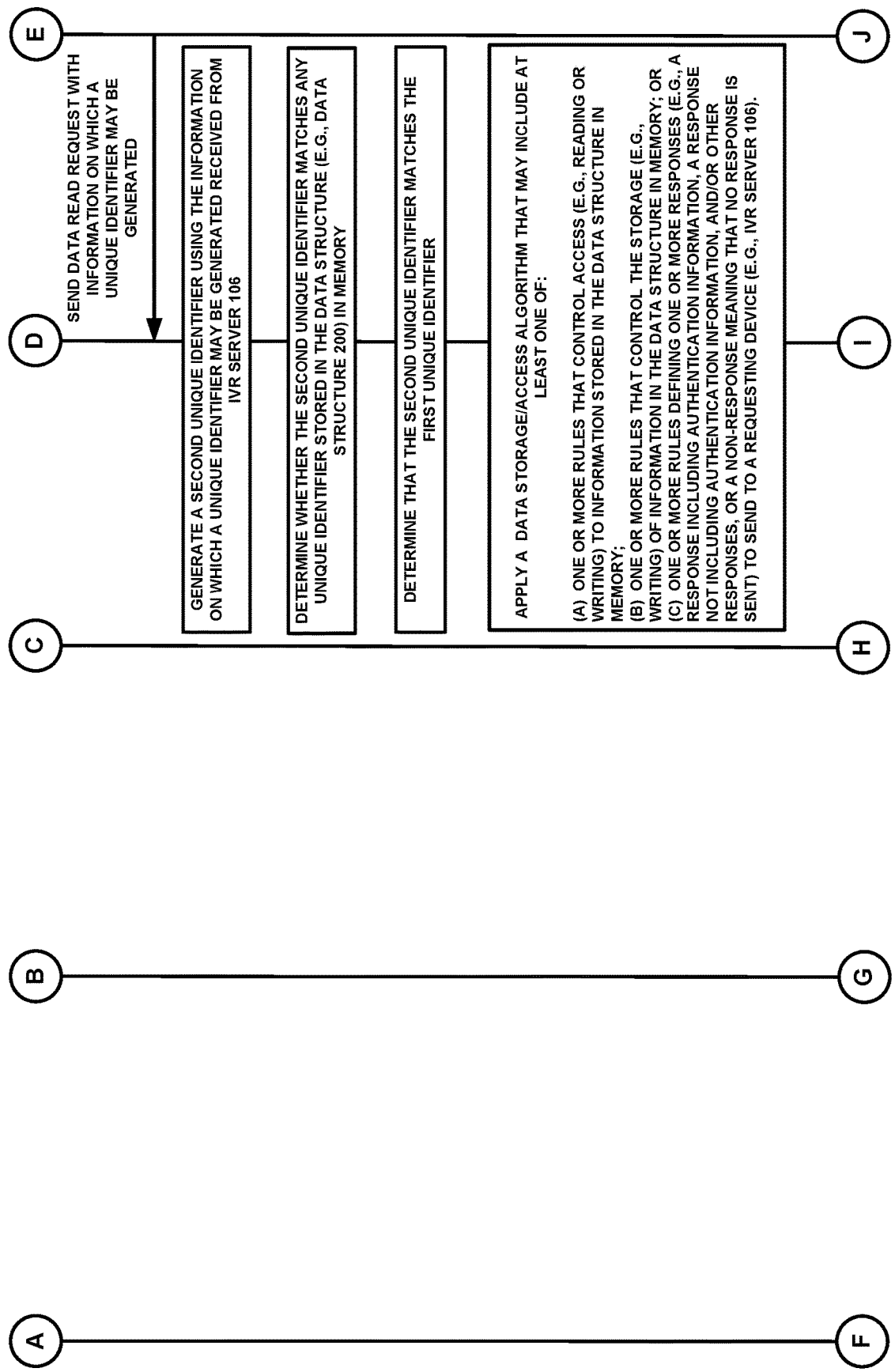
Figure 5B:
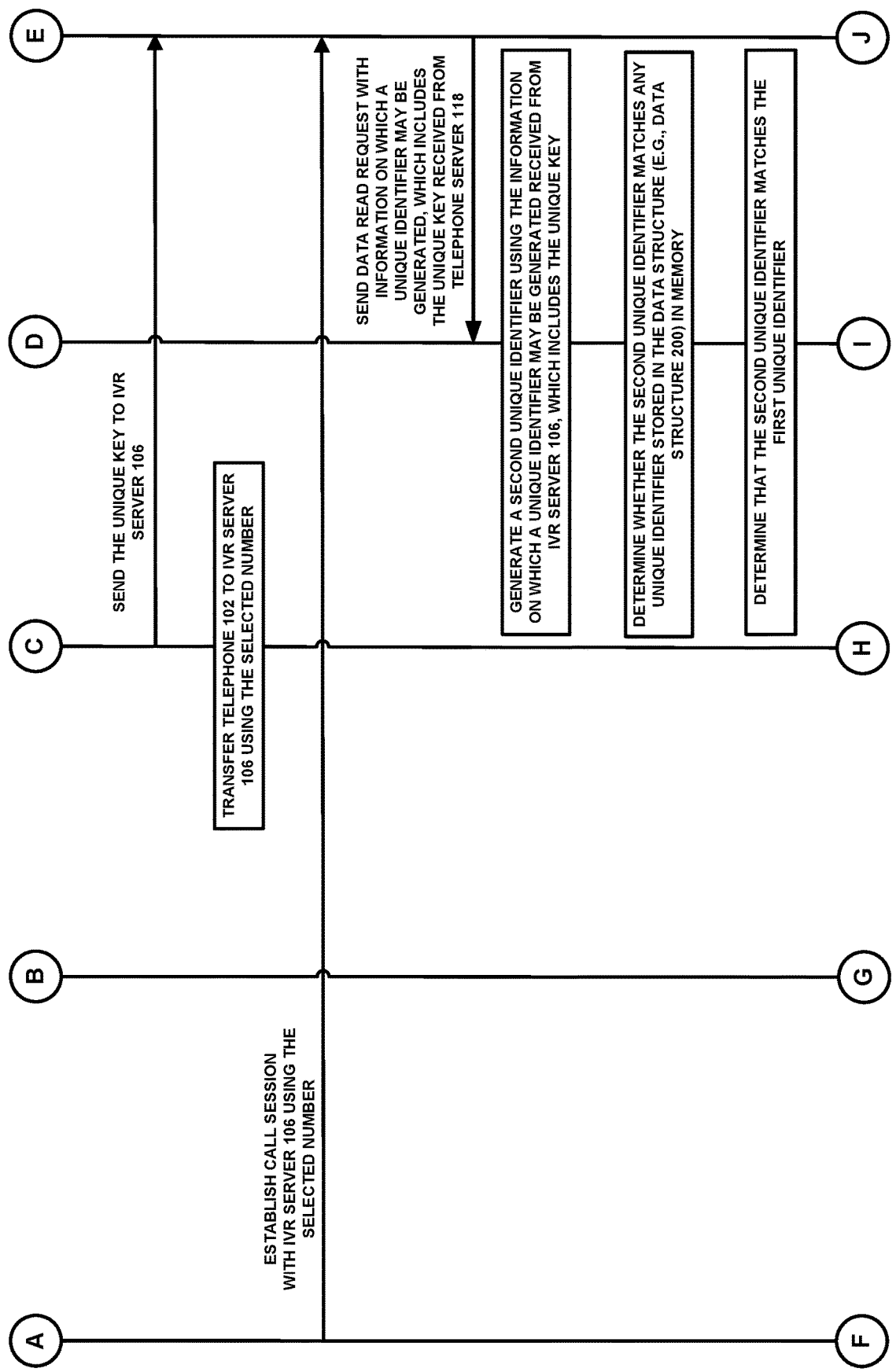
Figure 6A:
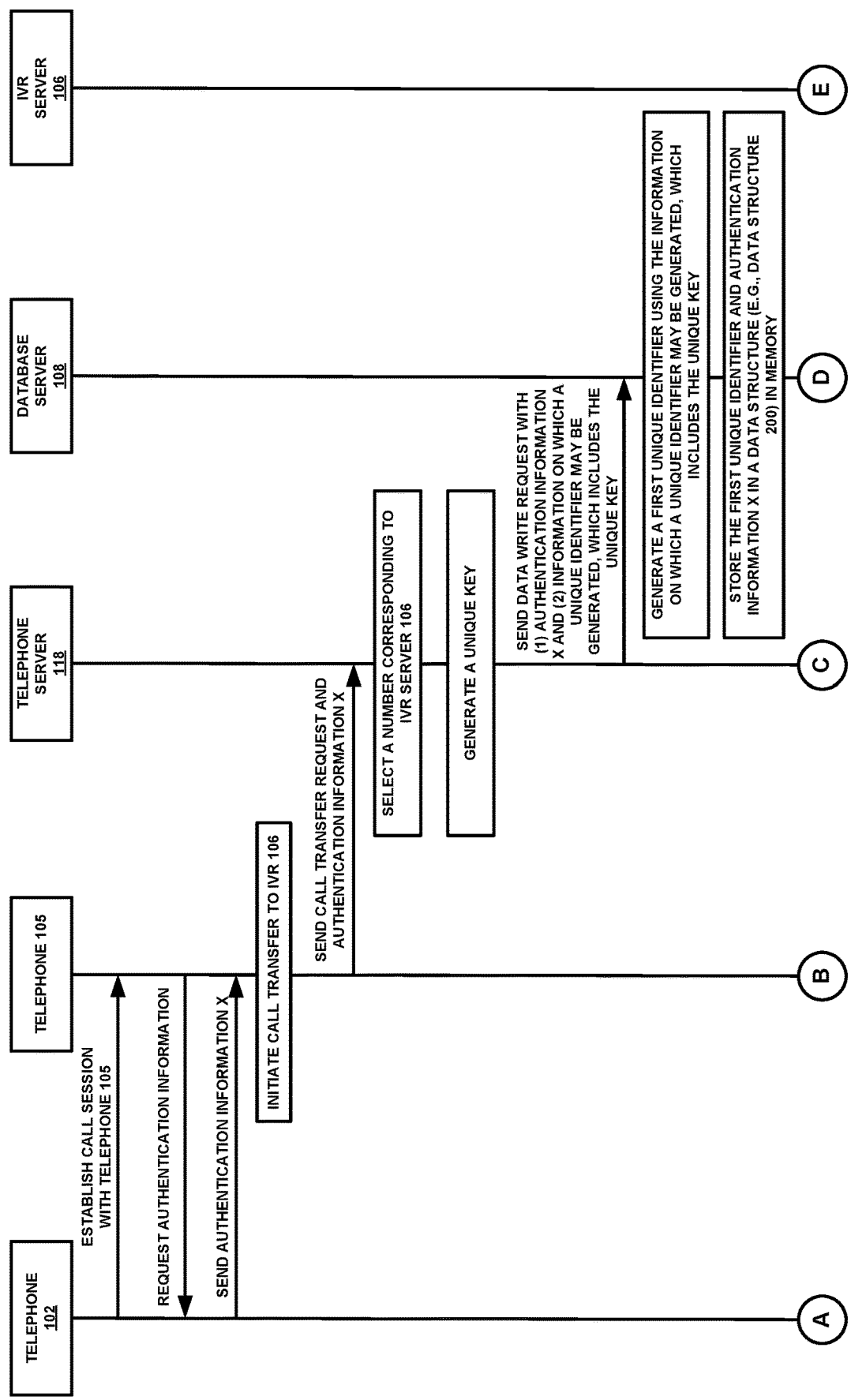
Figure 6B:
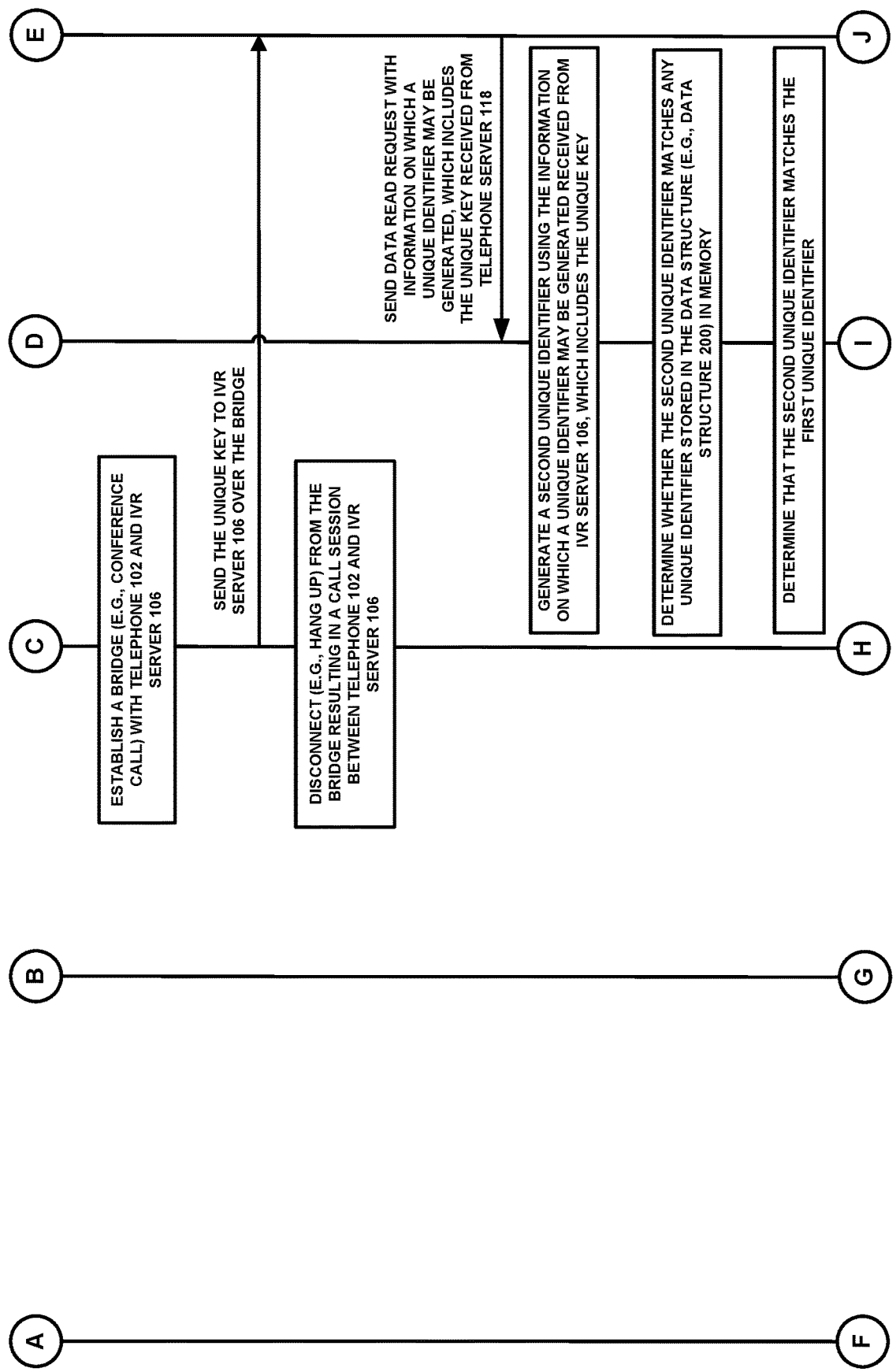

Database server 108 may be configured to store (e.g., write) call session information received from any telephony component to memory. Database server 108 may be configured to store call session information in one or more data structures in memory using one or more identifiers to map call session data to a customer, call session, IVR application, and/or any other information. For example, FIGS. 2A-2C illustrate examples of a data structure that database server 108 may be configured to implement. In the examples shown, database server 108 may be configured to implement a data structure that may be an associative data structure in which one or more fields of information (e.g., a connection ID field and/or a unique identifier field) may be keyed to each field entry corresponding to a particular connection ID and/or unique identifier. The data structure may include one or more fields corresponding to a particular connection ID and/or unique identifier. FIG. 2C shows, for example, multiple data structures in which a connection ID may be used to key information to a particular caller. In some examples, the multiple data structures shown in the example of FIG. 2C may enable a live operator or a telephony component (e.g., an IVR server) to track authentication token usage and authorization levels that a caller has achieved. The multiple data structures shown in the example of FIG. 2C may enable a live operator or a telephony component (e.g., an IVR server) to track calls transferred between different environments, such as Computer Telephony Integration (CTI) environments. The multiple data structures shown in the example of FIG. 2C may enable a live operator or a telephony component (e.g., an IVR server) to support multiple customers on one call. The multiple data structures shown in the example of FIG. 2C may enable a live operator or a telephony component (e.g., an IVR server) to share data with other live operators and/or other telephony components to reduce the re-query of data. For example, bankers may share data with other bankers and reduce the re-query of data. The multiple data structures shown in the example of FIG. 2C may enable a live operator or a telephony component (e.g., an IVR server) to track a caller/caller information across an entire call session in real-time. The multiple data structures shown in the example of FIG. 2C may enable a live operator or a telephony component (e.g., an IVR server) to provide data translation services. For example, Genesys/Cisco call transfers may provide a service in Genesys and Cisco for transferring calls either direction and the service may translate KVP data to Cisco data elements or vice versa.

Each of the data structures shown in FIG. 2C may be stored in database server 108 on memory. In other examples, the telephony data structure, the IVR session data structure, customers data structure, and the desktop session data structure (e.g., information corresponding to a live operator's call session) may be stored in database server 108 on memory. The arrows in FIG. 2C may illustrate how tracking call session data (e.g., saving call session data and keying it to a connection ID and/or unique identifier corresponding to a call session) may be used by other applications and/or devices in a telephony system according to some examples. However, it is understood that call session data may be reused by any telephony component that may benefit from reusing call session data (e.g., by using information stored on database server 108).

In some examples, database server 108 may be configured to receive and store (e.g., cache) call session data corresponding to one or more call sessions between two or more telephony components in one or more data structures. For example, database server 108 may be configured to store call session data such that call session data acquired by an IVR server may be accessible and re-used by one or more different IVR servers. For example, a shared IVR server may be configured to run an authentication IVR application. Upon authenticating a caller over a call session, the shared IVR server may be configured to cause the authentication information acquired over the call session from the caller to be stored on database server 108 along with, in some examples, a connection ID and/or unique identifier corresponding to the caller, call session, IVR application, and/or a combination thereof. Other telephony components (e.g., other IVR applications) may be configured to access the call session data by issuing a data read request to database server 108. The data read request may include a connection ID to inform database server what call session is being requested. In some examples, the data read request may include a field identifier to inform database server that the only information being requested by the issuing telephony component is the information stored in the identified field. For example, a data structure may key one or more fields to a connection ID and/or a unique identifier. Fields may include, for example, authentication information, ANI information, toll-free number information, the platform from which the caller was transferred, the caller's name, or any other field that may be used to store information acquired over a call session. In such an example, a data read request may include a connection ID and identify the authentication information field to indicate that the requesting telephony component would like to receive authentication information stored on database server 108 that is keyed to the connection ID included in the data read request.

Similarly, when storing call session information to memory in database server 108, database server 108 may be configured to receive a connection ID and/or a unique identifier (in the example of a unique identifier, the unique identifier may be received or may have to be generated using information that was received) along with call session information a telephony component is requesting to be stored in the memory of database server 108. Database server 108 may in turn store the call session information in a data structure such that the call session information is keyed to the connection ID and stored in the appropriate field. A data write request and a data read request may each identify more than one call session information field.

In some examples, database server 108 may be configured to use oracle Coherence for caching services. Database server 108 may be configured to make EBS service calls where applicable, for example. In some examples, database server 108 may be a caching service implemented in database server 123. For example, database server 123 may include persistent memory storage and cache memory storage. Each database server 123 may include multiple caching nodes for local availability and scalability. It is therefore understood that reference to database server 108 may refer to a physically separate server from database server 123; or, in some examples, may refer to a caching service implemented by database server 123. Therefore, any feature described with respect to database server 108 is also understood as be described with respect to database server 123 being configured with the same feature (e.g., a caching service that is configured to with the same feature).

Database server 108 may be configured to replicate data stored thereon to other database servers 108 and/or database server 123 located in different data centers. Database server 108 may be configured to use Oracle Coherence to replicate a cache catalog, such as between different caching nodes located in different data centers. Database server 108 may be configured to perform cache replication to a persistent storage medium on, for example, database server 123. In examples where database server 123 includes persistent storage memory and cache storage memory, the caching service of database 123 may be configured to perform cache replication from the cache storage memory to the persistent storage memory.

In some examples, information and data may be used interchangeably. For example, call session information may similarly refer to call session data, and vice versa.

Any techniques described herein may be implemented in any telephony system, such as the telephony systems illustrated in FIGS. 1A-1D and 7-18 as well as other examples.

Figure 1D:
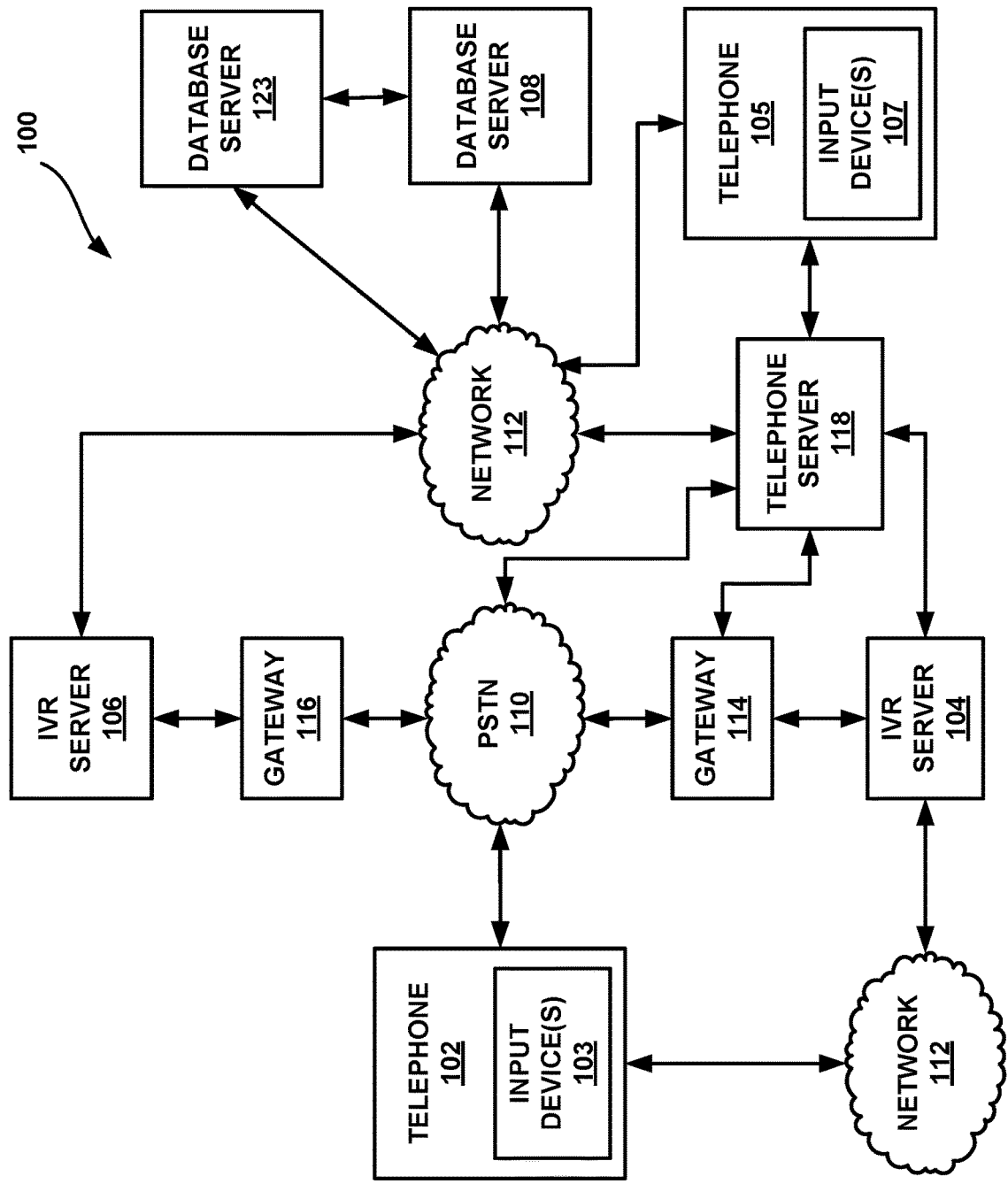
FIG. 1D illustrates one example of telephony system 100 in which one or more techniques described herein may be implemented.

As another example, FIG. 1D illustrates another example of telephony system 100 in which one or more techniques described herein may be implemented. The example of telephony system 100 illustrated in FIG. 1D includes telephone 102, telephone 105, first IVR server 104, second IVR server 106, database server 108, PSTN gateway 114, PSTN gateway 116, and telephone server 118. Telephone 105 may include one or more input devices 107, which may include one or more of the following: an audio transducer (e.g., a microphone), a touch screen display, one or more hard keys, one or more biometric scanners, and/or any other input device (e.g., a keyboard and/or a mouse in an example where telephone 105 is a computer). For example, telephone 102 may be configured to present a graphical user interface (GUI) on a touch screen display. The GUI may include one or more soft keys that the caller may interact with (e.g., provide input with) by using the touch screen display. In some examples, IVR server 104, database server 108, database server 123, gateway 114, telephone server 118, and telephone 105 may correspond to telephony components of a first company, and IVR server 106 and gateway 116 may correspond to a second company (i.e., constitute a third party telephony components relative to the first company).

Telephone 102 is described herein as a telephone corresponding to the caller (e.g. customer), and telephone 105 is described herein as a telephone corresponding to a live operator (e.g., a bank agent, a customer support representative, or any person in any role). Telephone 102 may be configured to connect to PSTN 100 and/or network 112. Telephone 105 may be configured to connect to PSTN 100 via telephone server 118 and/or network 112. In the example shown, IVR server 104 may be configured to connect to PSTN 100 via PSTN gateway 114. In other examples, IVR server 104 may be configured to directly connect to PSTN 100 without PSTN gateway 114. Similarly, in the example shown, IVR server 106 may be configured to connect to PSTN 100 via PSTN gateway 116. In other examples, IVR server 106 may be configured to directly connect to PSTN 100 without PSTN gateway 116. Telephone server 118 may be configured to connect to PSTN 100 with or without PSTN gateway 114, depending on the example. In some examples, telephone server 118 may be an IVR server.

IVR server 104 may be configured to receive a call from telephone 102 and establish a call session with telephone 102. IVR server 104 may be configured to prompt the caller of telephone 102 to provide authentication information. Using one or more input devices 103 of telephone 102, the caller may provide authentication information to IVR server 104 over the call session. IVR server 104 may be configured to determine whether the authentication information provided by the caller matches information corresponding to the caller stored in a database accessible to IVR server 104 that is different from database server 108, such as database server 123. IVR server 104 may be configured to authenticate the caller of telephone 102 (e.g., determine that the caller of telephone 102 is authenticated) if IVR server 104 determines that the authentication information provided by the caller matches information corresponding to the caller stored in a database accessible to IVR server 104 that is different from database server 108, such as database server 123. IVR server 104 may be configured to not authenticate the caller of telephone 102 (e.g., determine that the caller of telephone 102 is not authenticated) if IVR server 104 determines that the authentication information provided by the caller does not match information corresponding to the caller stored in a database accessible to IVR server 104 that is different from database server 108, such as database server 123.

IVR server 104 may be configured to initiate a call transfer such that telephone 102 is transferred to IVR server 106. In some examples, IVR server 104 may be configured to transfer telephone 102 to IVR server 106 by initiating a blind transfer. IVR server 106 may be configured to receive the transferred call initiated by IVR server 104 and establish a call session with telephone 102. As described herein, IVR server 104 may be configured to initiate a call transfer, but telephone server 118 may be configured to perform the call transfer initiated by IVR server 104. In other examples, (e.g., the example of telephony system 100 depicted in FIG. 1A), IVR server 104 may be configured with the functionality described with respect telephone server 118.

IVR server 104 may also be configured to initiate a data transfer such that authentication information (e.g., authentication information received from telephone 102 over the call session with IVR server 104) corresponding to the caller of telephone 102 is stored in database server 108. In some examples, IVR server 104 may be configured to initiate the data transfer before, during, or after initiating the call transfer. In other examples, IVR server 104 may be configured to initiate the data transfer irrespective of whether a call transfer for telephone 102 has been or is going to be initiated by IVR server 104. In examples where IVR server 104 is configured to initiate a data transfer, IVR server 104 may be connected to database server 108 via network 112. In other examples, IVR server 104 may be configured to send a data transfer request (e.g., a data write request) to telephone server 118, and telephone server 118 may add information (e.g., the number corresponding to IVR server 106 to which telephone 102 will be transferred (or has been or is currently being transferred, depending on the example)) to the data write request such that the authentication information corresponding to the caller of telephone 102 is stored in database server 108. In other examples, IVR server 104 may be configured to initiate a call transfer such that telephone 102 is transferred to IVR server 106, and IVR server 104 may not be configured to initiate a data transfer. In such examples, telephone server 118 may be configured to initiate a data transfer such that authentication information corresponding to the caller of telephone 102 is stored in database server 108.

In some examples, database server 108 may be configured to generate a unique identifier based on information received with a data write request such that the authentication information corresponding to the caller of telephone 102 is stored in database server 108 with the unique identifier. For example, database server 108 may be configured to receive a data write request (e.g., from IVR server 104 and/or telephone server 118) including authentication information corresponding to the caller of telephone 102, the ANI of telephone 102, and the number corresponding to IVR server 106 to which telephone 102 will be (or has been or is currently being, depending on the example) transferred. Otherwise described, database server 108 may be configured to receive a data write request (e.g., from IVR server 104 and/or telephone server 118) including authentication information corresponding to the caller of telephone 102, and information that database server 108 may be configured to generate a unique identifier based thereon.

In some examples, database server 108 may be configured to concatenate the ANI of telephone 102 and the number corresponding to IVR server 106 to which telephone 102 has been, will be, or is currently being transferred to generate the unique identifier. In one example, the ANI of telephone 102 may precede the number corresponding to IVR server 106 to which telephone 102 has been, will be, or is currently being transferred in the unique identifier generated by database server 108 for a data write request. In another example, the number corresponding to IVR server 106 to which telephone 102 has been, will be, or is currently being transferred may precede the ANI of telephone 102 in the unique identifier generated by database server 108 for a data write request.

Telephone server 118 may be configured to receive a call transfer initiation from IVR server 104, and perform a call transfer such that telephone 102 is transferred to (e.g., routed to) IVR server 106. In some examples, telephone server 118 may be configured to perform a call transfer by receiving the call transfer initiation from IVR server 104, and then route telephone 102 to IVR 106 using a number (e.g., a toll-free number, which may be referred to as a TFN) corresponding to IVR server 106. In some examples, one or more numbers may correspond to IVR server 106. For example, a pool of numbers may include a plurality of toll-free numbers that may be used to route telephone 102 to IVR 106. In some examples, telephone server 118 may be configured to select (e.g., randomly or not randomly) a number from a pool of numbers corresponding to IVR server 106. Random selection may reduce or prevent spoofing from a hostile attack.

Telephone server 118 may be configured to initiate a data transfer such that authentication information corresponding to the caller of telephone 102 is stored in database server 108. In some examples, telephone server 118 may be configured to initiate the data transfer before, during, or after performing the call transfer. In other examples, telephone server 118 may be configured to initiate the data transfer irrespective of whether a call transfer for telephone 102 has been or is going to be performed by telephone server 118.

Upon receiving the call transfer initiated by IVR server 104, IVR server 106 may be configured to establish a call session with telephone 102. For example, IVR server 106 may be configured to receive a call from telephone 102 via the call transfer performed by telephone server 118, and establish a call session with telephone 102.

In some examples, IVR server 106 may be configured to prompt the caller of telephone 102 to provide authentication information. Using one or more input devices 103 of telephone 102, the caller may provide authentication information to IVR server 106 over the call session. However, the caller may find re-entering the same authentication information initially provided to IVR server 104 frustrating, and may also question why sensitive information (e.g., authentication information) needs to be provided again. In accordance with one or more techniques of this disclosure, IVR server 106 may be configured to send a data read request to database server 108 via network 112 to read authentication information corresponding to the caller of telephone 102 stored on database server 108 (e.g., authentication information corresponding to the caller that the caller provided during a previous call session with IVR server 104). Authentication information corresponding to the caller of telephone 102 may be keyed to a unique identifier, which may serve to identify the caller and/or the caller over a particular call session.

The data read request may include information that database server 108 may be configured to generate a unique identifier based thereon. In other examples, the data read request may include the unique identifier. In such examples, IVR server 106 may be configured to receive the unique identifier during the call transfer from IVR server 104 (or another telephony component performing the call transfer in other examples), or may receive the same information based on which the unique identifier was generated by the database server from IVR server 104 (or another telephony component performing the call transfer in other examples) and may be configured to generate the unique identifier using the same information which would result in the same unique identifier being generated. For example, database server 108 may be configured to receive a data read request from IVR 106 including the ANI of telephone 102, and the number corresponding to IVR server 106 with which a call session with telephone 102 has been established. Database server 108 may be configured to receive a data read request from IVR server 106 including information that database server 108 may be configured to generate a unique identifier based thereon. In other examples, the data read request may include the unique identifier, which database server 108 may receive and use to determine what authentication information should be retrieved and provided to IVR server 106. In Database server 108 may be configured to send authentication information stored in memory corresponding to the generated unique identifier to IVR server 106.

In some examples, database server 108 may control access to authentication information stored in its memory in accordance with a data storage/access algorithm (e.g., a caching algorithm). In some examples, a data storage/access algorithm may include at least one of: one or more rules that control access (e.g., read access or write access) to information stored in a data structure (e.g., data structure 200 described herein with respect to FIG. 2A and/or FIG. 2B) in a memory of database server 108, one or more rules that control the storage (e.g., writing) of information in a data structure in a memory of database server 108, or one or more rules defining one or more responses that may be responsive to a data read request and/or a data write request. In some examples, the defined one or more responses may include one or more responses that may be sent to the component that sent or otherwise issued a data read request or a data write request. In some examples, a response may include sending authentication information, a response may not include authentication information. A data storage/access algorithm may be implemented in database server 108 using one or more of: hardware, software, or firmware.

In some examples, IVR server 106 may be configured to prompt the caller of telephone 102 for the same authentication information that IVR server 104 prompted the caller. In such examples, IVR 106 may be configured to determine whether the authentication information received from database server 108 matches information corresponding to the caller stored in a database accessible to IVR server 106 that is different from database server 108, such as database server 123. IVR server 106 may be configured to authenticate the caller of telephone 102 (e.g., determine that the caller of telephone 102 is authenticated) if IVR server 106 determines that the authentication information received from database server 108 matches information corresponding to the caller stored in a database accessible to IVR server 106 that is different from database server 108, such as database server 123. In such an example, IVR server 106 may be configured to authenticate the caller of telephone 102 without prompting the caller to provide authentication information. IVR server 106 may be configured to not authenticate the caller of telephone 102 (e.g., determine that the caller of telephone 102 is not authenticated) if IVR server 106 determines that the authentication information received from database server 108 does not match information corresponding to the caller stored in a database accessible to IVR server 106 that is different from database server 108, such as database server 123. In such an example, IVR server 106 may be configured to terminate the call session, prompt the caller of telephone 102 to provide authentication information, or perform any other action based on a non-authentication determination derived from authentication information received from database server 108.

In some examples, IVR server 106 may be configured to prompt the caller of telephone 102 for authentication information that IVR server 104 prompted the caller, and additional authentication information for which IVR server 104 did not prompt the caller of telephone 102. In such examples, IVR server 106 may be configured to determine whether the authentication information received from database server 108 matches information corresponding to the caller stored in a database accessible to IVR server 106 that is different from database server 108, such as database server 123. In the event of a match, IVR server 106 may be configured to prompt the caller of telephone 102 for any authentication information not received from database server 108. As an example, IVR server 104 may be configured to prompt the caller for authentication information A (e.g., an account number) and authentication information B (e.g., last 4 digits of the caller's social security number), and IVR server 106 may be configured to prompt the caller for authentication information A, authentication information B, and authentication information C (e.g., a passcode, such as a 4-digit passcode different from the last 4 digits of the caller's social security number). In this example, IVR server 106 may receive authentication information A and B from database server 108 in response to sending a data read request. In turn, IVR server 106 may determine that authentication information A and B matches information corresponding to the caller of telephone 102. Next, instead of prompting the caller for authentication information A, B, and C; IVR server 106 may be configured to prompt the caller of telephone 102 for authentication information C since authentication information C was not received from database server 108. It is therefore understood that depending on the example, IVR server 106 may be configured to authenticate or not authenticate the caller of telephone 102 based on authentication information received from database server 108 and/or authentication information received from telephone 102 over the call session with IVR server 106.

As described above, the caller may opt-out of using the first IVR server to speak with a live operator (e.g., a bank agent, a customer support representative, or any person in any role) or otherwise directly call a live operator.

In some examples, IVR server 104 may be configured to receive a call from telephone 102 and establish a call session with telephone 102. IVR server 104 may be configured to prompt the caller of telephone 102 to provide an input indicative of whether the caller desires to speak to a live operator. Using one or more input devices 103 of telephone 102, the caller may provide an input indicative that the caller does or does not desire to speak to a live operator. If the caller does not opt-out of using the IVR service provided by IVR server 104, IVR server 104 may be configured to prompt the caller of telephone 102 to provide authentication information. If the caller does opt-out (e.g., by requesting a live operator) of using the IVR service provided by IVR server 104, IVR server 104 may be configured to initiate a call transfer such that telephone 102 is transferred to telephone 105. The live operator, using telephone 105, may prompt the caller of telephone 102 to provide authentication information. Using one or more input devices 103 of telephone 102, the caller may provide authentication information to the live operator over the call session. The live operator using telephone 105 may determine whether the authentication information provided by the caller matches information corresponding to the caller stored in a database accessible to telephone 105 (e.g., the live operator may use telephone 105 to view the information corresponding to the caller stored in the database accessible to telephone 105). The database accessible to telephone 105 may be different from database server 108, such as database server 123. The live operator may make a decision as to whether the caller of telephone 102 is authenticated (e.g., verify the identity of the caller) based on the authentication information provided by the caller. For example, the live operator may determine that the caller is authenticated if the authentication information provided by the caller matches information corresponding to the caller stored in a database accessible to telephone 105 that is different from database server 108, such as database server 123.

Following authentication, the live operator of telephone 105 may be configured to initiate a call transfer such that telephone 102 is transferred to IVR server 106. IVR server 106 may be configured to receive the transferred call initiated by the live operator of telephone 105 and establish a call session with telephone 102. As described herein, the live operator may be described as initiating a call transfer, but telephone server 118 may be configured to perform the call transfer initiated by the live operator. For example, the live operator may use one or more input devices 107 of telephone 105 such that telephone 105 sends a call transfer request to telephone server 118. Telephone server 118 may process the call transfer request and such that IVR server 106 and telephone 102 establish a call session together.

In some examples, the live operator may use one or more input devices 107 of telephone 105 to initiate a data transfer such that authentication information (e.g., authentication information received from telephone 102 over the call session with telephone 105) corresponding to the caller of telephone 102 is stored in database server 108. In some examples, telephone 105 may be configured to initiate the data transfer before, during, or after initiating the call transfer. In other examples, telephone 105 may be configured to initiate the data transfer irrespective of whether a call transfer for telephone 102 has been or is going to be initiated. In some examples, telephone 105 may be configured to send a data transfer request (e.g., a data write request) to telephone server 118, and telephone server 118 may add information (e.g., the number corresponding to IVR server 106 to which telephone 102 will be transferred (or has been or is currently being transferred, depending on the example)) to the data write request such that the authentication information corresponding to the caller of telephone 102 is stored in database server 108. In other examples, telephone 105 may be configured to initiate a call transfer such that telephone 102 is transferred to IVR server 106, and telephone 105 may not be configured to initiate a data transfer. In such examples, telephone server 118 may be configured to initiate a data transfer such that authentication information corresponding to the caller of telephone 102 is stored in database server 108.

As described herein, database server 108 may be configured to generate a unique identifier based on information received with a data write request such that the authentication information corresponding to the caller of telephone 102 is stored in database server 108 with the unique identifier. For example, database server 108 may be configured to receive a data write request (e.g., from telephone 105 and/or telephone server 118) including authentication information corresponding to the caller of telephone 102, the ANI of telephone 102, and the number corresponding to IVR server 106 to which telephone 102 will be (or has been or is currently being, depending on the example) transferred. Otherwise described, database server 108 may be configured to receive a data write request (e.g., from telephone 105 and/or telephone server 118) including authentication information corresponding to the caller of telephone 102, and information that database server 108 may be configured to generate a unique identifier based thereon.

In some examples, database server 108 may be configured to concatenate the ANI of telephone 102 and the number corresponding to IVR server 106 to which telephone 102 has been, will be, or is currently being transferred to generate the unique identifier. In one example, the ANI of telephone 102 may precede the number corresponding to IVR server 106 to which telephone 102 has been, will be, or is currently being transferred in the unique identifier generated by database server 108 for a data write request. In another example, the number corresponding to IVR server 106 to which telephone 102 has been, will be, or is currently being transferred may precede the ANI of telephone 102 in the unique identifier generated by database server 108 for a data write request.

Telephone server 118 may be configured to receive a call transfer initiation from telephone 105, and perform a call transfer such that telephone 102 is transferred to (e.g., routed to) IVR server 106. In some examples, telephone server 118 may be configured to perform a call transfer by receiving the call transfer initiation from telephone 105, and then route telephone 102 to IVR 106 using a number (e.g., a toll-free number, which may be referred to as a TFN) corresponding to IVR server 106. In some examples, one or more numbers may correspond to IVR server 106. For example, a pool of numbers may include a plurality of toll-free numbers that may be used to route telephone 102 to IVR 106. In some examples, telephone server 118 may be configured to select (e.g., randomly or not randomly) a number from a pool of numbers corresponding to IVR server 106.

Telephone server 118 may be configured to initiate a data transfer such that authentication information corresponding to the caller of telephone 102 is stored in database server 108. In some examples, telephone server 118 may be configured to initiate the data transfer before, during, or after performing the call transfer. In other examples, telephone server 118 may be configured to initiate the data transfer irrespective of whether a call transfer for telephone 102 has been or is going to be performed by telephone server 118.

Upon receiving the call transfer initiated by telephone 105, IVR server 106 may be configured to establish a call session with telephone 102. For example, IVR server 106 may be configured to receive a call from telephone 102 via the call transfer performed by telephone server 118, and establish a call session with telephone 102.

In some examples, IVR server 106 may be configured to prompt the caller of telephone 102 to provide authentication information. Using one or more input devices 103 of telephone 102, the caller may provide authentication information to IVR server 106 over the call session. However, the caller may find re-entering the same authentication information initially provided to the liver operator of telephone 105 frustrating, and may also question why sensitive information (e.g., authentication information) needs to be provided again. In accordance with one or more techniques of this disclosure, IVR server 106 may be configured to send a data read request to database server 108 via network 112 to read authentication information corresponding to the caller of telephone 102 stored on database server 108 (e.g., authentication information corresponding to the caller that the caller provided during a previous call session with the live operator of telephone 105). Authentication information corresponding to the caller of telephone 102 may be keyed to a unique identifier, which may serve to identify the caller and/or the caller over a particular call session.

The data read request may include information that database server 108 may be configured to generate a unique identifier based thereon. For example, database server 108 may be configured to receive a data read request from IVR 106 including the ANI of telephone 102, and the number corresponding to IVR server 106 with which a call session with telephone 102 has been established. Otherwise described, database server 108 may be configured to receive a data read request from IVR server 106 including information that database server 108 may be configured to generate a unique identifier based thereon. Database server 108 may be configured to send authentication information stored in memory corresponding to the generated unique identifier to IVR server 106. In some examples, database server 108 may control access to authentication information stored in its memory in accordance with a data storage/access algorithm (e.g., a caching algorithm). In some examples, a data storage/access algorithm may include at least one of: one or more rules that control access (e.g., read access or write access) to information stored in a data structure (e.g., data structure 200 described herein with respect to FIG. 2A and/or FIG. 2B) in a memory of database server 108, one or more rules that control the storage (e.g., writing) of information in a data structure in a memory of database server 108, or one or more rules defining one or more responses that may be responsive to a data read request and/or a data write request. In some examples, the defined one or more responses may include one or more responses that may be sent to the component that sent or otherwise issued a data read request or a data write request. In some examples, a response may include sending authentication information, a response may not include authentication information. A data storage/access algorithm may be implemented in database server 108 using one or more of: hardware, software, or firmware.

In some examples, IVR server 106 may be configured to prompt the caller of telephone 102 for the same authentication information that the live operator of telephone 105 prompted the caller. In such examples, IVR 106 may be configured to determine whether the authentication information received from database server 108 matches information corresponding to the caller stored in a database accessible to IVR server 106 that is different from database server 108, such as database server 123. IVR server 106 may be configured to authenticate the caller of telephone 102 (e.g., determine that the caller of telephone 102 is authenticated) if IVR server 106 determines that the authentication information received from database server 108 matches information corresponding to the caller stored in a database accessible to IVR server 106 that is different from database server 108, such as database server 123. In such an example, IVR server 106 may be configured to authenticate the caller of telephone 102 without prompting the caller to provide authentication information. IVR server 106 may be configured to not authenticate the caller of telephone 102 (e.g., determine that the caller of telephone 102 is not authenticated) if IVR server 106 determines that the authentication information received from database server 108 does not match information corresponding to the caller stored in a database accessible to IVR server 106 that is different from database server 108, such as database server 123. In such an example, IVR server 106 may be configured to terminate the call session, prompt the caller of telephone 102 to provide authentication information, or perform any other action based on a non-authentication determination derived from authentication information received from database server 108.

In some examples, IVR server 106 may be configured to prompt the caller of telephone 102 for authentication information that live operator of telephone 105 prompted the caller, and additional authentication information for which the live operator did not prompt the caller of telephone 102. In such examples, IVR server 106 may be configured to determine whether the authentication information received from database server 108 matches information corresponding to the caller stored in a database accessible to IVR server 106 that is different from database server 108, such as database server 123. In the event of a match, IVR server 106 may be configured to prompt the caller of telephone 102 for any authentication information not received from database server 108. As an example, the live operator may prompt the caller for authentication information A (e.g., an account number) and authentication information B (e.g., last 4 digits of the caller's social security number), and IVR server 106 may be configured to prompt the caller for authentication information A, authentication information B, and authentication information C (e.g., a passcode, such as a 4-digit passcode different from the last 4 digits of the caller's social security number). In this example, IVR server 106 may receive authentication information A and B from database server 108 in response to sending a data read request. In turn, IVR server 106 may determine that authentication information A and B matches information corresponding to the caller of telephone 102. Next, instead of prompting the caller for authentication information A, B, and C; IVR server 106 may be configured to prompt the caller of telephone 102 for authentication information C since authentication information C was not received from database server 108. It is therefore understood that depending on the example, IVR server 106 may be configured to authenticate or not authenticate the caller of telephone 102 based on authentication information received from database server 108 and/or authentication information received from telephone 2 over the call session with IVR server 106.

As described herein, database server 108 may be configured to store authentication information along with a unique identifier keyed to the authentication information in a data structure in a memory of database server 108. FIG. 2A illustrates one example of data structure 200 into which database server 108 may be configured to store information. Data structure 200 is one example of a format in which database server 108 may be configured to store information (e.g., unique identifiers and authentication information corresponding thereto) in the memory of database server 108.

Data structure 200 may include at least a unique identifier field 202 and an authentication information field 208. In some examples, data structure 200 may include one or more additional fields, such as a time stored field 204 and/or a read count field 206 illustrated in the example of FIG. 2A. In other examples, data structure 200 may only include unique identifier field 202 and authentication information field 208. Data structure 200 may be an associative data structure in which unique identifier field 202 is keyed to each field entry corresponding to a particular unique identifier. For example, each unique identifier (which may be abbreviated as UID) may key, map, point, or otherwise respectively correspond to information respectively stored in each field associated with the unique identifier.

For example, UID 1 in the example of FIG. 2A may key, map, point, or otherwise respectively correspond to the information (which may be referred to data) stored in the time stored field 204, read count field 206, and authentication information field 208 corresponding to UID 1. In the example illustrated in FIG. 2A, the data stored in the time stored field 204 corresponding to UID 1 is TIME VALUE 1 (e.g., a time value), the data stored in the read count field 206 corresponding to UID 1 is a value of 1, and the data stored in authentication information field 208 corresponding to UID 1 includes authentication information 1. As another example, the data stored in the time stored field 204 corresponding to UID 2 is TIME 2 (e.g., a time value), the data stored in the read count field 206 corresponding to UID 2 is a value of 0, and the data stored in authentication information field 208 corresponding to UID 2 includes authentication information 2. Database server 108 may be configured to store one or more unique identifiers along with any corresponding information. For example, UID N represents the nth numbered unique identifier, TIME N represents the data stored in the time stored field 204 corresponding to UID N, authentication information N represents the authentication information stored in authentication information field 208 corresponding to UID N, and in the example of FIG. 2A, the data stored in the read count field 206 corresponding to UID N is a value of 0.

In some examples, data stored in a unique identifier field 202 may be any unique identifier described herein. For example, UID 1 may correspond to a value of an ANI concatenated with a number corresponding to second IVR server 106, and UID 2 may correspond to generated key concatenated with a number corresponding to second IVR server 106.

Time stored field 204 may store the time at which authentication information is stored in the data structure corresponding to the same unique identifier. For example, the value of TIME 1 may be the time at which database server 208 stored authentication information 1 in authentication information field 208 corresponding to UID 1. As another example, the value of TIME 2 may be the time at which database server 208 stored authentication information 2 in authentication information field 208 corresponding to UID 2.

Read count field 206 may store the number of times database server 108 has read the authentication information corresponding to the unique identifier with which the authentication information is associated. For example, database server 108 may be configured to store a default value of 0 in the read count field corresponding to a particular unique identifier when storing authentication information in the authentication information field corresponding to the same particular unique identifier. The default value of 0 indicates that, at the time of storing the authentication information, database server 108 has not read the authentication information. As described herein, database server 108 may be configured to read authentication information keyed to a unique identifier stored in data structure 200, and may be configured to increment the value stored in the corresponding read count field to keep track of the number of times the authentication information corresponding is read. For example, the value of 1 stored in the read count field 206 corresponding to UID 1 may indicate that database server 108 has read authentication information 1 from the memory one time since being stored. As another example, the value of 0 stored in the read count field 206 corresponding to UID 2 may indicate that database server 108 has not read authentication information 2 from the memory since being stored.

In some examples, database server 108 may be configured to not read authentication information stored in data structure 200 that has a corresponding read count value of 1. In such examples, database server 108 may be configured to read authentication information stored in data structure 200 a single time, meaning that database server 108 may be configured to not read authentication stored in data structure 200 a second time. After being read, database server 108 may increment the read count value from 0 to 1, which database server 108 may use to determine that the data corresponding to each field that is associated with the read count value of 1 may be overwritten, invalidated, or purged.

In some examples, database server 108 may be configured such that any authentication information stored in data structure 200 must be ready within a certain time period. The time period may be any period of time, such 1 second, 5 seconds, 60 seconds, 2 minutes, 1 day, or any other period of time.

Upon receiving a data read request corresponding to a particular unique identifier, database server 108 may be configured to determine the value stored in the read count field 206 corresponding to the particular unique identifier. If the value stored in the read count field is equal to or greater than 1, then database server 108 may be configured to discard the data read request and/or send a null response to the device that issued the data read request (e.g., IVR server 106). If the value stored in the read count field is equal to 0, then database server 108 may be configured to determine if the current time (e.g., the time at which database server 108 receives the data read request, or the time at which the data read request was sent) is greater than the time value stored in the time stored field plus a time period (e.g., 60 seconds). If the current time is greater than the time value stored in the time stored field plus a time period (e.g., 60 seconds), database server 108 may be configured to discard the data read request and/or send a null response to the device that issued the data read request (e.g., IVR server 106). If the current time is not greater than the time value stored in the time stored field plus a time period (e.g., 60 seconds), database server 108 may be configured to read the authentication information stored in the authentication field corresponding to the particular unique identifier.

In other examples, upon receiving a data read request corresponding to a particular unique identifier, database server 108 may be configured to read the authentication information stored in the authentication field corresponding to the particular unique identifier without an access control, such as a read count access control provided by the read count field and/or a time access control provided by the time stored field. In addition to or as an alternative to the time stored field 204, data structure 200 may include an expiration time field.

FIGS. 3A-C, 4A-C, 5A-C, and 6A-C illustrate examples of a process flow according to one or more techniques of this disclosure. In the examples of FIGS. 3A-C, 4A-C, 5A-C, and 6A-C, the illustrated waterfall flow is an example. For example, one or more illustrated steps/functions may, depending on the example, be performed in parallel or in an order different than that illustrated in any of FIGS. 3A-C, 4A-C, 5A-C, and 6A-C. It is understood that authentication information X is used to denote the authentication information provided by telephone 102, whether input by the caller of telephone 102 and/or automatically generated by telephone 102 in response to an authentication information request (e.g., an authentication prompt from an IVR server, such as IVR server 104). It is also understood that reference to information on which a unique identifier may be generated may include, in some examples, an ANI corresponding to telephone 102 and a number corresponding to IVR server 106. In other examples, reference to information on which a unique identifier may be generated may include a generated key (e.g., where the ANI corresponding to telephone 102 is not received by IVR server 106 as a result of how telephone 102 is transferred to IVR server 106) and a number corresponding to IVR server 106. In other examples, reference to information on which a unique identifier may be generated may include any information that may be used to generate a unique identifier.

FIGS. 7-18 each illustrate an example implementation of storing call session information in a telephony system according to one or more techniques of this disclosure.

Figure 7:
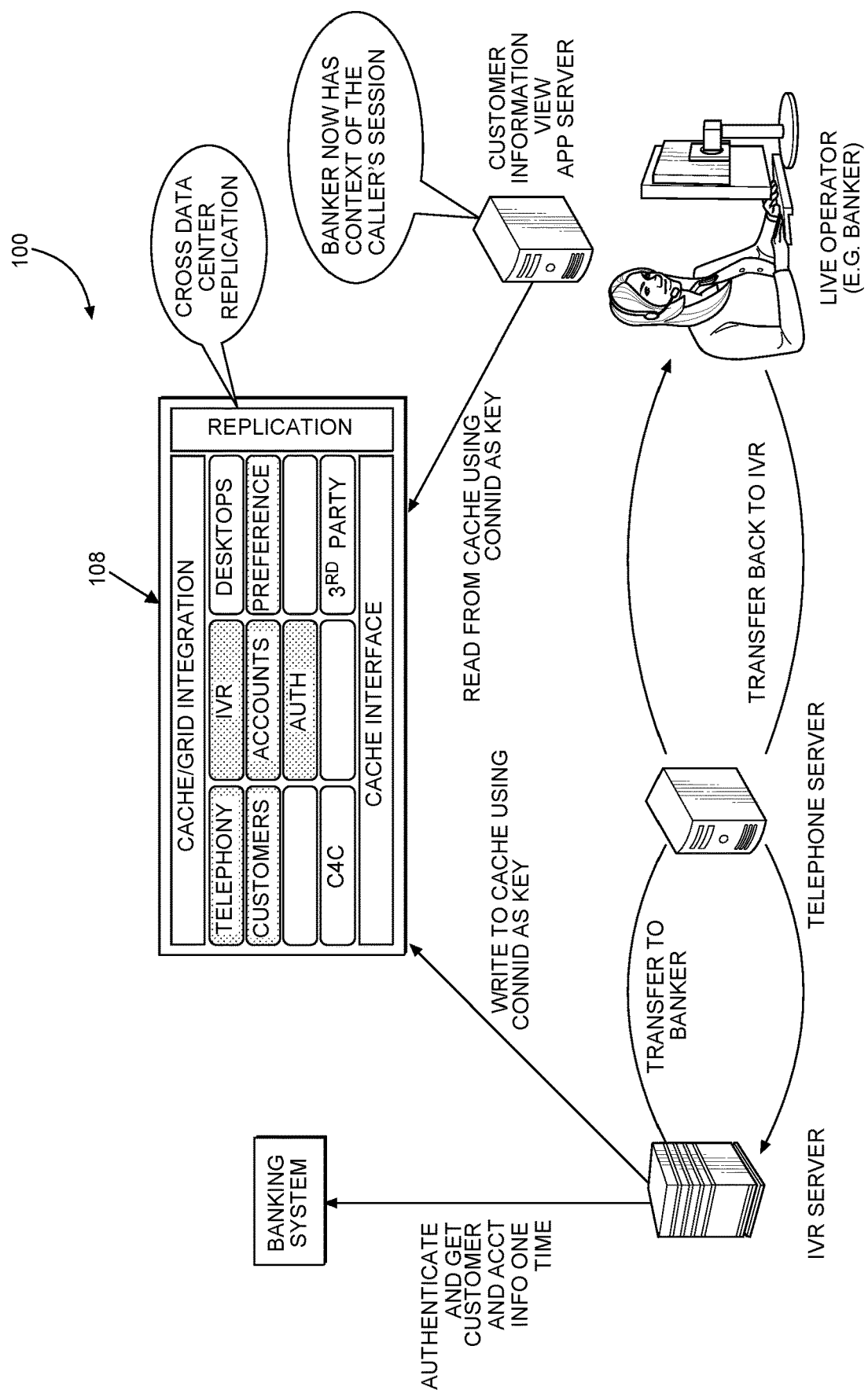
FIG. 7 illustrates an example of storing call session information according to one or more techniques of this disclosure.

FIG. 7 illustrates an example of storing call session information according to one or more techniques of this disclosure. The example of FIG. 7 illustrates transferring a caller from an IVR server to a live operator (e.g., a banker), and back to the IVR server. As shown, the live operator is able to access and view information (via, for example, a computing device with a display) that the caller provided over the call session with the IVR server. In some examples, as shown, the live operator may be able to access call session information through a customer information view application server. The depicted IVR server may be any IVR server described in this disclosure, such as IVR server 104 or IVR server 106. The depicted telephone server may be any telephone server described in this disclosure, such as telephone server 118. Also shown in FIG. 7 is a database server 108 with a cache interface and a replication interface. For example, the depicted database server 108 may be configured to replicate data stored thereon to other database servers 108 and/or database server 123 located in different data centers.

Figure 8:
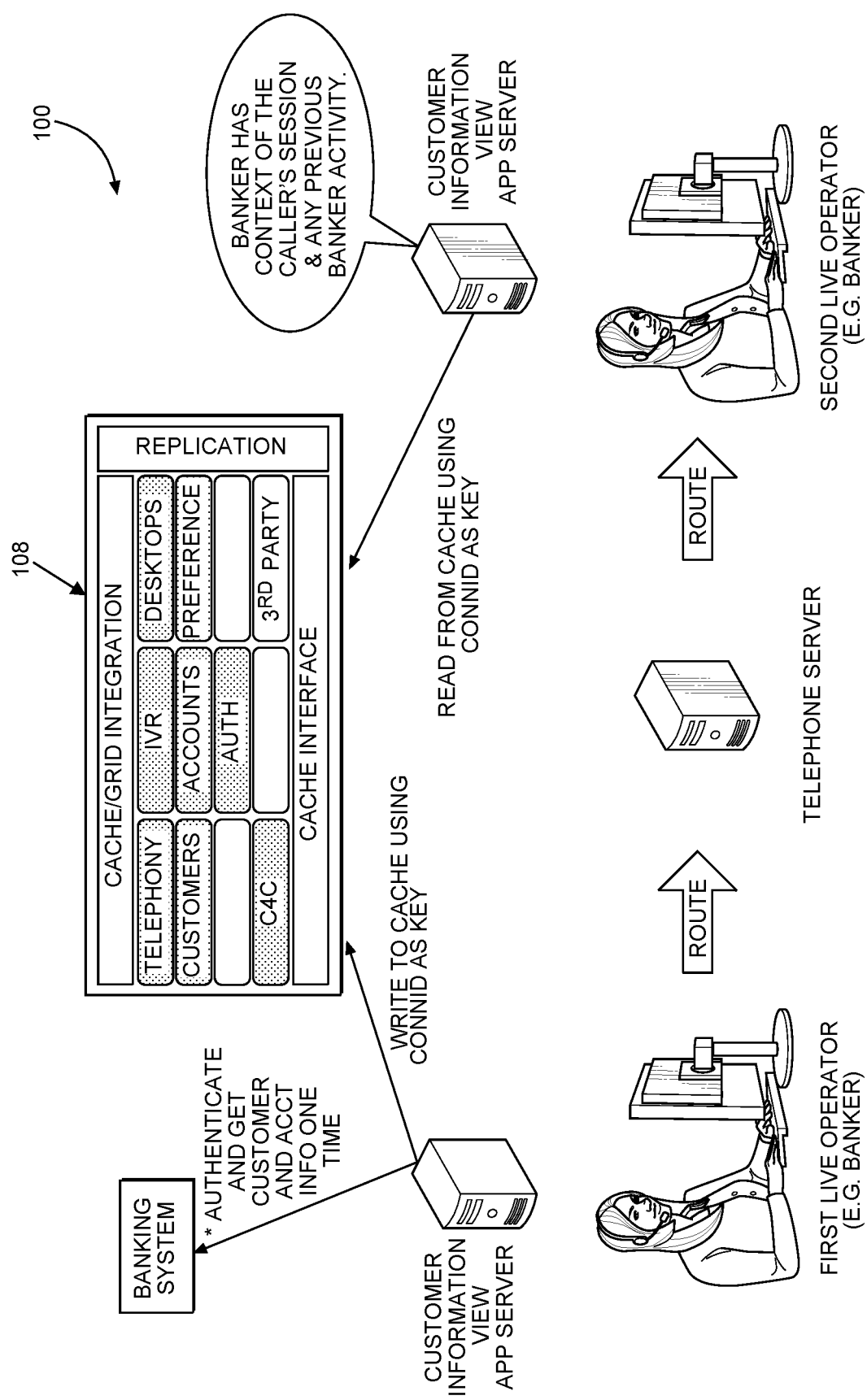
FIG. 8 illustrates an example of storing call session information according to one or more techniques of this disclosure.

FIG. 8 illustrates an example of storing call session information according to one or more techniques of this disclosure. The example of FIG. 8 illustrates transferring a caller from a first live operator (e.g., a first banker) to a second live operator (e.g., a second banker). As shown, the second live operator is able to access and view information (via, for example, a computing device with a display) that the caller provided over the call session with the first banker, and also the previous live operator's activity (in this example, the first live operator's activity). In some examples, as shown, the second live operator may be able to access call session information through a customer information view application server. The first live operator may input call session information received from the caller via the customer information view application server. The depicted telephone server may be any telephone server described in this disclosure, such as telephone server 118. Also shown in FIG. 8 is a database server 108 with a cache interface and a replication interface. For example, the depicted database server 108 may be configured to replicate data stored thereon to other database servers 108 and/or database server 123 located in different data centers.

Figure 9:
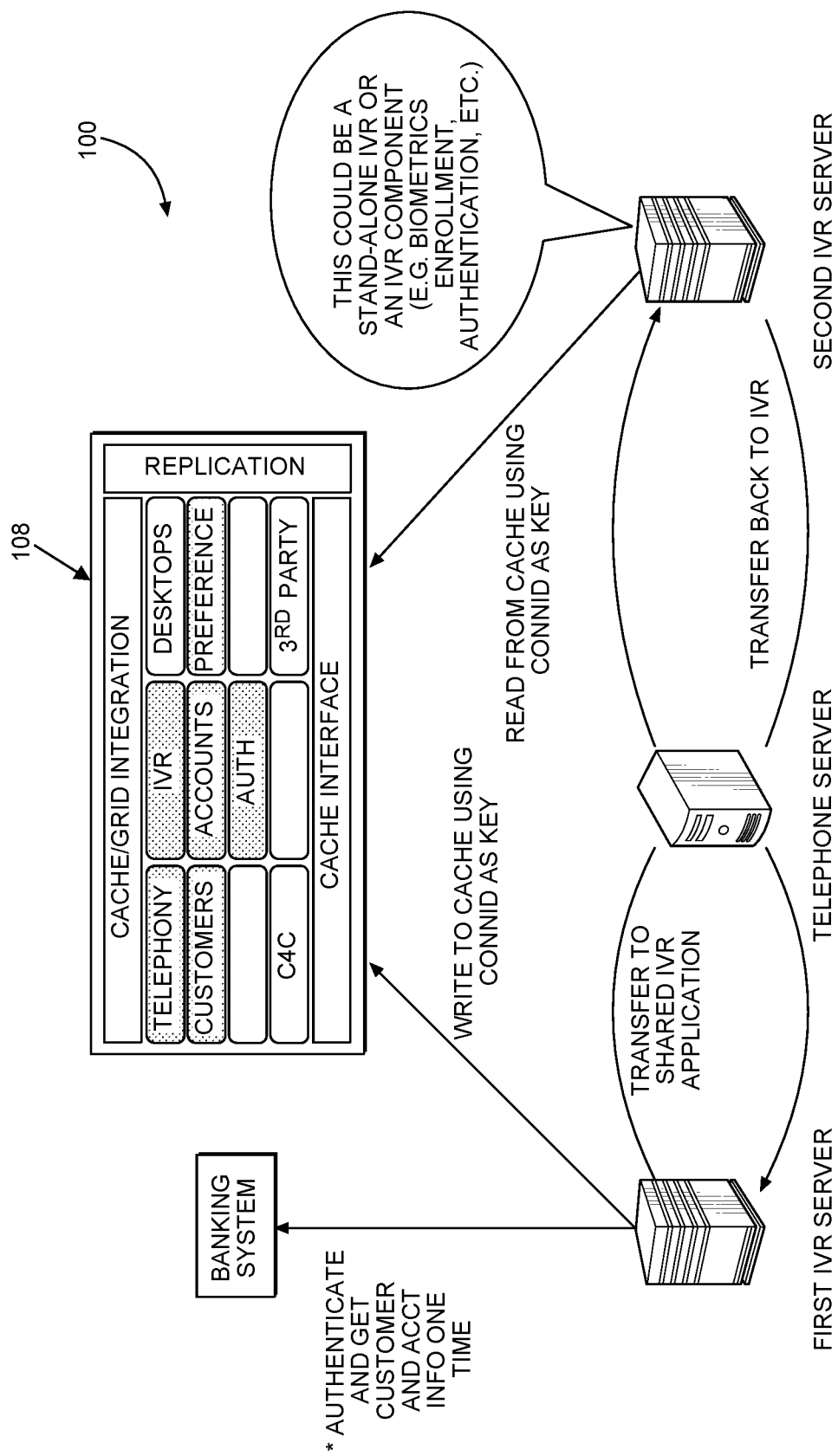
FIG. 9 illustrates an example of storing call session information according to one or more techniques of this disclosure.

FIG. 9 illustrates an example of storing call session information according to one or more techniques of this disclosure. The example of FIG. 9 illustrates transferring a caller from a first IVR server (e.g., IVR server 104) to a second IVR server (e.g., IVR server 106), and back to the first IVR server. As shown, the second IVR server is able to access information stored on database server 108 that the caller provided over the call session with the first IVR server. The depicted telephone server may be any telephone server described in this disclosure, such as telephone server 118. Database server 108 is shown as including, in this example, a cache interface and a replication interface. For example, the depicted database server 108 may be configured to replicate data stored thereon to other database servers 108 and/or database server 123 located in different data centers. As another example, database server 108 may be configured to maintain call session information across IVR applications.

Figure 10:
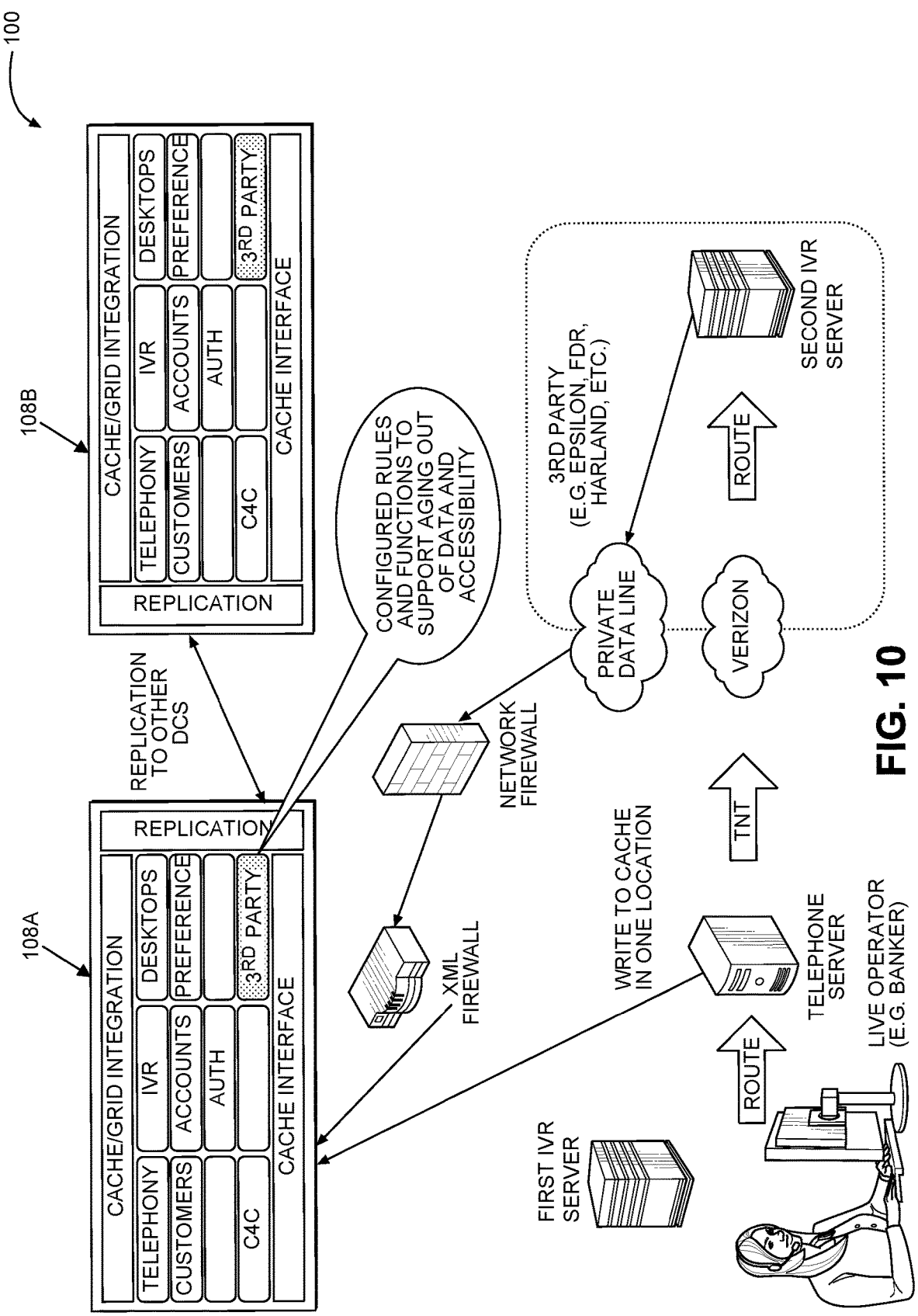
FIG. 10 illustrates an example of storing call session information according to one or more techniques of this disclosure.

FIG. 10 illustrates an example of storing call session information according to one or more techniques of this disclosure. The example of FIG. 10 illustrates transferring a caller from a first IVR server (e.g., IVR server 104) or a live operator (e.g., a banker) to a second IVR server (e.g., IVR server 106), and back to the first IVR server. In this example, the second IVR server may be a third party IVR server relative to the first IVR server. As shown, the second IVR server is able to access information stored on database server 108 that the caller provided over the call session with the first IVR server. The depicted telephone server may be any telephone server described in this disclosure, such as telephone server 118. Two database servers 108 are shown as database server 108A and database server 108B. Each of the two database servers may include, as shown in this example, a cache interface and a replication interface. Each database server shown in FIG. 10 may be located in a different data center. The depicted database servers 108 may be configured to replicate data stored thereon to other database servers 108 and/or database server 123 located in different data centers. For example, database server 108A may receive a data write request with call session information acquired over a call session with the first IVR server or the live operator. The call session information stored on database server 108A may subsequently be replicated onto database server 108B. The replication to another database server 108 in FIG. 10 is not unique to FIG. 10; rather, it is understood that replication of information stored on one database server 108 to another database server 108 may apply to any example described herein.

Figure 11:
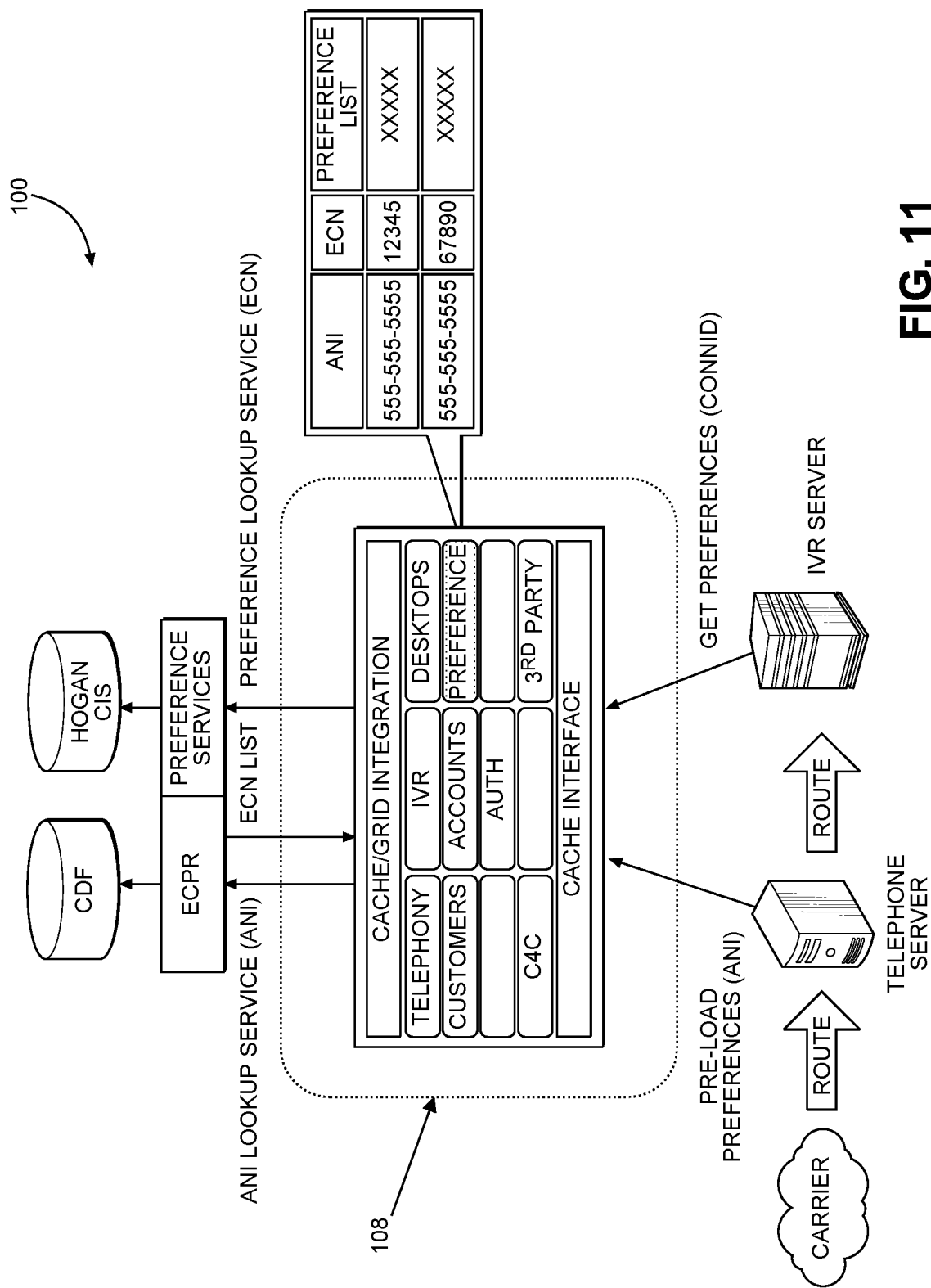
FIG. 11 illustrates an example of storing call session information according to one or more techniques of this disclosure.

FIG. 11 illustrates an example of storing call session information according to one or more techniques of this disclosure. For example, FIG. 11 illustrates that database server 108 may be store a caller's preference information based on identification information, such as the caller's ANI. In the example shown, a telephone server may receive a caller's preference information and subsequently send a data write request to a database server 108 to store the preference information on database server 108. An IVR server may be configured to obtain caller preference information corresponding to the current caller from database server 108. The depicted IVR server may be any IVR server described in this disclosure, such as IVR server 104 or IVR server 106. The depicted telephone server may be any telephone server described in this disclosure, such as telephone server 118. As shown in FIG. 11, database server 108 may be configured with a cache interface and a replication interface. For example, the depicted database server 108 may be configured to replicate data stored thereon to other database servers 108 and/or database server 123 located in different data centers.

Figure 12:
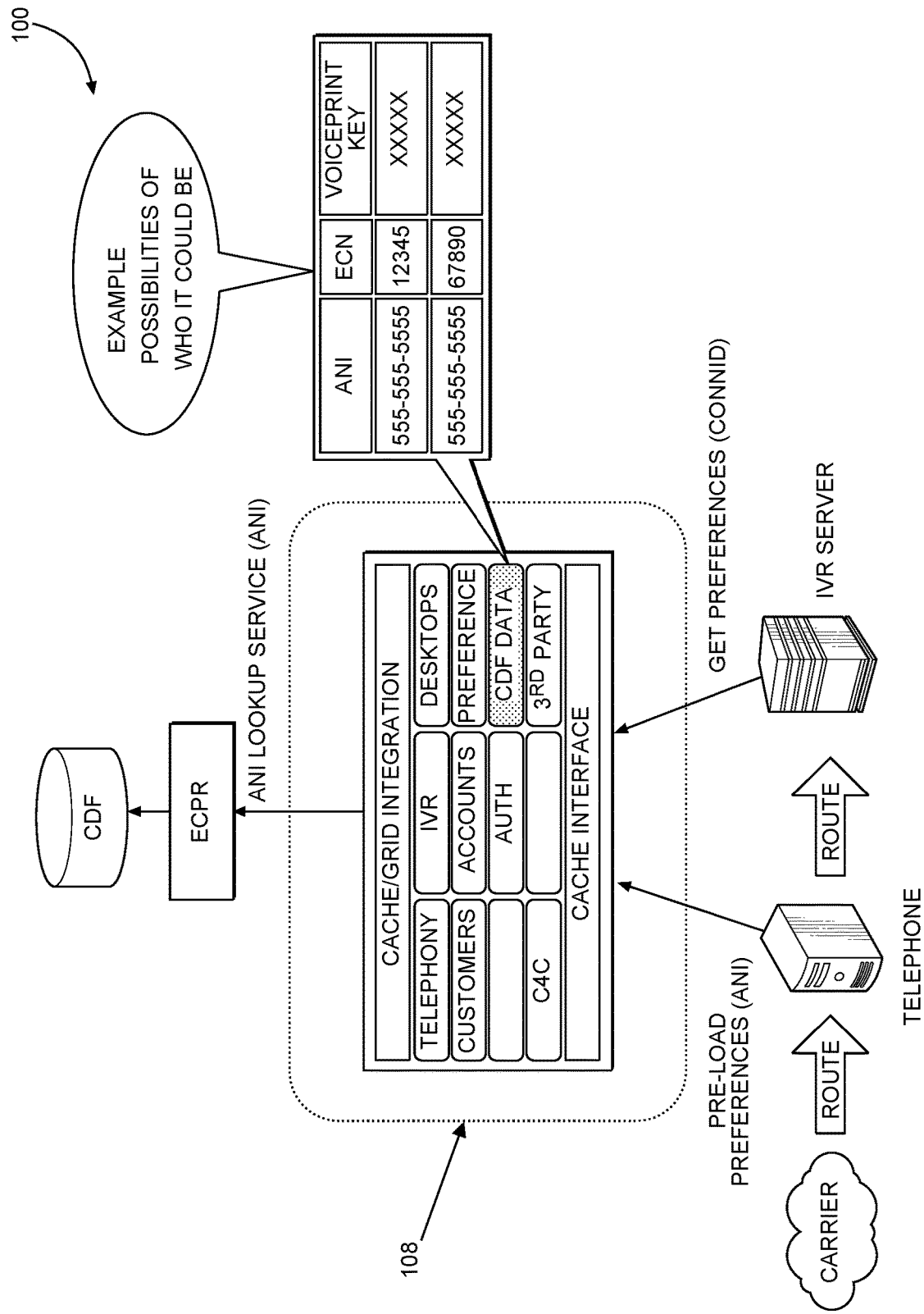
FIG. 12 illustrates an example of storing call session information according to one or more techniques of this disclosure.

FIG. 12 illustrates an example of storing call session information according to one or more techniques of this disclosure. For example, FIG. 12 illustrates that database server 108 may be store a caller's preference information based on identification information, such as the caller's ANI. In the example shown, a telephone server may receive a caller's preference information and subsequently send a data write request to a database server 108 to store the preference information on database server 108. An IVR server may be configured to obtain caller preference information corresponding to the current caller from database server 108. For example, database server 108 may be configured to provide just-in-time data and look-up the caller based on the caller's ANI. The data stored on database server 108 for just-in-time deliver may include, for example, any caller information, the caller's account information, the caller's voiceprint data. The depicted IVR server may be any IVR server described in this disclosure, such as IVR server 104 or IVR server 106. The depicted telephone server may be any telephone server described in this disclosure, such as telephone server 118. As shown in FIG. 12, database server 108 may be configured with a cache interface and a replication interface. For example, the depicted database server 108 may be config-ured to replicate data stored thereon to other database servers 108 and/or database server 123 located in different data centers.

Figure 13:
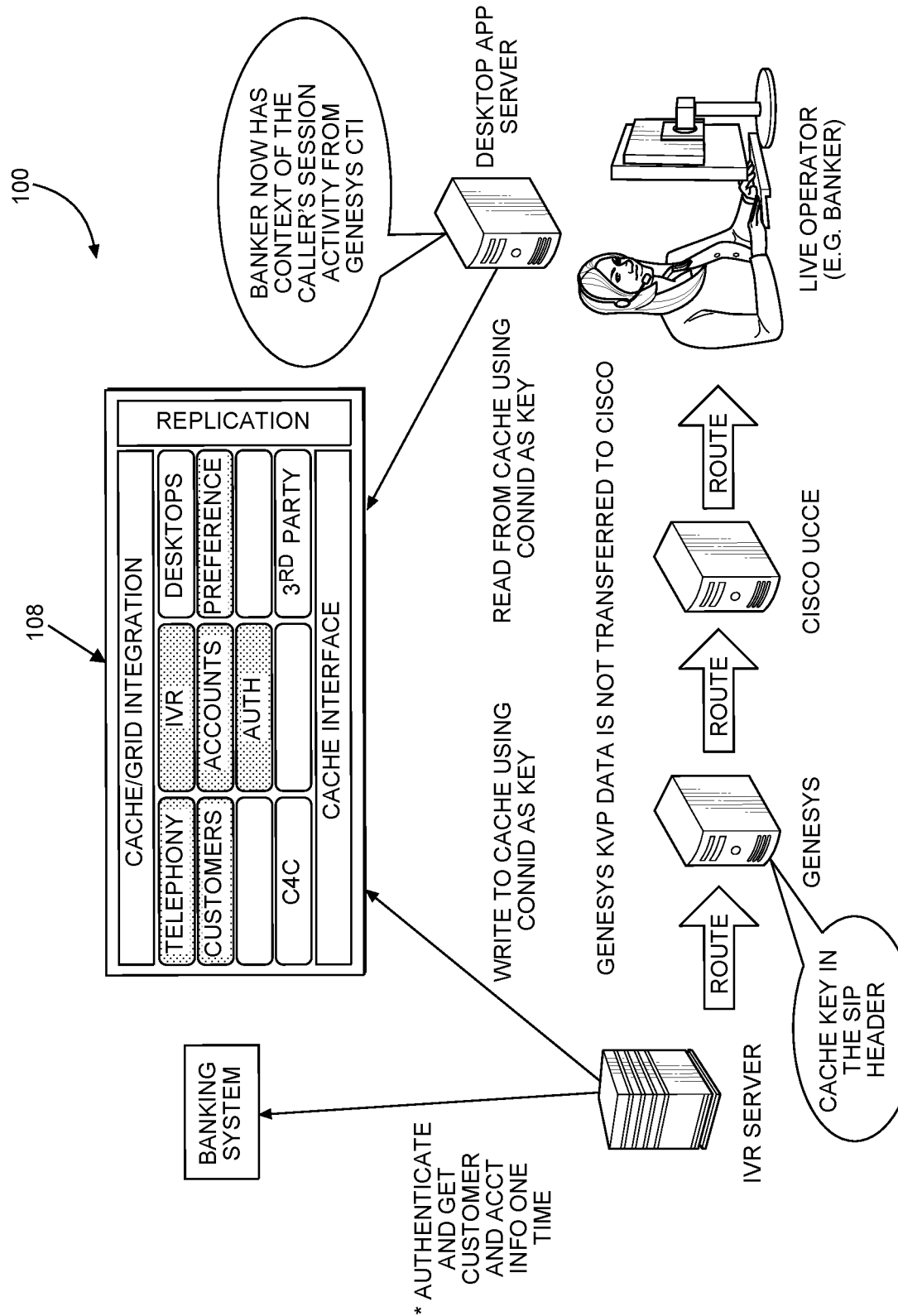
FIG. 13 illustrates an example of storing call session information according to one or more techniques of this disclosure.
Figure 14:
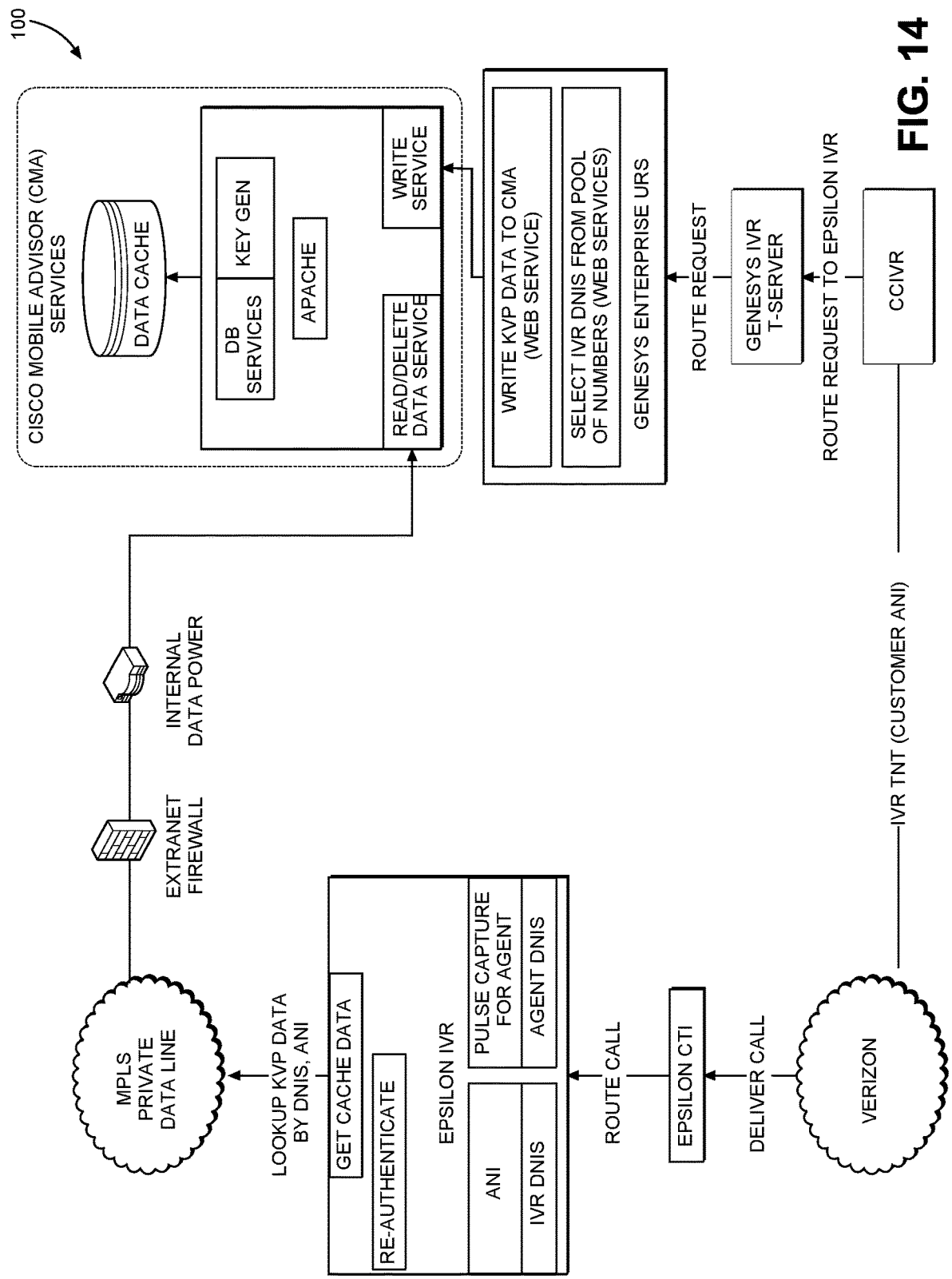
FIG. 14 illustrates an example of storing call session information according to one or more techniques of this disclosure.
Figure 15:
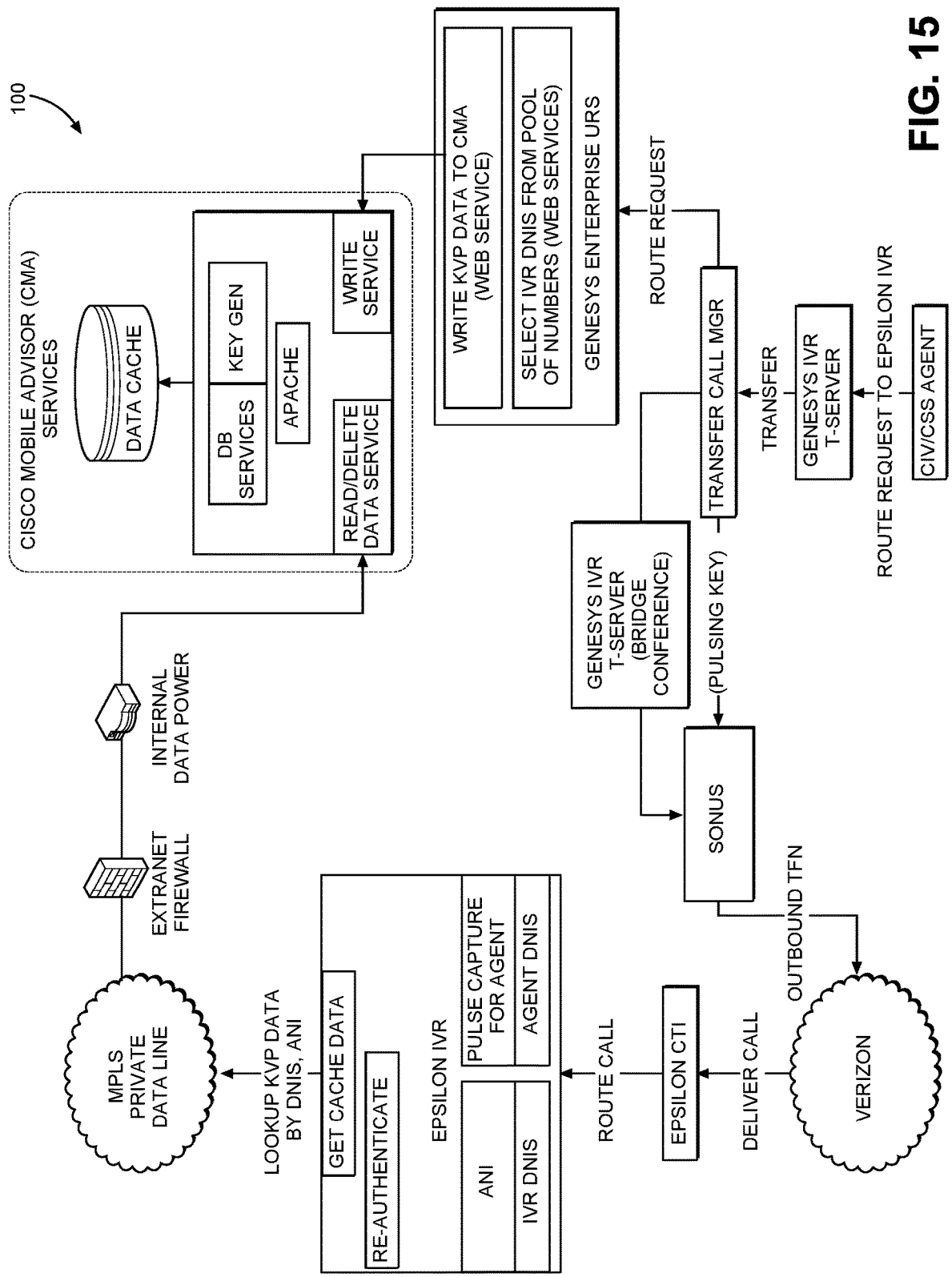
FIG. 15 illustrates an example of storing call session information according to one or more techniques of this disclosure.

FIG. 13 illustrates an example of storing call session information according to one or more techniques of this disclosure. The example of FIG. 10 illustrates transferring a caller from an IVR server to a live operator (e.g., a banker) across Computer Telephony Integration (CTI) platforms. The depicted IVR server may be any IVR server described in this disclosure, such as IVR server 104 or IVR server 106. The depicted telephone server may be any telephone server described in this disclosure, such as telephone server 118. Genesys is just one example of a telephone server As shown in FIG. 13, database server 108 may be configured with a cache interface and a replication interface. For example, the depicted database server 108 may be configured to replicate data stored thereon to other database servers 108 and/or database server 123 located in different data centers.

Figure 16:
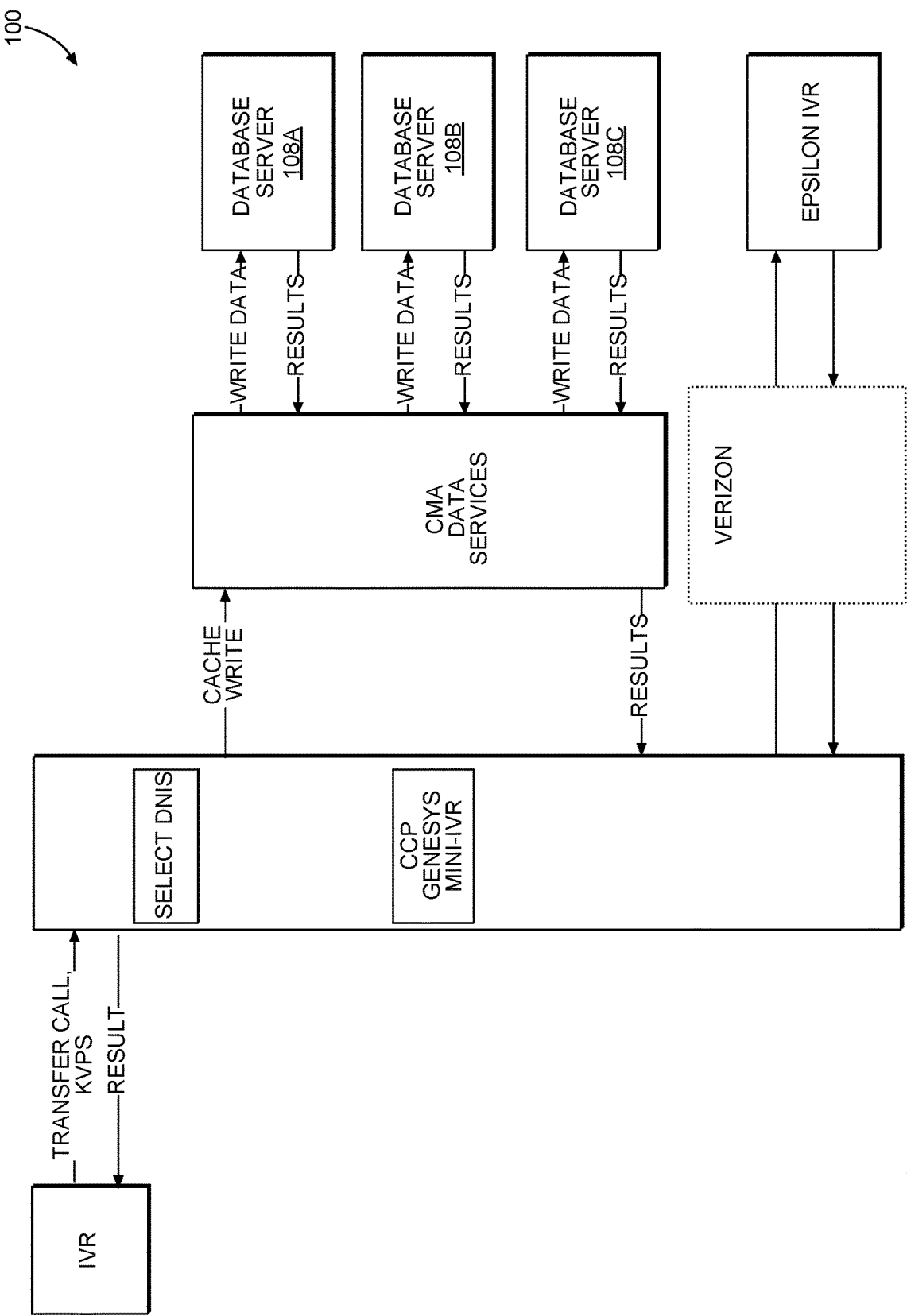
FIG. 16 illustrates an example of storing call session information according to one or more techniques of this disclosure.

For example, FIG. 16 illustrates an example of an IVR call transfer in which the IVR server may be configured transfer calls to a second IVR server (e.g., depicted as a third party IVR server in this example and is labeled as Epsilon IVR). The Genesys Mini-IVR server depicted may be telephone server 118 that is or is not an IVR server in other examples. The mini-IVR server depicted may be configured to receive call session data from the IVR server via, for example, one or more KVPs over a public phone line. The mini-IVR server may be configured to select a DNIS number corresponding to the second IVR server. In some examples, the DNIS number may be a toll free number selected from a group of toll free numbers. The mini-IVR server may be configured to issue a data write request to multiple database servers 108 (which is depicted as CMA data services, which is one example of a caching service that may run on a database server 108). In the example of FIG. 16, three database servers 108A, 108B, and 108C are shown as just an example. In some examples, the data write request may include the one or more KPVs received from the IVR. In other examples, KPVs may not be used to transfer call session information from the IVR server to a database server 108. In such examples, the data write request may include the call session information from the IVR server in any format, whether in the KPV format or not. In the example of FIG. 16, the mini-IVR may be configured to transfer the caller from the IVR server to the third party IVR server using a TNT call transfer. The ANI may automatically be carried with the call.

Figure 18:
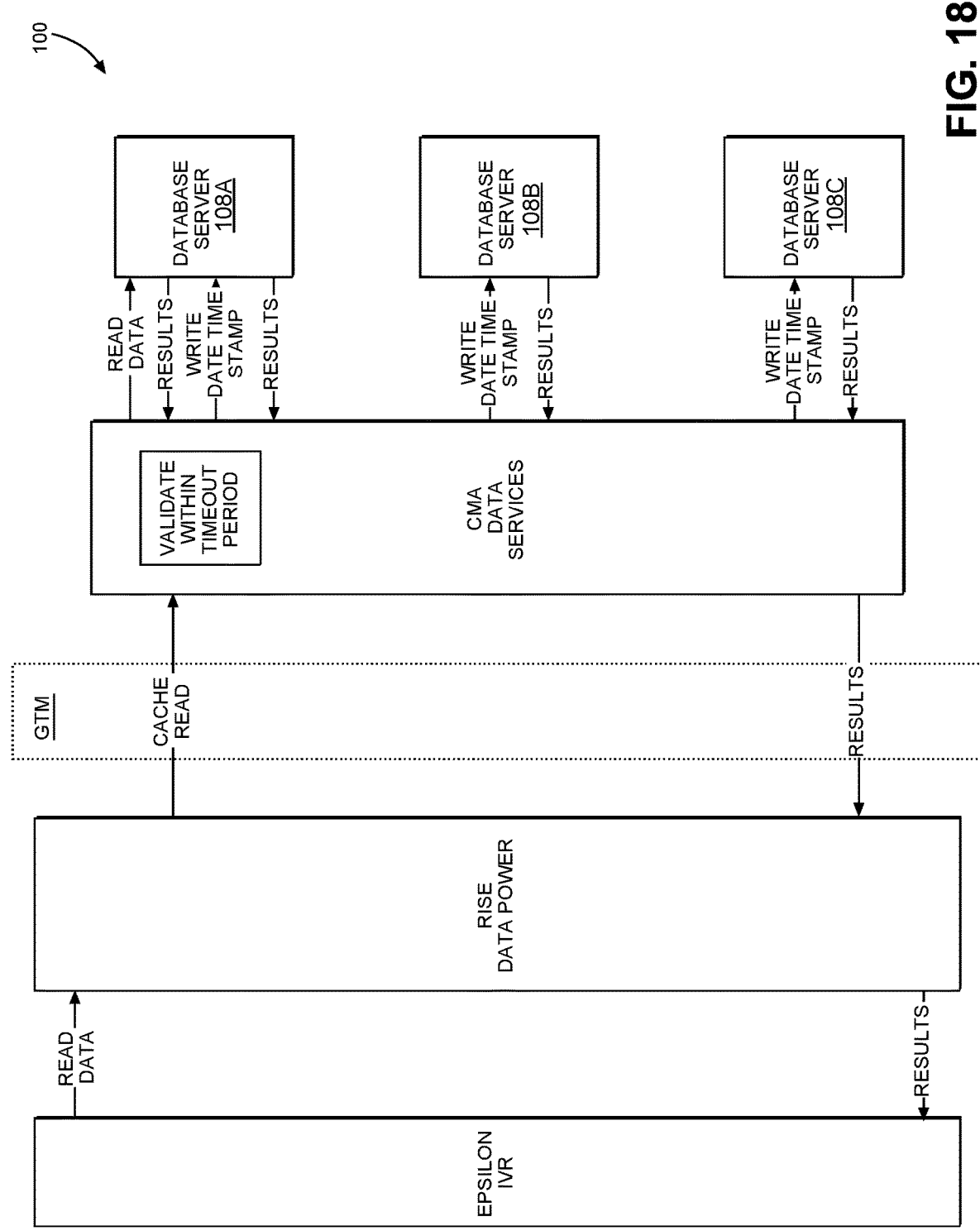
FIG. 18 illustrates an example of storing call session information according to one or more techniques of this disclosure.

As another example, FIG. 18 illustrates an example of an IVR data service call to database server 108 (again depicted as CMA data services, which is one example of a caching service that may run on database server 108). For example, FIG. 18 illustrates one example in which an IVR server (e.g., depicted as a third party IVR server in this example and is labeled as Epsilon IVR) may be configured to acquire data from database server 108. In some examples, the IVR server may be configured to identify callers transferred to it by obtaining customer session data (which may also be referred to as call session data) through a service call to what may be referred to as the RISE Data Power platform, to provide one example. The RISE Data Power platform may be configured to execute a service call to database server 108. The IVR server may be configured to send the DNIS/toll free number, caller's ANI, and/or the generated key (e.g., the key that may have been pulsed or otherwise transmitted to the IVR server) with the service call. Database server 108 may be configured to receive the service call (which may also be referred to as a data read request), and retrieve data from its memory according a data storage/access algorithm (e.g., a caching algorithm). For example, database server 108 may be configured to provide the requested data as long as a timeout period (e.g., 60 seconds) has not been exceeded. For successful reads, the database server 108 may be configured to update a field in the data structure with which the read information is associated with a timestamp indicating the data has already been read and no further use of the data can be performed according to some examples. In some examples, the caching service (e.g., CMA data services in this example) may reside and execute on one or more of database servers 108 (e.g., database server 108A, database server 108B, and/or database server 108C). In other examples, the caching service may reside and execute on a different hardware component separate and apartment from the one or more database servers 108. These different examples involving the caching service apply to every example described herein. For example, any example described with respect to database server 108 may include reference to a caching service that may be executable by database server 108 to perform one or more caching functions, or may include reference to a caching service that may be executable by a component different from database server 108.

It is understood that the techniques described herein may be modified to enhance any telephony system. For example, it is understood that the description of some techniques herein may be described as re-using call session information (e.g., authentication information) in a different call session. As an example, an IVR server (e.g., IVR server 106) was used as an example telephony component to re-use call session information. However, it is understood that the techniques described herein may enable any telephony component (or non-telephony component) to reuse previous call session data. For example, IVR server 106 may be replaced with another component. For example, even live operators could take advantage of not having to ask a caller to provide authentication information if that information was provided during a previous call session. In such an example, IVR server 106 may be interchangeable with a telephone corresponding to a live operator.

In some examples described herein, a call transfer may occur across public TDM lines. Conventionally, there are no fields available to send customer credentials (or other call session information) or identifiers to the telephony component that a caller is being transferred to as part of the transfer. As described herein, the techniques described herein enable the sharing of call session information by storing call session information on a database server (e.g., database server 108). In some examples, the call session data may be available for a period of time and/or may be read a limited number of times (e.g., once, twice, or any other limit).

In some examples described herein, a call transfer may occur over a public phone line (e.g., over the PSTN), and a data transfer (e.g., transferring call session information to and from database server 108 may occur over a data network). In some examples, centralized call parking may be used for managing call transfers and the sending of the unique key to a telephony component (e.g., an IVR server).

In some examples, if there is any failure in the storing or accessing of call session data, the caller corresponding thereto may be prompted to re-authenticate by the IVR server or other telephony component that was accessing the database server in an attempt to avoid having to prompt the caller to re-authenticate.

Figure 19:
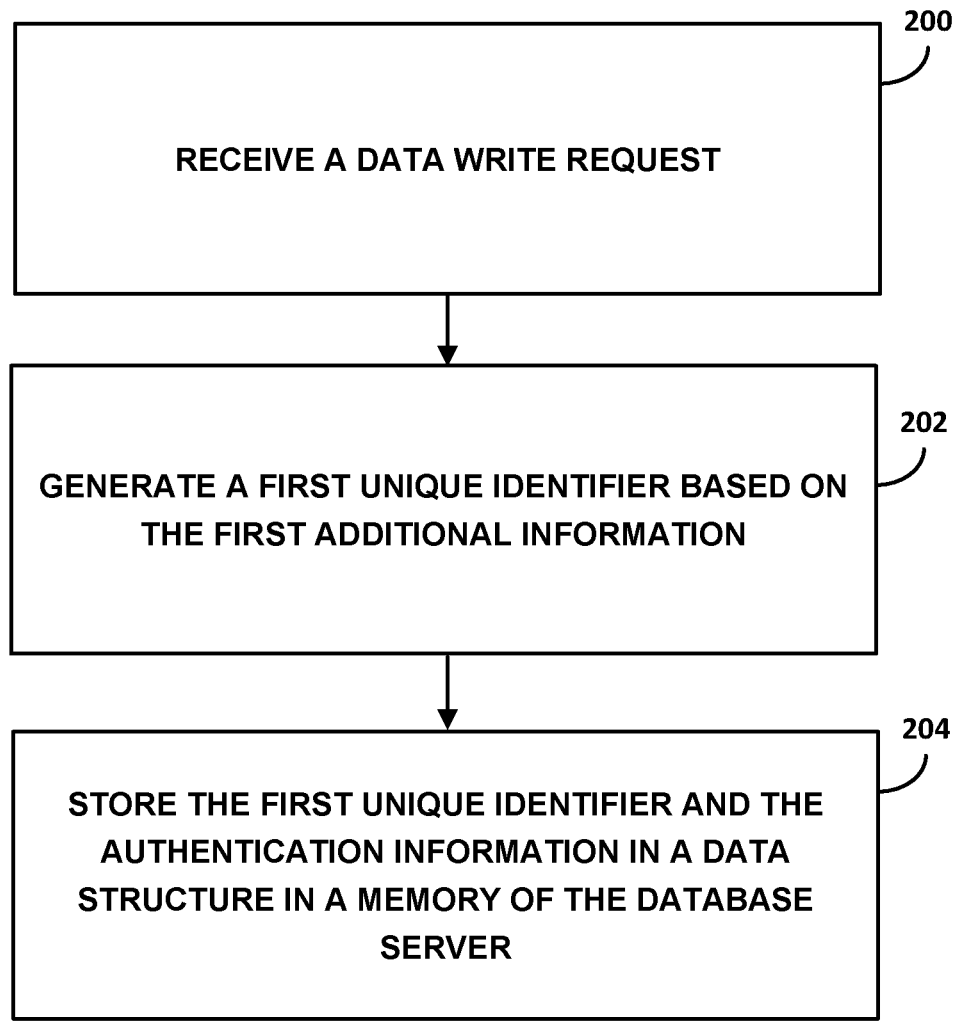
FIG. 19 is a flowchart showing an example method of the disclosure.

FIG. 19 is a flowchart showing an example method of the disclosure. The method of FIG. 19 may be carried out by, for example, database server 108. FIG. 19 depicts one example method consistent with one or more techniques of this disclosure. In the example of FIG. 19, database server 108 may be configured to receive a data write request (200). In some examples, the data write request may include authentication information corresponding to a first call session and first additional information. Database server 108 may be configured to generate a first unique identifier based on the first additional information (202). In some examples, the authentication information corresponds to the first unique identifier. Database server 108 may be configured to store the first unique identifier and the authentication information in a data structure in a memory of the database server (204).

In some examples, the data structure may include a plurality of unique identifier fields and a plurality of authentication information fields such that each unique identifier field respectively corresponds to a single authentication information field of the plurality of authentication information fields. Database server 108 may be configured to store the first unique identifier in a first unique identifier field, and store the authentication information corresponding to the first unique identifier in a first authentication information field.

In some examples, the data structure may include a plurality of read count fields such that each unique identifier field respectively corresponds to a single read count field of the plurality of read count fields. The data structure may include a first read count field corresponding to the first unique identifier field and the first authentication information field. Database server 108 may be configured to store a value in the first read count field. In some examples, the value stored in the first read count field indicates a number of times that the authentication information stored in the first authentication information field has been read, or indicates a number of times the authentication information stored in the first authentication information field can be read. Database server 108 may be configured to increment the value stored in the first read count field each time the authentication information stored in the first authentication information field is read. In other examples, database server 108 may be configured to decrement the value stored in the first read count field each time the authentication information stored in the first authentication information field is read. Database server 108 may be configured to apply a data storage or access algorithm using the value stored in the first read count field.

In some examples, the data structure may include a first time stored field corresponding to the first unique identifier field and the first authentication information field. Database server 108 may be configured to store a time value in the first time stored field. In some examples, the time value corresponds to a time at which the database server stored the first unique identifier in the first unique identifier field and stored the authentication information corresponding to the first unique identifier in a first authentication information field. In some examples, database server 108 may be configured to apply a data storage or access algorithm using the time value stored in the first time stored field.

Database server 108 may be configured to receive a data read request. The data read request includes second additional information. Database server 108 may be configured to generate a second unique identifier based on the second additional information. In some examples, first additional information and the second additional information may be the same or different information. For example, the first additional information and the second additional information may be the same, but database server 108 may receive the first additional information and the second additional information at different times.

Database server 108 may be configured to determine that the second unique identifier does not match any unique identifier stored in the data structure in the memory of the database server. Database server 108 may be configured to determine not to execute the data read request based on the second unique identifier not matching any unique identifier stored in the data structure in the memory of the database server. Database server 108 may be configured to determine that the second unique identifier matches the first unique identifier stored in the data structure in the memory of the database server.

Database server 108 may be configured to execute the data read request based on the second unique identifier matching the first unique identifier stored in the data structure in the memory of the database server. In some examples, database server 108 is configured to execute the data read request by being configured to read the authentication information stored in the first authentication information field.

Figure 20:
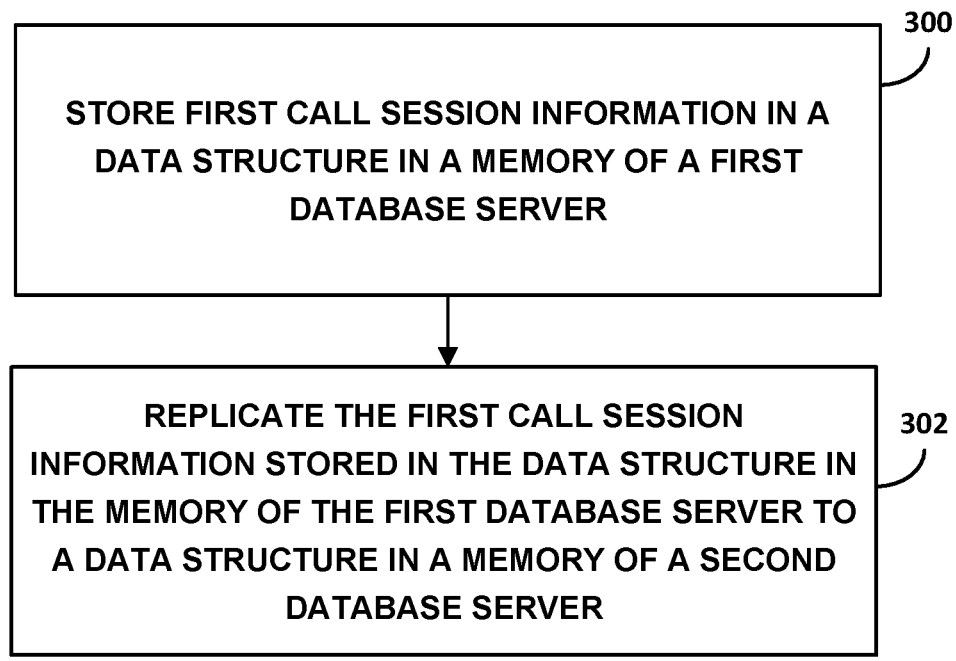
FIG. 20 is a flowchart showing an example method of the disclosure.

FIG. 20 is a flowchart showing an example method of the disclosure. The method of FIG. 20 may be carried out by, for example, a first database server 108. FIG. 20 depicts one example method consistent with one or more techniques of this disclosure. In the example of FIG. 20, a first database server 108 may be configured to store first call session information in a data structure in a memory of the first database server (300). In some examples, the first call session information corresponds to a unique identifier that corresponds to a caller. First database server 108 may be configured to replicate the first call session information stored in the data structure in the memory of the first database server to a data structure in a memory of a second database server 108 (302).

In some examples, the first database server 108 may be configured to release the first call session information from the first memory for use over a second call session. In such examples, the first database server 108 may be configured to release the first call session information from the first memory for use over the second call session in response to receiving and processing a data read request for the call session information stored in the first memory. In other examples, the second database server 108 may be configured to release the first call session information from the second memory for use over a second call session. In such examples, the second database server 108 may be configured to release the first call session information from the second memory for use over the second call session in response to receiving and processing a data read request for the call session information stored in the second memory. In these examples, another telephony component may issue the data read request to the first database server 108 or the second database server 108, such as an IVR server.

In some examples, the first call session information includes authentication information that corresponds to the caller. The first database server 108 may be configured to replicate the first call session information stored in the data structure in the first memory of the first database server to the data structure in the second memory of the second database server by being configured to send, to the second database server 108, a data write request, wherein the data write request includes the first call session information.

In some examples, the second database server 108 may be configured to receive the data write request from the first database server, and store the first call session information in the data structure in the second memory of the second database server. The second database server 108 may be configured to release the first call session information from the second memory for use over a second call session.

In some examples, the first database server 108 may be included within a first data center, and the second database server 108 may be included within a second data center that is different than the first data center. In some examples, at least one of the first database server 108 or the second database server 108 may be a cache server.

The various examples described herein may be combined in any combination. Similarly, any example described herein including two or more features (e.g., steps, components, or the like) is also understood as including one or more less features (e.g., one less feature, two less features, three less features, etc) in other examples.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. For example, each component described herein (e.g., IVR server 104, IVR server 106, telephone server 118, database server 108, and/or any other component described herein) may be described as being configured to perform one or more functions. It is understood that each component described herein may respectively include hardware, software, firmware, or any combination thereof to perform the one or more described functions. As an example, it is understood that each component described herein may include one or more hardware processing units configured to perform the one or more described functions. As another example, each component may include a memory having instructions stored thereon that the one or more hardware processing units may be configured to execute to cause the performance of one or more described functions. For example, database server 108 is described as being configured to receive and send data over network 112. It is therefore understood that database server 108 may include a network interface that connects database server 108 to network 112. As another example, database server 108 is described as being configured to receive data write requests and data read requests, store authentication information in a data structure (e.g., data structure 200), generate unique identifiers, read authentication information, and other functions. It is therefore understood that database server 108 may include a unique identifier generator and a data storage/access algorithm (e.g., a caching algorithm). The unique identifier generator may be implemented in hardware, software, firmware, or any combination thereof. The data storage/access algorithm may be implemented in hardware, software, firmware, or any combination thereof. As an example, a processing unit of database server 108 may be configured to execute a data storage/access algorithm stored in memory cause performance of one or more functions corresponding to the writing and reading of data (e.g., a unique identifier, a time value, a read count value, and authentication information) to and from (respectively) the data structure stored in a memory of database server 108.

If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wired or wireless communication device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The following numbered examples may illustrate one or more aspects of the disclosure:

Example 1

A method comprising: establishing, by a telephone, a first call session with a first interactive voice response server; providing, by the telephone, first authentication information to the first interactive voice response server; establishing, by the telephone, a second call session with a second interactive voice response server; and authenticating, by the second interactive voice response server, a caller of the telephone by using the first authentication information provided by the telephone to the first interactive voice response server.

Example 2

The method of example 1, further comprising: authenticating, by the second interactive voice response server, the caller of the telephone without requesting the caller to provide authentication information over the second call session.

Example 3

The method of example 1, further comprising: receiving, by a database server from the first interactive voice response server, a data write request to store the first authentication information in a memory of the database server; and receiving, by the database server, the first authentication information.

Example 4

The method of example 3, further comprising: generating, by the database server, a first unique identifier corresponding to the first authentication information.

Example 5

The method of example 4, further comprising: storing, by the database server, the first unique identifier and the first authentication information in a data structure in the memory of the database server.

Example 6

The method of example 5, wherein the data structure is an associative array such that the first unique identifier maps to the first authentication information stored in the memory of the database server.

Example 7

The method of example 5, further comprising: receiving, by a database server from the second interactive voice response server, a data read request to read the first authentication information stored in the memory of the database server; generating, by the database server, a second unique identifier based on information corresponding to the second call session, wherein the second unique identifier matches the first unique identifier; and providing, by the database server, the first authentication information to the second interactive voice response server.

Example 8

The method of example 4, further comprising: generating, by the database server, the first unique identifier based on information corresponding to the first call session.

Example 9

The method of example 8, wherein the information corresponding to the first call session includes an Automatic Number Identification corresponding to the telephone and a number corresponding to the second interactive voice response server with which the second call session is established.

Example 10

The method of example 9, wherein the first unique identifier includes a concatenation of the Automatic Number Identification corresponding to the telephone and the number corresponding to the second interactive voice response server with which the second call session is established.

Example 11

The method of example 7, wherein generating the first unique identifier is based on information corresponding to the first call session, wherein the information corresponding to the first call session includes an Automatic Number Identification corresponding to the telephone and a number corresponding to the second interactive voice response server with which the second call session is established, and wherein the information corresponding to the second call session includes the Automatic Number Identification corresponding to the telephone and the number corresponding to the second interactive voice response server with which the second call session is established.

Example 12

The method of example 11, wherein the first unique identifier includes a concatenation of the Automatic Number Identification corresponding to the telephone and the number corresponding to the second interactive voice response server with which the second call session is established, and wherein the second unique identifier includes the concatenation of the Automatic Number Identification corresponding to the telephone and the number corresponding to the second interactive voice response server with which the second call session is established.

Example 13

The method of example 1, further comprising: receiving, by the telephone, a first request for authentication information from the first interactive voice response server over the first call session, wherein the first authentication information corresponds to the first request for authentication information.

Example 14

The method of example 13, further comprising: receiving, by the telephone, a second request for authentication information from the second interactive voice response server over the second call session; and providing, by the telephone to the second interactive voice response server, second authentication information corresponding to the second request for authentication information.

Example 15

The method of example 14, further comprising: authenticating, by the second interactive voice response server, the caller of the telephone by using the first authentication information and the second authentication information.

Example 16

The method of example 1, wherein the telephone includes a computing device configured for telecommunication.

Example 17

A method comprising: receiving, by a database server, a data write request, wherein the data write request includes authentication information corresponding to a first call session and first additional information; generating, by the database server, a first unique identifier based on the first additional information, wherein the authentication information corresponds to the first unique identifier; and storing the first unique identifier and the authentication information in a data structure in a memory of the database server.

Example 18

The method of example 17, wherein the data structure includes a plurality of unique identifier fields and a plurality of authentication information fields such that each unique identifier field respectively corresponds to a single authentication information field of the plurality of authentication information fields, the method further comprising: storing the first unique identifier in a first unique identifier field; and storing the authentication information corresponding to the first unique identifier in a first authentication information field.

Example 19

The method of example 18, wherein. the data structure includes a plurality of read count fields such that each unique identifier field respectively corresponds to a single read count field of the plurality of read count fields.

Example 20

The method of example 18, wherein the data structure includes a first read count field corresponding to the first unique identifier field and the first authentication information field.

Example 21

The method of example 20, the method further comprising: storing a value in the first read count field, wherein the value stored in the first read count field indicates a number of times that the authentication information stored in the first authentication information field has been read, or indicates a number of times the authentication information stored in the first authentication information field can be read.

Example 22

The method of example 21, the method further comprising: incrementing the value stored in the first read count field each time the authentication information stored in the first authentication information field is read; or decrementing the value stored in the first read count field each time the authentication information stored in the first authentication information field is read.

Example 23

The method of example 21, further comprising: applying, by the database server, a data storage/access algorithm using the value stored in the first read count field.

Example 24

The method of example 18, wherein the data structure includes a first time stored field corresponding to the first unique identifier field and the first authentication information field.

Example 25

The method of example 24, the method further comprising: storing a time value in the first time stored field, wherein the time value corresponds to a time at which the database server stored the first unique identifier in the first unique identifier field and stored the authentication information corresponding to the first unique identifier in a first authentication information field.

Example 26

The method of example 25, further comprising: applying, by the database server, a data storage or access algorithm using the time value stored in the first time stored field.

Example 27

The method of example 18, further comprising: receiving, by the database server, a data read request, wherein the data read request includes second additional information; and generating, by the database server, a second unique identifier based on the second additional information.

Example 28

The method of example 27, further comprising: determining, by the database server, that the second unique identifier does not match any unique identifier stored in the data structure in the memory of the database server.

Example 29

The method of example 28, further comprising: determining, by the database server, not to execute the data read request based on the second unique identifier not matching any unique identifier stored in the data structure in the memory of the database server.

Example 30

The method of example 27, further comprising: determining, by the database server, that the second unique identifier matches the first unique identifier stored in the data structure in the memory of the database server.

Example 31

The method of example 30, further comprising: executing, by the database server, the data read request based on the second unique identifier matching the first unique identifier stored in the data structure in the memory of the database server.

Example 32

The method of example 31, wherein executing the data read request includes reading the authentication information stored in the first authentication information field.

Example 33

A method comprising: establishing, by an interactive voice response server, a first call session with a telephone; receiving, by the interactive voice response server, authentication information corresponding to a second call session; and performing authentication, by the interactive voice response server, with the authentication information corresponding to the second call session and without sending an authentication request to the telephone over the first call session.

Example 34

A method comprising: establishing, by a first interactive voice response server, a first call session with a telephone; initiating, by the first interactive voice response server, a transfer of the telephone to a second interactive voice response server; establishing, by the second interactive voice response server, a second call session with the telephone as a result of the transfer initiated by the first interactive voice response server; performing, by the second interactive voice response server, an IVR application call flow including one or more prompts for information during the second call session; receiving, by the second interactive voice response server, information responsive to the one or more prompts for information from the telephone during the second call session; initiating, by the second interactive voice response server, a transfer of the telephone to the first interactive voice response server; establishing, by the first interactive voice response server, a third call session with the telephone as a result of the transfer initiated by the second interactive voice response server; and performing at least one of: sending, by the second interactive voice response server, the information responsive to the one or more prompts for information to the first interactive voice response server; or sending, by the second interactive voice response server, the information responsive to the one or more prompts for information to a database server that is accessible to the first interactive voice response server.

Example 35

A method comprising: sharing call session information acquired by a first interactive voice response server with a second interactive voice response server.

Example 36

The method of example 35, wherein sharing the call session information is performed by the first interactive voice response server sending the call session information with a data write request to a database server, the method further comprising: storing, by the database server, the call session information in a memory.

Example 37

The method of example 36, further comprising: sending, by the second interactive voice response server, a data read request to the database server.

Example 38

The method of example 37, further comprising: receiving, by the second interactive voice response server, the call session information from the database server.

Example 39

The method of example 38, further comprising: performing, by the second interactive voice response server, at least one action based on the call session information received from the database server.

Example 40

The method of example 39, wherein the at least one action includes at least one of: using the call session information as an input to a prompt of an IVR application call flow corresponding to the second interactive voice response server.

Example 41

A method comprising any combination of examples 1-40.

Example 42

A method comprising one or more techniques described in this disclosure.

Example 43

Any telephone, device, component, server, or the like described in this disclosure.

Example 44

A telephone comprising: a memory; and one or more processing units configured to perform one or more techniques described in this disclosure.

Example 45

An interactive voice response server comprising: a memory; and one or more processing units configured to perform one or more techniques described in this disclosure.

Example 46

A telephone server comprising: a memory; and one or more processing units configured to perform one or more techniques described in this disclosure.

Example 47

A database server comprising: a memory; and one or more processing units configured to perform one or more techniques described in this disclosure.

Example 48

An apparatus comprising one or more means for performing the method of any combination of examples 1-40.

Example 49

An apparatus comprising one or more means for performing one or more techniques described in this disclosure.

Example 50

The apparatus of example 49, wherein the one or more means comprises one or more processing units.

Example 51

A computer-readable storage medium having storing instructions thereon that, when executed, cause one or more processing units to perform the method of any combination of examples 1-40.

Example 52

A computer-readable storage medium having storing instructions thereon that, when executed, cause one or more processing units to perform one or more techniques described in this disclosure.

Example 53

Any component, device, server, telephone, processing unit, or the like described in this disclosure.

Various examples have been described. These and other examples are within the scope of the following claims.

What is claimed is:

1. A method comprising:
   receiving, by a database server, a data write request, wherein the data write request includes:
      authentication information provided by a caller during a first call session between the caller and a first interactive voice response (IVR) server in a telephony system, and
      first additional information associated with the caller, wherein the first additional information includes a telephone number of the caller;
   generating, by the database server and based on the first additional information, a first unique identifier corresponding to the caller, wherein the authentication information corresponds to the first unique identifier;
   storing, by the database server, the first unique identifier in a first unique identifier field and the authentication information corresponding to the unique identifier in a first authentication information field in a data structure in a memory of the database server, wherein the data structure includes a plurality of unique identifier fields and a plurality of authentication information fields such that each unique identifier respectively corresponds to a single authentication information field of the plurality of authentication information fields;
   receiving, by the database server and from a second IVR server, a data read request for the authentication information, wherein the data read request includes second additional information, wherein the second additional information includes the telephone number of the caller, and wherein the second IVR server is different from the first IVR server;
   generating, by the database server, a second unique identifier based on the second additional information; and
   executing, by the database server, the data read request based on the second unique identifier matching the first unique identifier stored in the data structure in the memory of the database server.

2. The method of claim 1,
   wherein the first IVR server includes at least one authentication IVR application, and wherein the second IVR server does not include an authentication IVR application.

3. The method of claim 1, wherein the data structure includes a plurality of read count fields such that each unique identifier field respectively corresponds to a single read count field of the plurality of read count fields.

4. The method of claim 1, wherein the data structure includes a first read count field corresponding to the first unique identifier field and the first authentication information field.

5. The method of claim 4, further comprising:
storing a value in the first read count field, wherein the value stored in the first read count field indicates a number of times that the authentication information stored in the first authentication information field has been read, or indicates a number of times the authentication information stored in the first authentication information field can be read.

6. The method of claim 5, further comprising:
incrementing the value stored in the first read count field each time the authentication information stored in the first authentication information field is read; or
decrementing the value stored in the first read count field each time the authentication information stored in the first authentication information field is read.

7. The method of claim 5, further comprising:
applying, by the database server, a data storage or access algorithm using the value stored in the first read count field.

8. The method of claim 1, wherein the data structure includes a first time stored field corresponding to the first unique identifier field and the first authentication information field.

9. The method of claim 8, further comprising:
storing a time value in the first time stored field, wherein the time value corresponds to a time at which the database server stored the first unique identifier in the first unique identifier field and stored the authentication information corresponding to the first unique identifier in a first authentication information field.

10. The method of claim 9, further comprising:
applying, by the database server, a data storage or access algorithm using the time value stored in the first time stored field.

11. The method of claim 1, further comprising:
determining, by the database server, that the second unique identifier does not match any unique identifier stored in the data structure in the memory of the database server.

12. The method of claim 11, further comprising:
determining, by the database server, not to execute the data read request based on the second unique identifier not matching any unique identifier stored in the data structure in the memory of the database server.

13. The method of claim 1, further comprising:
determining, by the database server, that the second unique identifier matches the first unique identifier stored in the data structure in the memory of the database server.

14. The method of claim 1, wherein executing the data read request includes reading the authentication information stored in the first authentication information field.

15. The method of claim 1,
wherein the first additional information includes a telephone number of an IVR server to which the caller has been transferred, wherein the first unique identifier is generated based on the telephone number of the caller and the telephone number of the IVR server to which the caller has been transferred, wherein the second additional information includes a telephone number of the second IVR server, and wherein the second unique identifier is generated based on the telephone number of the caller and the telephone number of the second IVR server.

16. The method of claim 1,
wherein the second IVR server is an IVR server to which the caller has been or will be transferred from the first IVR server.

17. A database server comprising:
a memory; and
one or more processing units configured to:
receive a data write request, wherein the data write request includes:
authentication information provided by a caller during a first call session between the caller and a first interactive voice response (IVR server) in a telephony system, and
first additional information associated with the caller, wherein the first additional information includes a telephone number of the caller;
generate, based on the first additional information, a first unique identifier corresponding to the caller, wherein the authentication information corresponds to the first unique identifier;
store the first unique identifier in a first unique identifier field and the authentication information corresponding to the unique identifier in a first authentication information field in a data structure in a memory of the database server, wherein the data structure includes a plurality of unique identifier fields and a plurality of authentication information fields such that each unique identifier respectively corresponds to a single authentication information field of the plurality of authentication information fields;
receive, from a second IVR server, a data read request for the authentication information, wherein the data read request includes second additional information, wherein the second additional information includes the telephone number of the caller, and wherein the second IVR server is different from the first IVR server;
generate a second unique identifier based on the second additional information; and
execute the data read request based on the second unique identifier matching the first unique identifier stored in the data structure in the memory of the database server.

18. The database server of claim 17,
wherein the first IVR server includes at least one authentication IVR application, and
wherein the second IVR server does not include an authentication IVR application.

19. The database server of claim 17, wherein the data structure includes a plurality of read count fields such that each unique identifier field respectively corresponds to a single read count field of the plurality of read count fields.

20. The database server of claim 17, wherein the data structure includes a first read count field corresponding to the first unique identifier field and the first authentication information field.

21. The database server of claim 20, wherein the one or more processing units are further configured to:

store a value in the first read count field, wherein the value stored in the first read count field indicates a number of times that the authentication information stored in the first authentication information field has been read, or indicates a number of times the authentication information stored in the first authentication information field can be read.

22. The database server of claim 21, wherein the one or more processing units are further configured to:
increment the value stored in the first read count field each time the authentication information stored in the first authentication information field is read; or
decrement the value stored in the first read count field each time the authentication information stored in the first authentication information field is read.

23. The database server of claim 21, wherein the one or more processing units are further configured to:
apply a data storage or access algorithm using the value stored in the first read count field.

24. The database server of claim 17, wherein the data structure includes a first time stored field corresponding to the first unique identifier field and the first authentication information field.

25. The database server of claim 24, wherein the one or more processing units are further configured to:
store a time value in the first time stored field, wherein the time value corresponds to a time at which the database server stored the first unique identifier in the first unique identifier field and stored the authentication information corresponding to the first unique identifier in a first authentication information field.

26. The database server of claim 25, wherein the one or more processing units are further configured to:
apply a data storage or access algorithm using the time value stored in the first time stored field.

27. The database server of claim 17, wherein the one or more processing units are further configured to:
determine that the second unique identifier does not match any unique identifier stored in the data structure in the memory.

28. The database server of claim 27, wherein the one or more processing units are further configured to:
determine not to execute the data read request based on the second unique identifier not matching any unique identifier stored in the data structure in the memory.

29. The database server of claim 17, wherein the one or more processing units are further configured to:
determine that the second unique identifier matches the first unique identifier stored in the data structure in the memory.

30. The database server of claim 17, wherein the one or more processing units are configured to execute the data read request by being configured to read the authentication information stored in the first authentication information field.

31. A non-transitory computer-readable storage medium storing instructions thereon that, when executed, cause one or more processing units to:
receive a data write request, wherein the data write request includes:
authentication information provided by a caller during a first call session between the caller and a first interactive voice response (IVR) server in a telephony system, and
first additional information associated with the caller, wherein the first additional information includes a telephone number of the caller;
generate, based on the first additional information, a first unique identifier corresponding to the caller, wherein the authentication information corresponds to the first unique identifier;
store the first unique identifier in a first unique identifier field and the authentication information corresponding to the unique identifier in a first authentication information field in a data structure in a memory accessible by the one or more processing units, wherein the data structure includes a plurality of unique identifier fields and a plurality of authentication information fields such that each unique identifier respectively corresponds to a single authentication information field of the plurality of authentication information fields;
receive, from a second IVR server, a data read request for the authentication information, wherein the data read request includes second additional information, wherein the second additional information includes the telephone number of the caller, and wherein the second IVR server is different from the first IVR server;
generate a second unique identifier based on the second additional information; and
execute the data read request based on the second unique identifier matching the first unique identifier stored in the data structure in the memory of the database server.

* * * * *